United States Patent
Nishida et al.

(10) Patent No.: US 12,118,549 B2
(45) Date of Patent: Oct. 15, 2024

(54) CONTROL METHOD, CONTROL DEVICE, AND RECORDING MEDIUM FOR CONTROLLING A DISTRIBUTED LEDGER TO USE A SERVICE OBJECT

(71) Applicant: Panasonic Intellectual Property Corporation of America, Torrance, CA (US)

(72) Inventors: Naohisa Nishida, Osaka (JP); Yuji Unagami, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 67 days.

(21) Appl. No.: 17/888,657

(22) Filed: Aug. 16, 2022

(65) Prior Publication Data

US 2022/0391782 A1  Dec. 8, 2022

Related U.S. Application Data

(63) Continuation of application No. PCT/JP2021/005827, filed on Feb. 17, 2021.

(Continued)

(51) Int. Cl.
*G06Q 10/02* (2012.01)
*G06Q 20/40* (2012.01)
*H04L 9/00* (2022.01)

(52) U.S. Cl.
CPC ........... *G06Q 20/401* (2013.01); *G06Q 10/02* (2013.01); *H04L 9/50* (2022.05)

(58) Field of Classification Search
CPC ...... G06Q 10/02; G06Q 20/401; G06Q 20/02; G06Q 20/145; G06Q 50/10; G06F 16/182; G06F 21/64; G07F 17/0057; H04L 9/50

(Continued)

(56) References Cited

U.S. PATENT DOCUMENTS

2015/0358172 A1* 12/2015 Kinomoto ........... H04L 12/1881
                                                          705/28
2019/0294514 A1* 9/2019 Tang ................... G06F 11/2041

(Continued)

FOREIGN PATENT DOCUMENTS

JP        2019-153130       9/2019

OTHER PUBLICATIONS

Block Geeks, "What is Blockchain Technology?" <https://blockgeeks.com/guides/what-is-blockchain-technology/>(<http://web.archive.org/web/20170103030405/https://blockgeeks.com/guides/what-is-blockchain-technology/> captured on Jan. 3, 2017 using the Wayback Machine). (Year: 2017).*

(Continued)

*Primary Examiner* — Jeff Zimmerman
*Assistant Examiner* — Brian A Tallman
(74) *Attorney, Agent, or Firm* — Wenderoth, Lind & Ponack, L.L.P.

(57) ABSTRACT

A control method according to the present disclosure is a control method for controlling a first node that holds a first distributed ledger in a system utilized to use a service object and including the first node and a plurality of second nodes that each hold a second distributed ledger. The control method includes: executing transmission processing for transmitting first transaction data to each of the plurality of second nodes; counting a total number of the second nodes that successfully communicate with the first node in the transmission processing; and storing the first transaction data in the first distributed ledger when the total number counted is greater than a predetermined number, and skipping storing the first distributed ledger in the first transaction data when the total number counted is not greater than the predetermined number.

12 Claims, 59 Drawing Sheets

Related U.S. Application Data

(60) Provisional application No. 62/979,645, filed on Feb. 21, 2020.

(58) Field of Classification Search
USPC .............................................................. 705/5
See application file for complete search history.

(56) References Cited

U.S. PATENT DOCUMENTS

| | | | |
|---|---|---|---|
| 2020/0005388 A1* | 1/2020 | Lim | H04L 9/3247 |
| 2020/0136829 A1* | 4/2020 | Keon | H04L 9/3236 |
| 2020/0313884 A1* | 10/2020 | Trevethan | G06Q 20/389 |
| 2021/0141804 A1* | 5/2021 | Liu | G06F 16/27 |
| 2021/0209518 A1* | 7/2021 | Switzer | G07C 9/27 |
| 2021/0264526 A1* | 8/2021 | Bryant | H04L 12/2803 |

OTHER PUBLICATIONS

Robinson, Peter. "Consensus for Crosschain communications." arXiv preprint arXiv:2004.09494 (2020). (Year: 2020).*
International Search Report (ISR) issued on May 25, 2021 in International (PCT) Application No. PCT/JP2021/005827.

* cited by examiner

Step 5
·Improper use of bike A
 12:15 - 16:15

Ledger A
(offline)

Step 7
- Return bike A
    ⇒Execute fee collection algorithm
    (Fee for improper reservation from
    12:15 to 16:15 not collected)

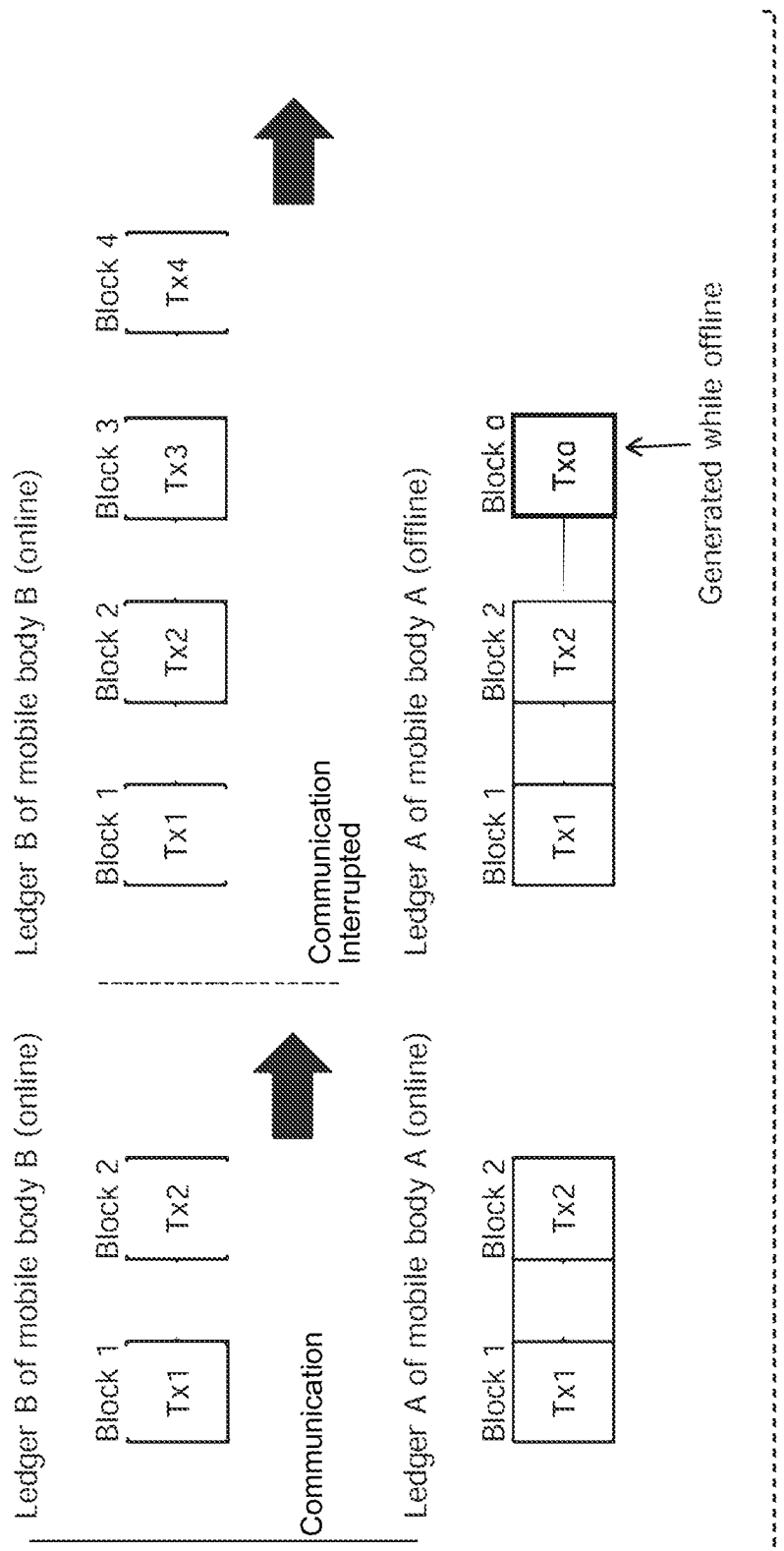

FIG. 3C

Ledger B of mobile body B (online)

| Block 1 | Block 2 | Block 3 | Block 4 | Block 5 |
|---------|---------|---------|---------|---------|
| Tx1 | Tx2 | Tx3 | Tx4 | Txa |

Communication

Ledger A of mobile body A (online)

| Block 1 | Block 2 | Block 3 | Block 4 | Block 5 |
|---------|---------|---------|---------|---------|
| Tx1 | Tx2 | Tx3 | Tx4 | Txa |

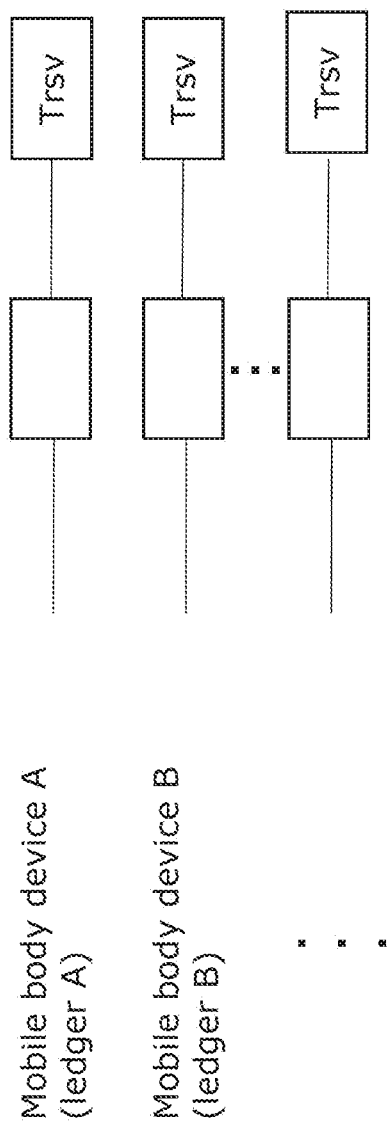

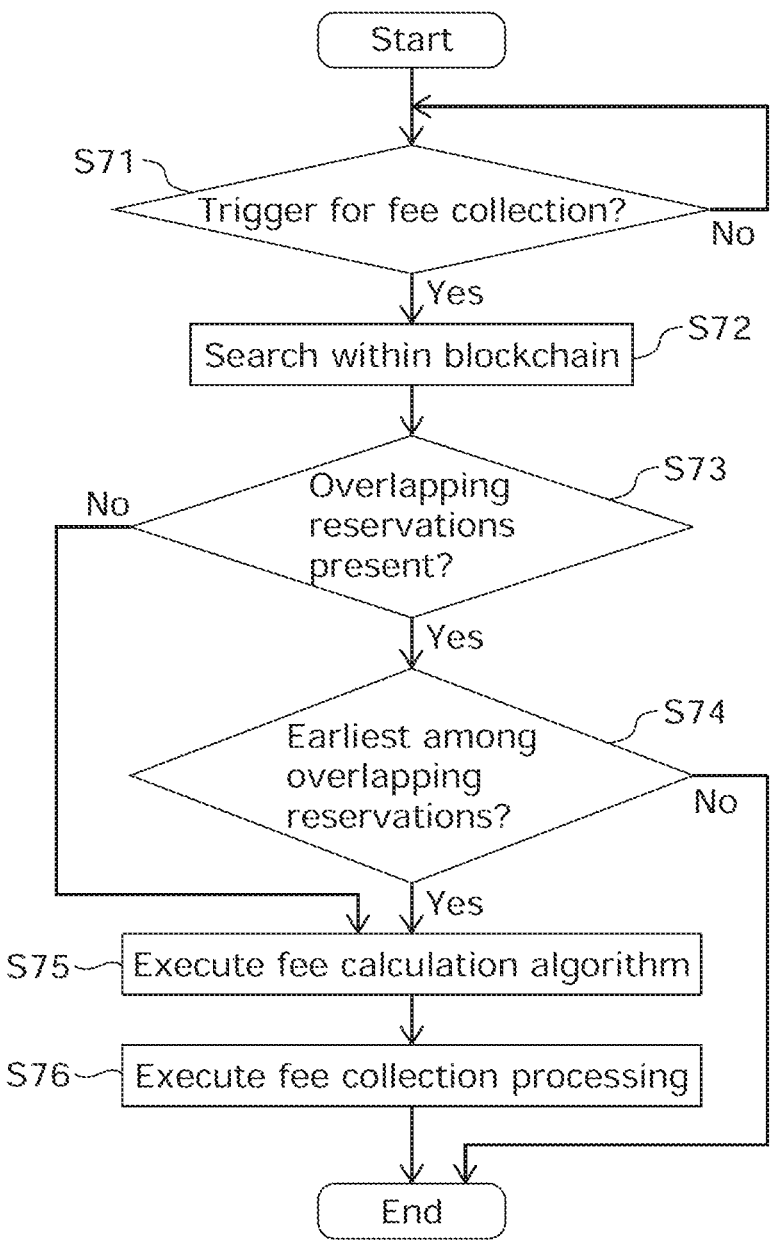

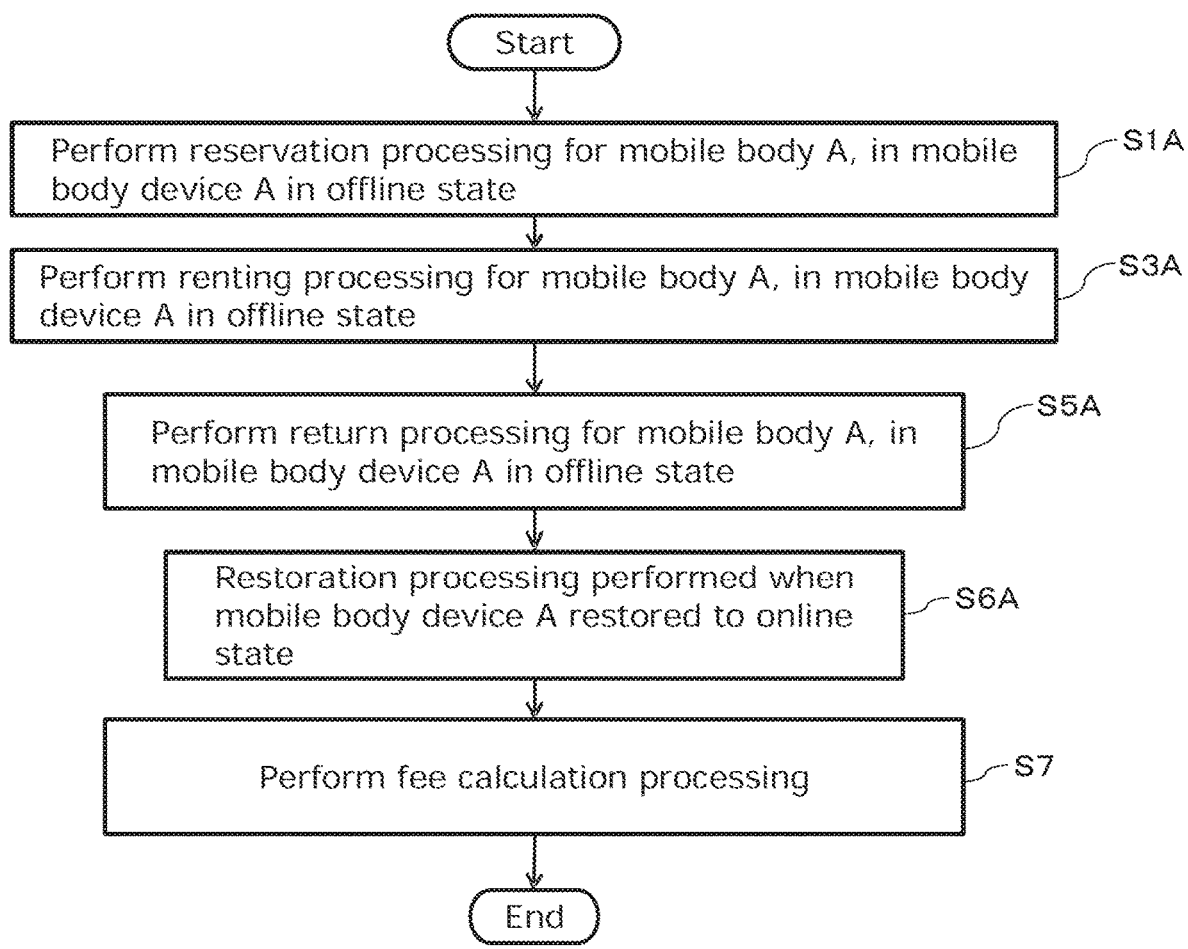

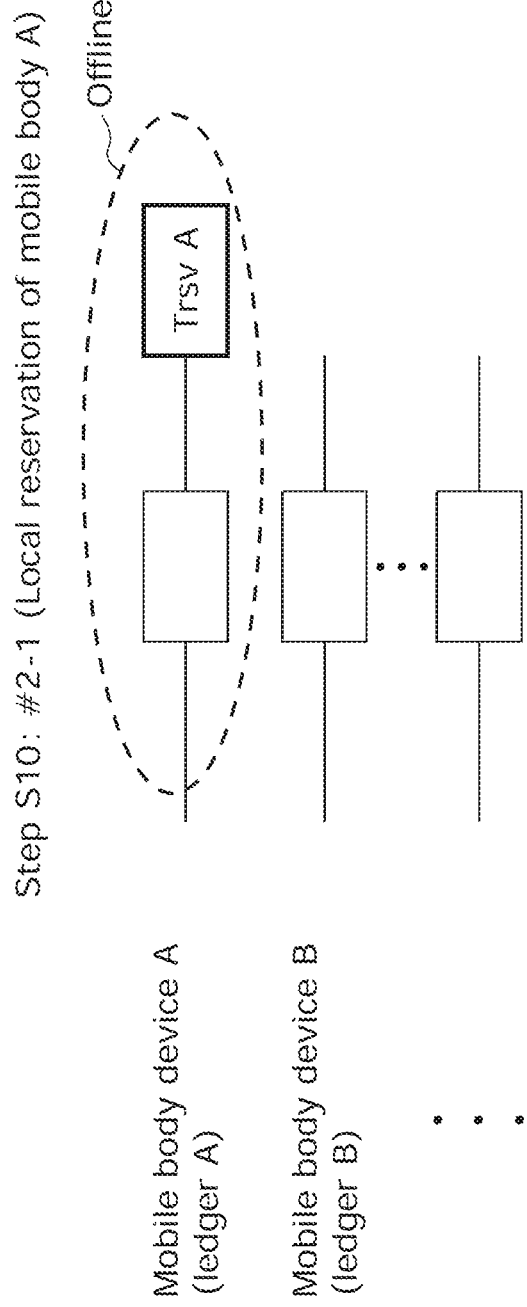

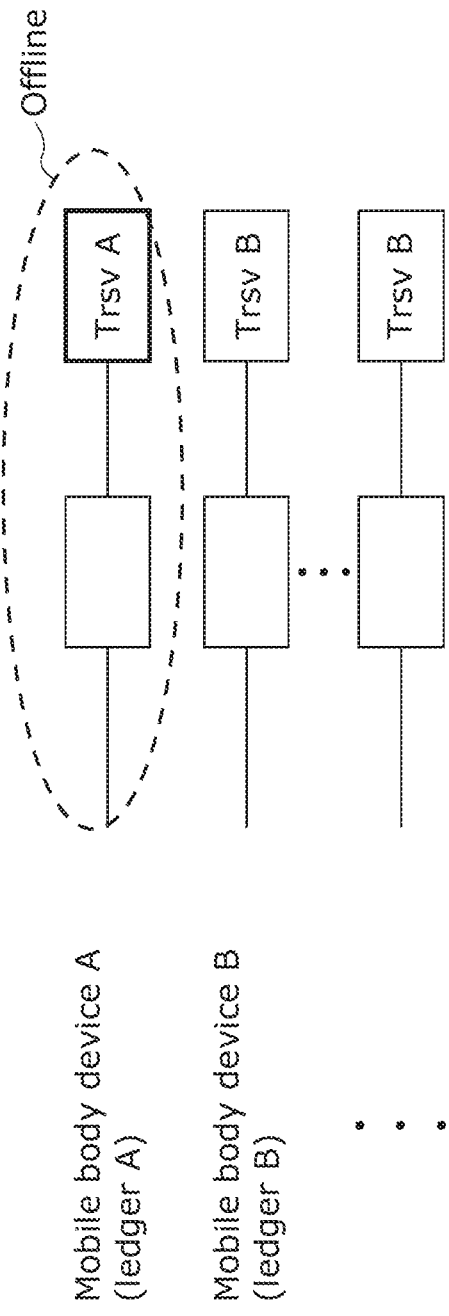

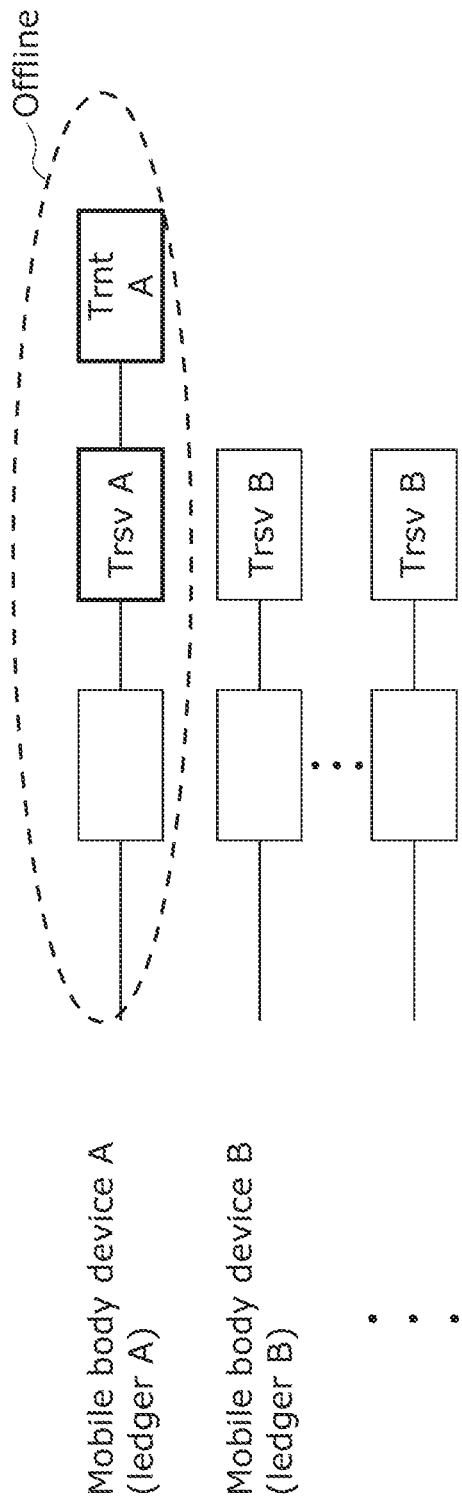

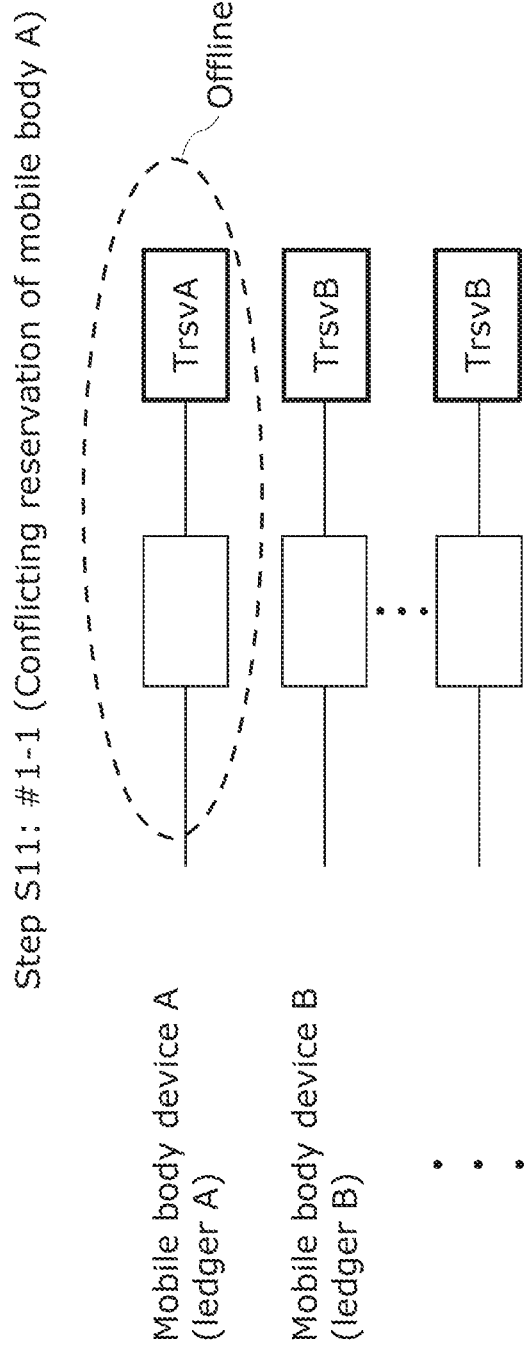

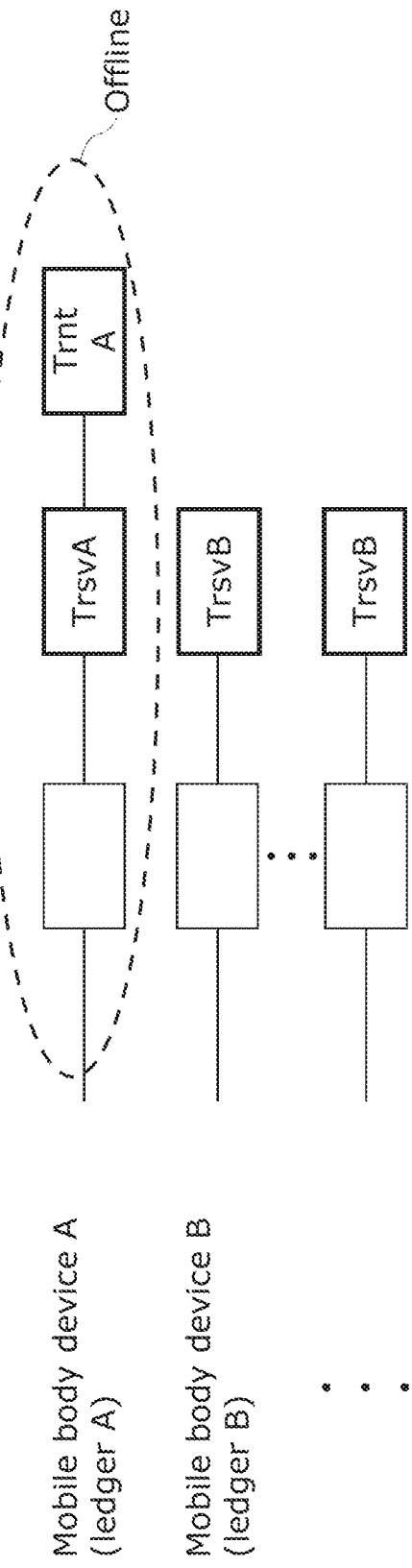

STEP 3: #2-2' Local renting

CONTROL METHOD, CONTROL DEVICE, AND RECORDING MEDIUM FOR CONTROLLING A DISTRIBUTED LEDGER TO USE A SERVICE OBJECT

CROSS REFERENCE TO RELATED APPLICATIONS

This is a continuation application of PCT International Application No. PCT/JP2021/005827 filed on Feb. 17, 2021, designating the United States of America, which is based on and claims priority of U.S. Provisional Patent Application No. 62/979,645 filed on Feb. 21, 2020. The entire disclosures of the above-identified applications, including the specifications, drawings and claims are incorporated herein by reference in their entirety.

FIELD

The present disclosure relates to a control method, a control device, and a recording medium.

BACKGROUND

PTL 1 discloses, for example, a technique for using a blockchain to appropriately manage information pertaining to a use reservation exchanged between a vehicle terminal and a user terminal.

CITATION LIST

Patent Literature

PTL 1: Japanese Unexamined Patent Application Publication No. 2019-153130

SUMMARY

Technical Problem

However, the technique disclosed in PTL 1 has a problem in that when using a blockchain to manage contracts or transactions such as use reservations for an object, the object can be used in an improper manner by exploiting the behavior of the blockchain when a fork occurs.

Having been achieved in light of the foregoing circumstances, an object of the present disclosure is to provide a control method, a control device, and a recording medium that can suppress improper use of a service object by exploiting a blockchain.

Solution to Problem

A control method according to one aspect of the present disclosure is a control method for controlling a first node that holds a first distributed ledger in a system utilized to use a service object and including the first node and a plurality of second nodes that each hold a second distributed ledger. The control method includes: executing transmission processing for transmitting first transaction data to each of the plurality of second nodes; counting a total number of the second nodes that successfully communicate with the first node in the transmission processing; and storing the first transaction data in the first distributed ledger when the total number counted is greater than a predetermined number, and skipping storing the first distributed ledger in the first transaction data when the total number counted is not greater than the predetermined number.

Note that these comprehensive or specific aspects may be realized by a system, a method, an integrated circuit, a computer program, or a computer-readable recording medium such as a CD-ROM, or may be implemented by any desired combination of systems, methods, integrated circuits, computer programs, and recording media.

Advantageous Effects

According to the present disclosure, the improper use of a service object by exploiting a blockchain can be suppressed.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3A is a diagram illustrating the behavior of a blockchain when a fork occurs.

FIG. 3C is a diagram illustrating the behavior of a blockchain when a fork occurs.

FIG. 9A is a diagram conceptually illustrating blocks of blockchains stored in ledger A and ledger B as a result of the operation of step S1 in FIG. 8.

FIG. 13 is a flowchart illustrating details of fee calculation processing by a system according to a comparative example.

FIG. 14 is a flowchart illustrating an overview of operations in normal processing by a system according to Comparative Example 2.

FIG. 24A is a diagram conceptually illustrating blocks of a blockchain stored in ledger A as a result of the operation of step S10 in FIG. 23.

FIG. 24B is a diagram conceptually illustrating blocks of a blockchain stored in ledger A as a result of the operation of step S11 in FIG. 23.

FIG. 24C is a diagram conceptually illustrating blocks of a blockchain stored in ledger A as a result of the operation of step S12 in FIG. 23.

FIG. 34B is a diagram conceptually illustrating blocks of a blockchain stored in ledger A as a result of the operation of step S11 in FIG. 33.

FIG. 34C is a diagram conceptually illustrating blocks of a blockchain stored in ledger A as a result of the operation of step S12 in FIG. 33.

DESCRIPTION OF EMBODIMENTS (Background Leading to One Aspect of Present Disclosure)

As described above, PTL 1 discloses, for example, a technique for using a blockchain to appropriately manage information pertaining to a use reservation exchanged between a vehicle terminal and a user terminal.

However, with the technique disclosed in PTL 1, the mechanism of the blockchain can be exploited and used in an improper manner. Several examples will be described hereinafter.

Figure 1:
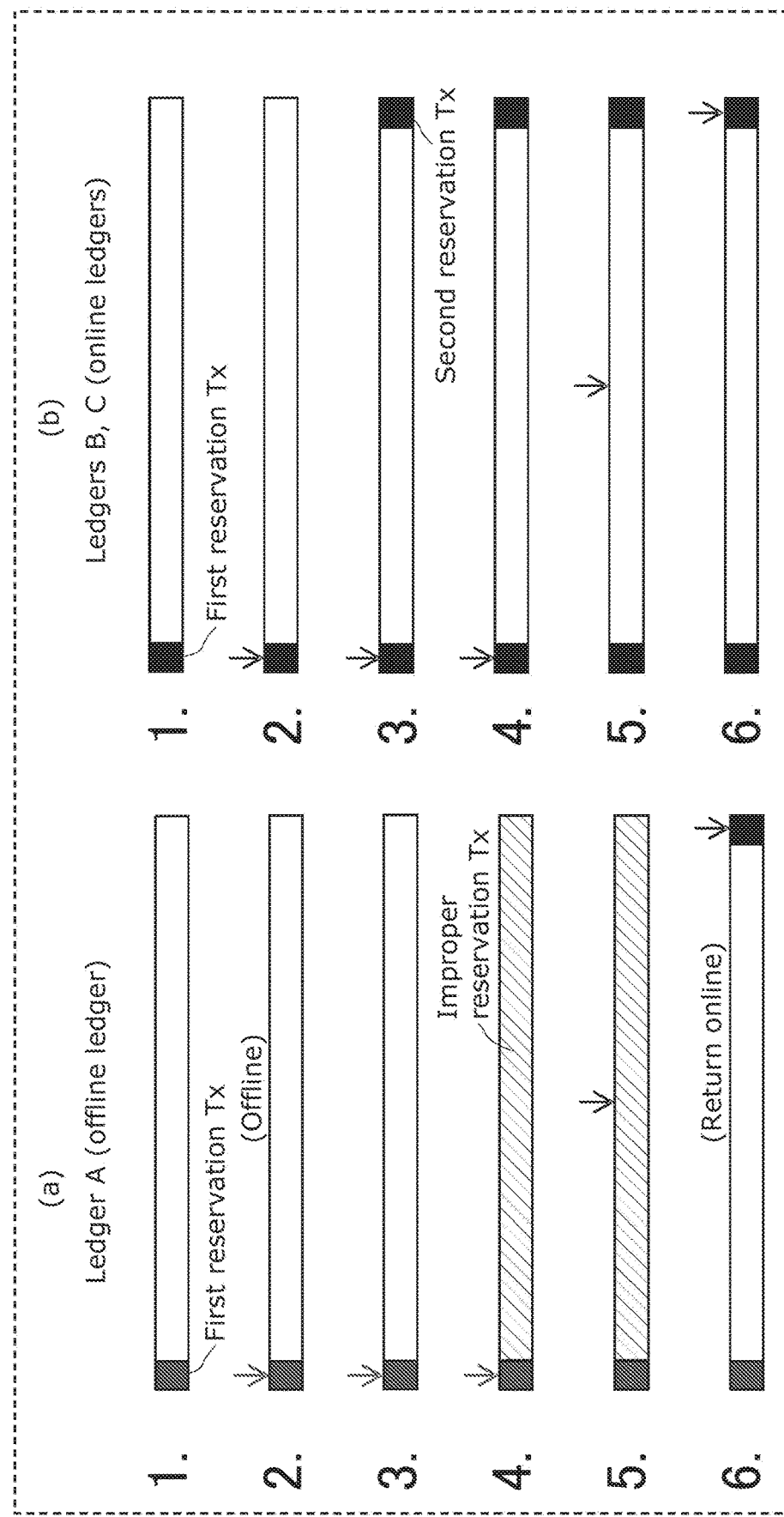
FIG. 1 is a diagram illustrating a sequence of a method for improper use.
Figure 2A:
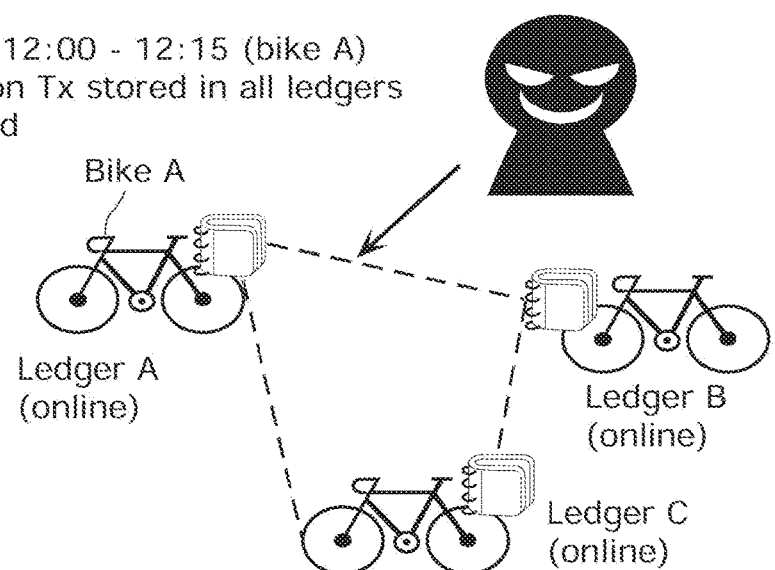
FIG. 2A is a diagram illustrating an example of a situation where step 1 in FIG. 1 is performed.
Figure 2B:
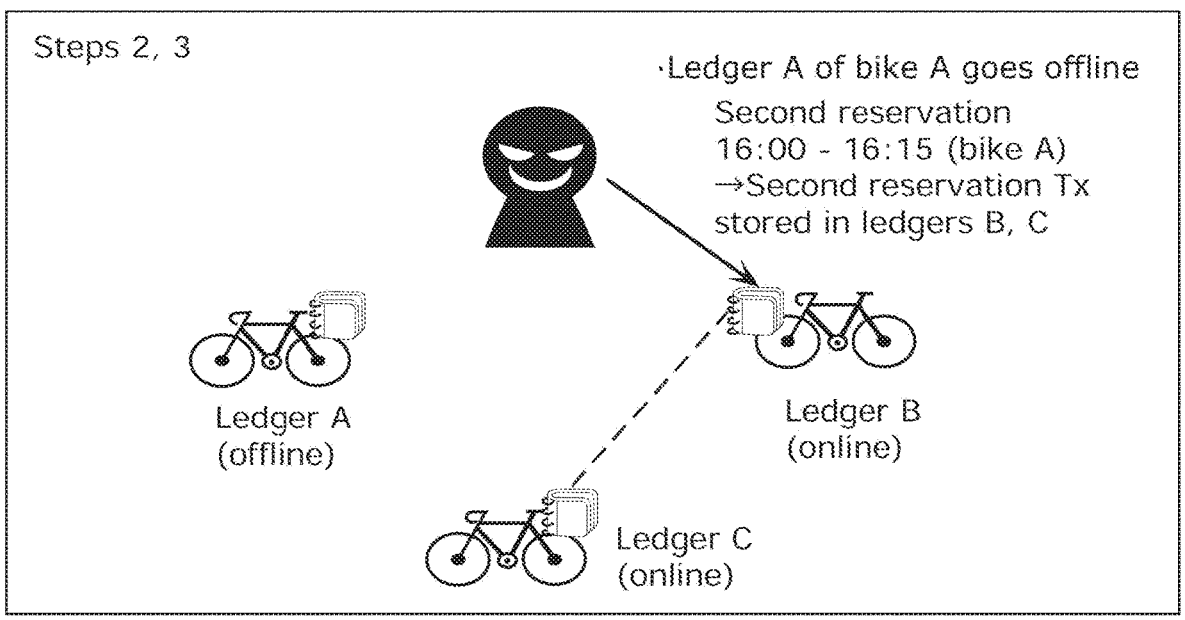
FIG. 2B is a diagram illustrating an example of a situation where steps 2 and 3 in FIG. 1 are performed.
Figure 2C:
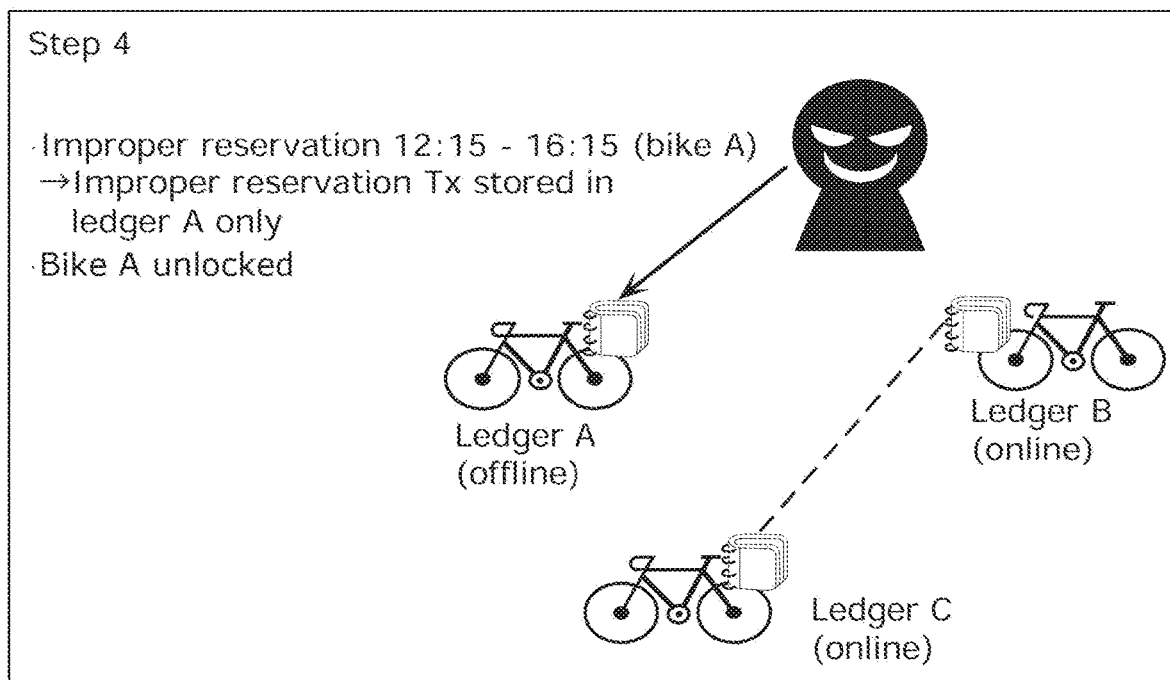
FIG. 2C is a diagram illustrating an example of a situation where step 4 in FIG. 1 is performed.
Figure 2D:
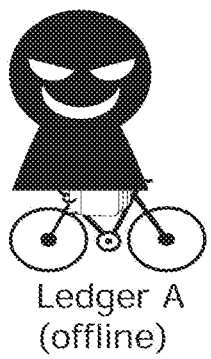
FIG. 2D is a diagram illustrating an example of a situation where step 5 in FIG. 1 is performed.
Figure 2E:
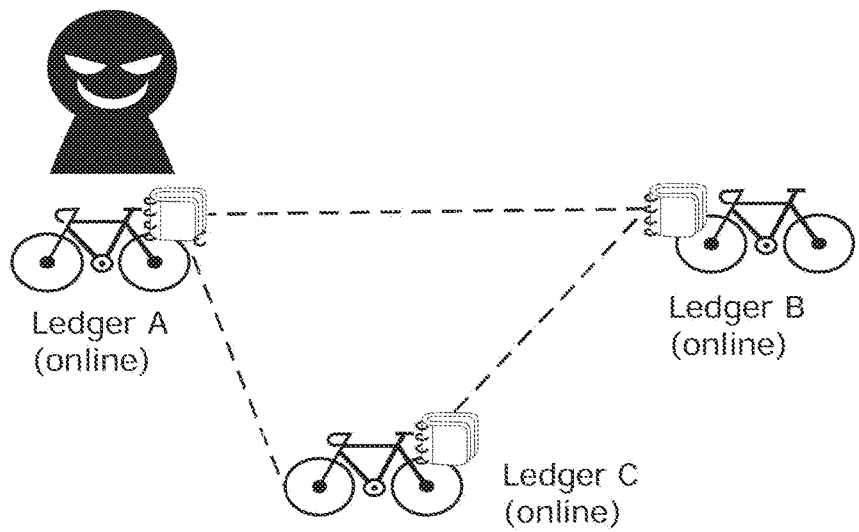
FIG. 2E is a diagram illustrating an example of a situation where step 6 in FIG. 1 is performed.
Figure 2F:
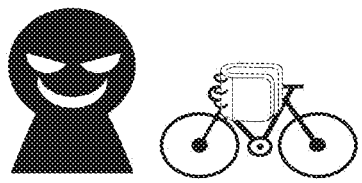
FIG. 2F is a diagram illustrating an example of a situation occurring after step 6 in FIG. 1 has been performed.

FIG. 1 is a diagram illustrating a sequence of a method for improper use. FIGS. 2A to 2F are diagrams illustrating examples of situations where the sequence illustrated in FIG. 1 is performed. FIG. 1 illustrates a sequence when a use reservation is made for bike A in a service for sharing a plurality of bikes, and bike A is used improperly. The arrows indicate the current time. Additionally, each of the plurality of bikes has a ledger in which reservations are managed using a blockchain. FIG. 2A is a diagram illustrating an example of a situation where step 1 in FIG. 1 is performed, and FIG. 2B is a diagram illustrating an example of a situation where steps 2 and 3 in FIG. 1 are performed. FIG. 2C is a diagram illustrating an example of a situation where step 4 in FIG. 1 is performed, and FIG. 2D is a diagram illustrating an example of a situation where step 5 in FIG. 1 is performed. FIG. 2E is a diagram illustrating an example of a situation where step 6 in FIG. 1 is performed, and FIG. 2F is a diagram illustrating an example of a situation for step 7, which is performed after step 6 in FIG. 1.

A user planning to improperly use a bike makes, for example, a first reservation to use bike A for 15 minutes, from 12:00 to 12:15, in step 1, as illustrated in FIG. 2A. At this time, ledger A of bike A is capable of communication with ledgers B and C of other bikes (that is, is online), and thus first reservation Tx, which is indicated by black, is stored in all of the ledgers (ledgers A, B, and C), as indicated in step 1 of FIG. 1. As a result, bike A is unlocked and the user can use bike A for 15 minutes, from 12:00 to 12:15.

Next, the user planning to use bike A improperly puts ledger A of bike A in a state in which ledgers B and C of the other bikes cannot be communicated with (that is, offline) in steps 2 and 3, as illustrated in FIG. 2B. Next, the user planning to improperly use bike A improperly makes a second reservation, for example, to use bike A for 15 minutes, from 16:00 to 16:15, in ledgers B and C of the other bikes. At this time, ledger A of bike A is offline, and thus second reservation Tx, which is indicated by black, is stored only in ledgers B and C that are online, as indicated in step 3 of FIG. 1.

Next, the user planning to improperly use bike A makes, for example, an improper reservation to use bike A from 12:15 to 16:15 in ledger A of bike A, in step 4, as illustrated in FIG. 2C. At this time, ledger A of bike A is incapable of communication with ledgers B and C of the other bikes (that is, is offline), and thus improper reservation Tx, which is indicated by hatching, is stored only in ledger A of bike A, as indicated in step 4 of FIG. 1. As a result, bike A is unlocked at 12:15, and thus the user can improperly use bike A while still in an offline state from 12:15 to 16:15, as indicated by step 5 of FIG. 2D. In this case, second reservation Tx, which is indicated by black, is stored only in ledgers B and C which are online, as indicated by step 5 in FIG. 1.

Next, the user returns ledger A of bike A to a state in which ledgers B and C of the other bikes can be communicated with (that is, online) from 16:00 to 16:15, in step 6 of FIG. 2E. Then, as will be described in detail later, a fork occurs in the blockchains of ledgers A, B, and C, and second reservation Tx is stored in the blockchain of ledger A in the same manner as with the blockchains of ledgers B and C, as indicated by step 6 of FIG. 1. Improper reservation Tx is thus stored after second reservation Tx.

The behavior of the blockchains when a fork occurs, in which improper reservation Tx is stored in ledgers A, B, and C after second reservation Tx when ledger A of bike A returns online in step 6, will be described here.

Figure 3B:
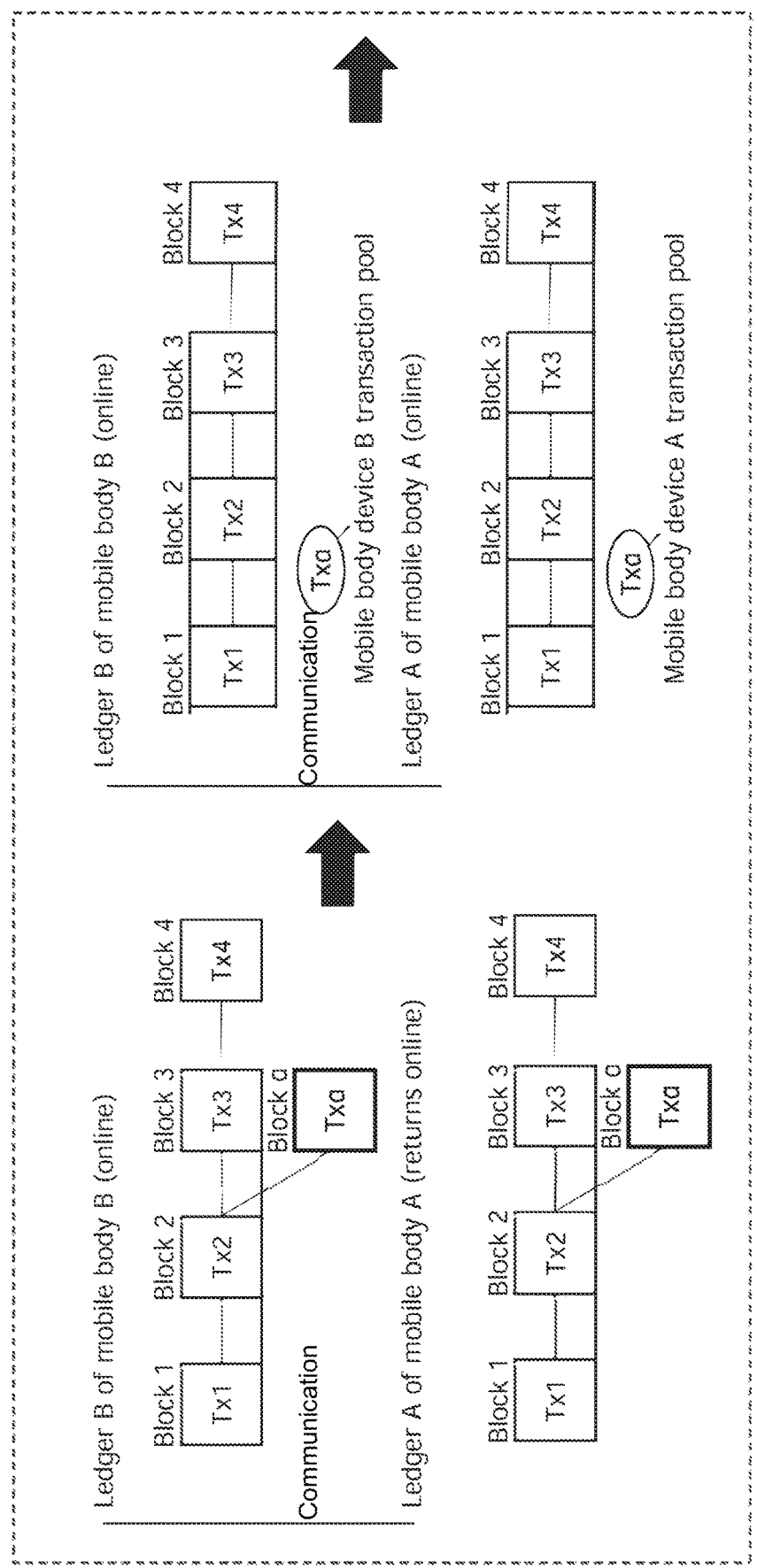
FIG. 3B is a diagram illustrating the behavior of a blockchain when a fork occurs.

FIGS. 3A to 3C are diagrams illustrating the behavior of the blockchains when a fork occurs. FIGS. 3A to 3C conceptually illustrate transaction data stored in ledger A of mobile body A and ledger B of mobile body B. Tx indicates the transaction data. Mobile body A may be bike A, for example.

First, as indicated on the left side of FIG. 3A, when ledger A of mobile body A and ledger B of mobile body B are capable of communicating with another mobile body (not shown) (that is, are online), block 1 containing the same Tx1, and block 2 concatenated with block 1 and containing Tx2, are stored in ledger A and ledger B. Tx2 may correspond to the above-described first reservation Tx, for example.

In this manner, in ledger A and ledger B, when block 2 containing Tx2 is generated, block 2 is concatenated with block 1 generated the previous time. The same blockchain is configured in ledger A and ledger B.

Next, as indicated on the right side of FIG. 3A, when the communication between ledger A of mobile body A and the other mobile body is interrupted (that is, offline), blocks containing different Tx's are stored in ledger A and ledger B. In the example indicated on the right side of FIG. 3A, block a concatenated with block and containing Txa is stored in ledger A, whereas block 3 concatenated with block 2 and containing Tx3 and block 4 concatenated with block 3 and containing Tx4 are stored in ledger B. For example, Tx3 may correspond to the above-described second reservation Tx, and Txa may correspond to the above-described improper reservation Tx.

In this manner, when ledger A goes offline, the communication of ledger A and ledger B is interrupted, and thus ledger A and ledger B update their respective blockchains separately.

Next, as indicated on the left side of FIG. 3B, when ledger A of mobile body A returns to communicability with the other mobile body (goes back online), ledger A and ledger B share the different blockchains with each other. In ledger A and ledger B in the example indicated on the left side of FIG. 3B, the blocks concatenated to block 2 branch, with block a containing Txa being concatenated to block 2, and block 3 containing Tx3 and block 4 containing Tx4 being concatenated to block 2. Hereinafter, the longest blockchain among the blockchains branched and concatenated to a block will be called a "main chain", and other blockchains will be called "sidechains". In the example indicated on the left side of FIG. 3B, block 3 containing Tx3 and block 4 containing Tx4 correspond to the main chain of block 2, and block a containing Txa corresponds to a sidechain of block 2.

In this manner, when ledger A comes back online, the blockchain concatenated to block 2 branches and a fork occurs.

Next, as indicated on the right side of FIG. 3B, block a containing Txa, which is a sidechain of block 2, is deleted, which eliminates the fork. At this time, Txa which had been contained in block a is not deleted, and is stored in the transaction pools of mobile body devices installed in the respective mobile bodies. In the example indicated on the right side of FIG. 3B, Txa is stored in the transaction pools of mobile body device A and mobile body device B.

Next, as indicated in FIG. 3C, in ledger A and ledger B, Txa is included in a new block at the timing at which the new block is generated, and is stored. In the example indicated in FIG. 3C, block 5 containing the same Txa is concatenated to block 4 and stored in ledger A and ledger B.

In this manner, the fork is eliminated, and ledger A and ledger B have the same blockchain. The descriptions will now be resumed from FIG. 2F.

Finally, the user who planned to use bike A improperly returns bike A in step 7, as indicated in FIG. 2F. A fee collection algorithm is then executed, and a use fee for bike A is collected. However, only a fee equivalent to the first reservation and the second reservation is collected, and the fee for the use from 12:15 to 16:15, i.e., the improper use, is not collected.

This is because when ledger A of bike A goes back online in step S6, improper reservation Tx is stored in ledgers A, B, and C after second reservation Tx, and furthermore, the reservation time period of second reservation Tx and the reservation time period of improper reservation Tx are booked. Additionally, the fee collection algorithm does not collect a fee for an improper reservation that is a booked reservation (i.e., a conflicting reservation) and is a later reservation. In this manner, the user is able to use bike A for four hours without paying a fee.

As described above, there is a problem in that when using a blockchain to manage use reservations for an object or the like, the object can be used in an improper manner by exploiting the behavior of the blockchain when a fork occurs.

In response to this, a control method according to one aspect of the present disclosure is a control method for controlling a first node that holds a first distributed ledger in a system utilized to use a service object and including the first node and a plurality of second nodes that each hold a second distributed ledger. The control method includes: executing transmission processing for transmitting first transaction data to each of the plurality of second nodes; counting a total number of the second nodes that successfully communicate with the first node in the transmission processing; and storing the first transaction data in the first distributed ledger when the total number counted is greater than a predetermined number, and skipping storing the first distributed ledger in the first transaction data when the total number counted is not greater than the predetermined number.

Through this, if a first node cannot communicate with a greater number of second nodes, which are other mobile body devices, than a predetermined number, reservation transaction data for using a mobile body cannot be stored in the first distributed ledger, for example. Accordingly, a situation where processing which would lead to the improper use of the service object, such as disabling communication between the first node and the second nodes and causing the first transaction data to be stored only in the first distributed ledger, can be suppressed. Accordingly, the improper use of the service object by exploiting the distributed ledger can be suppressed.

Additionally, for example, when the total number counted is greater than the predetermined number, a first block containing the first transaction data may be generated, and when the total number counted is not greater than the predetermined number, the first block may not be generated.

Accordingly, if it is not possible to communicate with a greater number of the second nodes than the predetermined number, a block containing the obtained first transaction data cannot be generated. Through this, a situation where processing which would lead to the improper use of the service object, such as disabling communication between the first node and the second nodes and causing a block containing the first transaction data to be stored only in the first distributed ledger, can be suppressed. Accordingly, the improper use of the service object by exploiting the blockchain can be suppressed.

Additionally, for example, the first transaction data may include contract information pertaining to a first contract for using the service object Accordingly, a situation where processing which would lead to the improper use of the service object, such as disabling communication between the first node and the second nodes and causing the first transaction data containing contract information pertaining to the first contract to be stored only in the first distributed ledger, can be suppressed.

Additionally, for example, the first node may manage a first blockchain in the first distributed ledger; and a consensus algorithm may be executed between the first node and the plurality of second nodes that successfully communicate with the first node in the transmission processing, and the first block generated may be stored in the first blockchain.

Additionally, for example, the control method may further include executing the first contract included in the first transaction data stored in the first blockchain.

In other words, a contract included in transaction data not stored in the first blockchain is not executed. Accordingly, the improper use of the service object by exploiting the distributed ledger can be suppressed.

Additionally, for example, when the total number counted is not greater than the predetermined number, the transmission processing may be re-executed at least one time while continuing the counting until a predetermined condition is met.

Accordingly, if the number counted in the re-executed transmission processing is greater than the predetermined number, the first transaction data can be stored in the first distributed ledger. This makes it possible to suppress a problem in which the first transaction data is not stored in the first distributed ledger due to temporary communication failures.

Additionally, for example, the predetermined condition may be that the total number counted is greater than the predetermined number or that a predetermined period of time has passed following a start of the counting, and when re-executing the transmission processing is stopped in response to the predetermined period of time passing following the start of the counting, the first transaction data may be deleted.

Accordingly, first transaction data for which the number counted is not greater than the predetermined number even when temporary communication failures are eliminated can be determined to be improper transaction data and deleted.

Additionally, for example, the system may be used in a service for sharing a plurality of mobile bodies; the service object may be each of the plurality of mobile bodies; the first contract may be a use reservation for a first mobile body; and the first transaction data may be reservation transaction data for a user to make a use reservation for the first mobile body through the first node, and may include an ID of the user, information indicating a time period for which the user is to use the first mobile body, and a reservation number.

Additionally, for example, the control method may further include: receiving, by the first node, an unlock request for the first mobile body, the unlock request serving as a request from the user to start using the first mobile body; confirming, by the first node, whether the reservation transaction data corresponding to the unlock request is stored in the first blockchain; and when the reservation transaction data is stored, permitting the user to unlock the first mobile body during the time period.

Through this, it is possible to suppress a situation where communication between the first node and the second nodes is disabled and a block containing the reservation transaction data is stored only in the first distributed ledger. This makes it possible to suppress a situation where the user is permitted to unlock the first mobile body through a reservation made by disabling communication between the first node and the second nodes.

Additionally, for example, the control method may further include: obtaining renting transaction data indicating that the first mobile body has been rented to the user, the renting transaction data including the ID of the user, the reservation number, and a timestamp indicating a time at which the first mobile body was rented to the user; storing a second block containing the renting transaction data in the first blockchain; obtaining return transaction data indicating that the user has returned the first mobile body, the return transaction data including the ID of the user, the reservation number, and a timestamp indicating a time at which the user returned the first mobile body; storing a third block containing the return transaction data in the first blockchain; and collecting a use fee for the first mobile body from the user corresponding to the ID of the user included in the reservation transaction data.

A control device according to one aspect of the present disclosure is a control device that is included in a system utilized to use a service object, and holds a first distributed ledger, the system including the control device and a plurality of other control devices that each hold a second distributed ledger. The control device includes a processor and memory. The processor executes transmission processing for transmitting first transaction data to each of the plurality of other control devices. The processor counts a total number of the other control devices that successfully communicate with the control device in the transmission processing. The processor stores the first transaction data in the first distributed ledger when the total number counted is greater than a predetermined number, and skips storing the first distributed ledger in the first transaction data when the total number counted is not greater than the predetermined number.

A recording medium according to one aspect of the present disclosure is a non-transitory computer-readable recording medium having recorded thereon a program for causing a computer to execute a control method for controlling a first node that holds a first distributed ledger in a system utilized to use a service object and including the first node and a plurality of second nodes that each hold a second distributed ledger. The control method includes: executing transmission processing for transmitting first transaction data to each of the plurality of second nodes; counting a total number of the second nodes that successfully communicate with the first node in the transmission processing; and storing the first transaction data in the first distributed ledger when the total number counted is greater than a predetermined number, and skipping storing the first distributed ledger in the first transaction data when the total number counted is not greater than the predetermined number.

Embodiments will be described hereinafter with reference to the drawings. Note that the following embodiments describe specific examples of the present disclosure. In other words, the numerical values, shapes, materials, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims indicating the broadest interpretation are not absolutely necessary for solving the problem of the present disclosure, and will instead be described as constituent elements constituting more preferred forms.

Embodiment

The configuration of a system according to the present disclosure will be described first. The system includes a first node that manages a first blockchain in a first distributed ledger and a plurality of second nodes that each manages a second blockchain in a second distributed ledger, and is utilized to use a service object. The system may be used for, for example, a service for sharing a plurality of mobile bodies, and in this case, the service object is the plurality of mobile bodies. In the present embodiment, the system accepts a use reservation for a specific mobile body from a user through a terminal (or the mobile body), and rents the specific mobile body to the user according to the accepted use reservation. Upon accepting, from the user through the terminal (or the mobile body), a rental request for the specific mobile body that is reserved, in a reservation time period of the accepted use reservation, the system permits the rental of the specific mobile body to the user. Specifically, upon accepting an unlock request for the specific mobile body from the user, the system confirms the use reservation made in advance and permits the user to unlock the specific mobile body in the reservation time period according to a result of the confirmation.

Note that the mobile body in the sharing service includes, for example, bicycles, motorcycles, automobiles, ships, aircraft, and the like.

Figure 4:
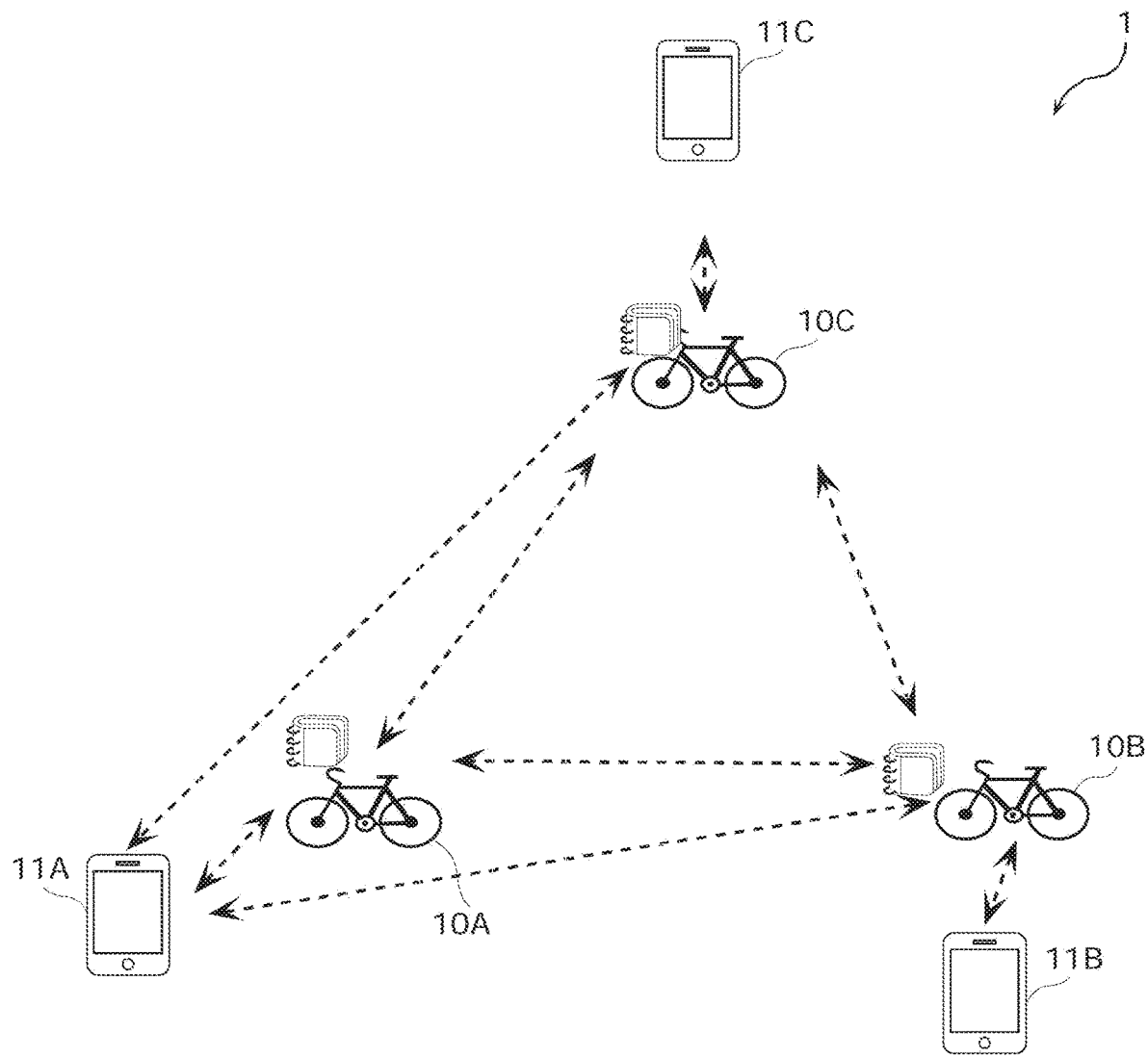
FIG. 4 is a diagram illustrating an example of the configuration of a system according to an embodiment.

FIG. 4 is a diagram illustrating an example of the configuration of the system according to the embodiment.

System 1 includes, for example, mobile bodies 10A to 10C and terminals 11A to 11C, as illustrated in FIG. 4. In this example, each of mobile bodies 10A to 10C holds a distributed ledger for sharing data having the same content. For example, blockchains having the same configuration are shared through these distributed ledgers.

Mobile bodies 10A to 10C and terminals 11A to 11C are connected by a network. The network is, for example, the Internet, a cellular telephone carrier network, or the like, but may be constituted by any communication line or network.

Note that in the following, each of mobile bodies 10A to 10C is also referred to as "mobile body 10", but mobile bodies 10A to 10C may also be referred to as "mobile body A" to "mobile body C". Likewise, although each of terminals 11A to 11C is also referred to as "terminal 11", terminals 11A to 11C may also be referred to as "terminal A" to "terminal C". The distributed ledgers provided in mobile bodies 10A to 10C may also be referred to a "ledger A" to "ledger C".

The system that manages the distributed ledgers that stores the blockchains may be public, private, or consortium-based.

Figure 5A:
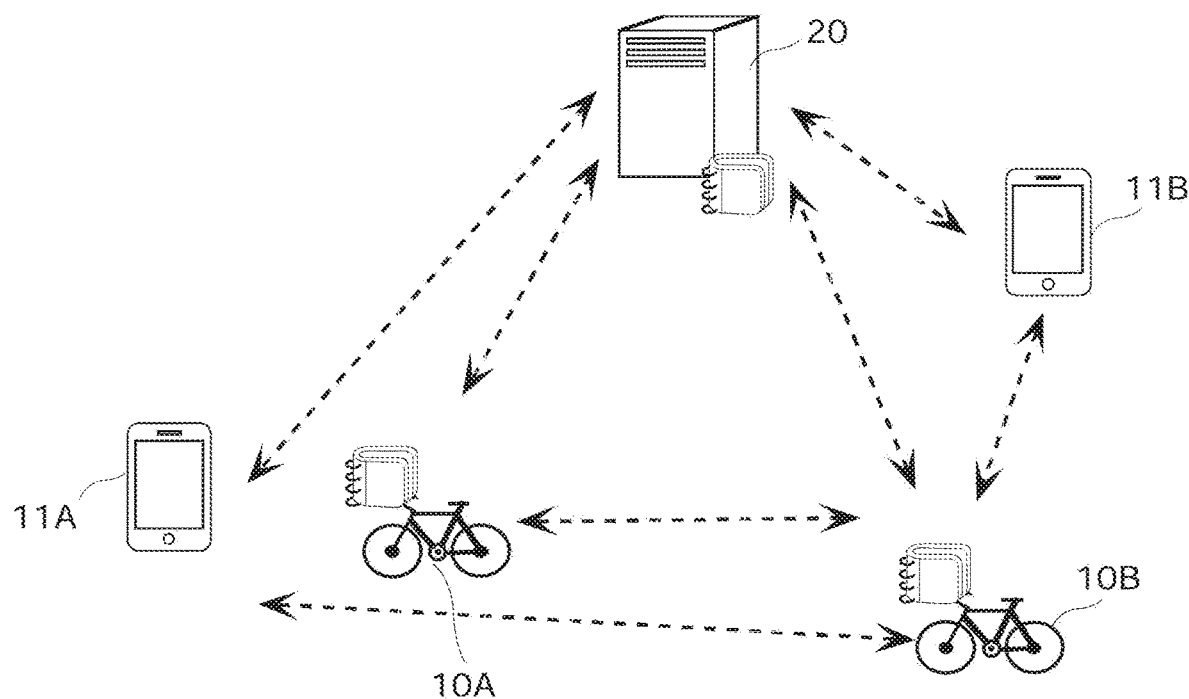
FIG. 5A is a diagram illustrating another example of the configuration of a system according to an embodiment.

FIG. 5A is a diagram illustrating another example of the configuration of the system according to the embodiment.

In FIG. 5A, for example, mobile bodies 10A and 10B, terminals 11A and 11B, and management server 20 are illustrated. In this example, each of mobile bodies 10A and 10B and management server 20 holds a distributed ledger for sharing data having the same content. For example, blockchains having the same configuration are shared through these distributed ledgers.

Mobile bodies 10A and 10B, terminals 11A and 11B, and management server 20 are connected by a network. The network is, for example, the Internet, a cellular telephone carrier network, or the like, but may be constituted by any communication line or network.

Figure 5B:
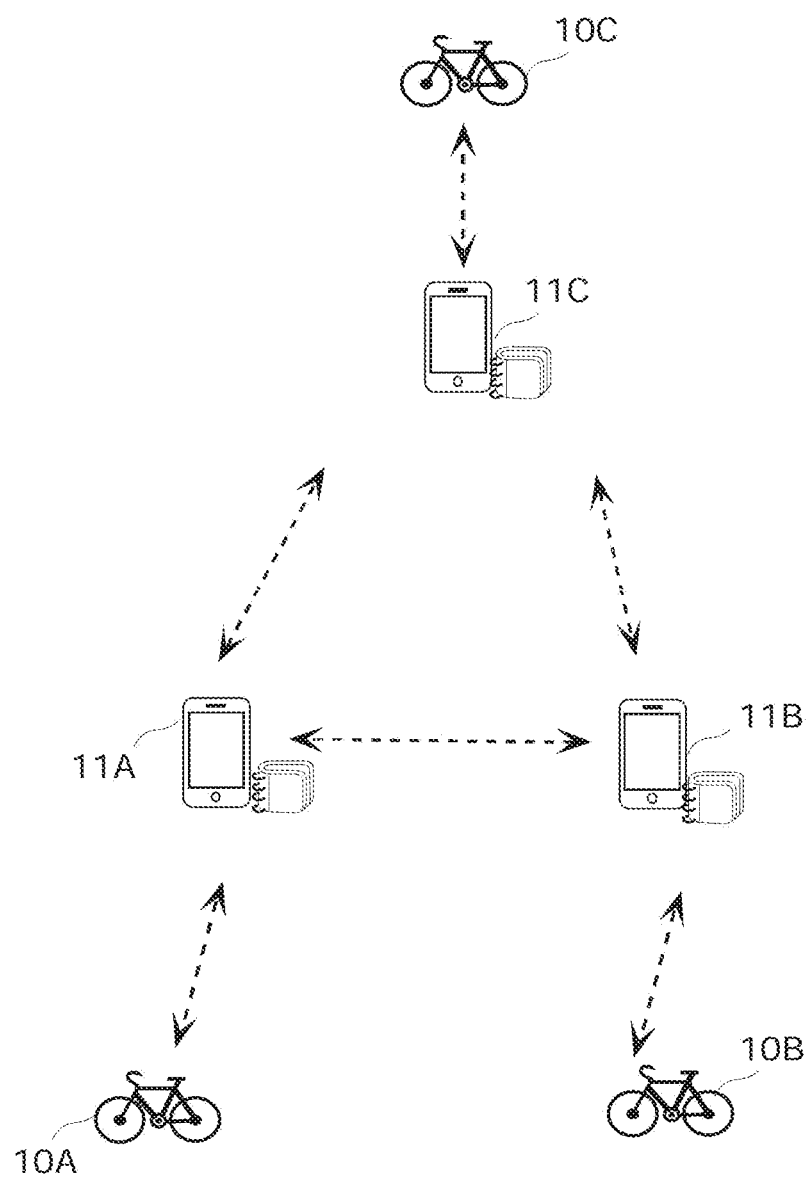
FIG. 5B is a diagram illustrating another example of the configuration of a system according to an embodiment.

FIG. 5B is a diagram illustrating another example of the configuration of the system according to the embodiment.

In FIG. 5B, for example, mobile bodies 10A to 10C and terminals 11A to 11C are illustrated. In this example, each of terminals 11A to 11C holds a distributed ledger for sharing data having the same content. For example, blockchains having the same configuration are shared through these distributed ledgers.

Mobile bodies 10A to 10C and terminals 11A to 11C are connected by a network. The network is, for example, the Internet, a cellular telephone carrier network, or the like, but may be constituted by any communication line or network.

Figure 5C:
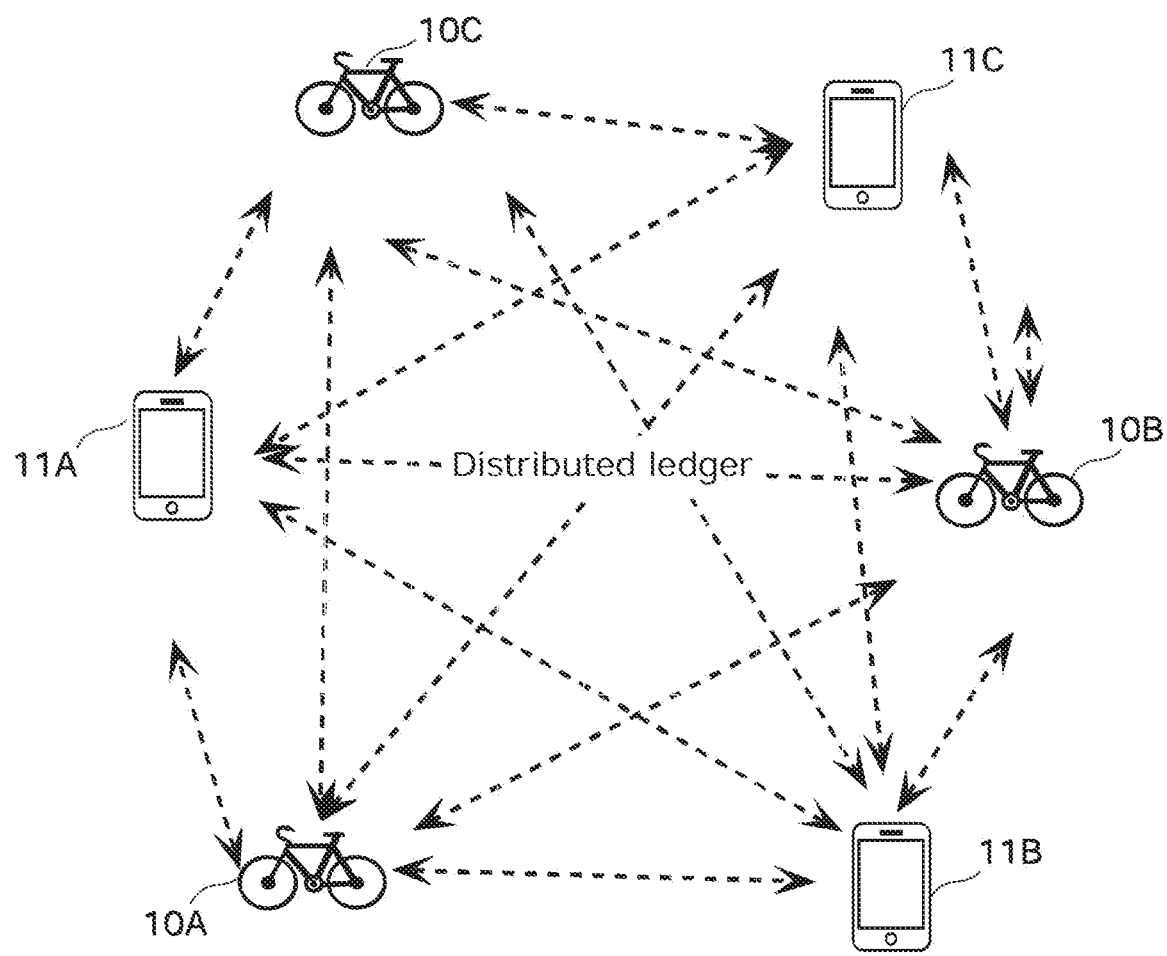
FIG. 5C is a diagram illustrating another example of the configuration of a system according to an embodiment.

FIG. 5C is a diagram illustrating another example of the configuration of the system according to the embodiment.

In FIG. 5C, for example, mobile bodies 10A to 10C and terminals 11A to 11C are illustrated. In this example, each of mobile bodies 10A to 10C and terminals 11A to 11C holds a distributed ledger for sharing data having the same content. For example, blockchains having the same configuration are shared through these distributed ledgers.

Mobile bodies 10A to 10C and terminals 11A to 11C are connected by a network. The network is, for example, the Internet, a cellular telephone carrier network, or the like, but may be constituted by any communication line or network.

Each configuration in the system illustrated in FIG. 4 will be described hereinafter. Note that compared with the system in FIG. 4, the configurations of the systems in FIGS. 5A to 5C differ only in terms of the devices or terminals which hold the distributed ledgers, and can be applied in a similar manner.

First, mobile body devices provided in mobile bodies 10A to 10C will be described. Note that in the following, mobile body devices provided in mobile bodies 10A to 10C may be referred to as "mobile body device A" to "mobile body device C", respectively.

Mobile Body Device 100

Mobile body device 100 is an example of a node that manages a blockchain in a distributed ledger. The node can also be called a "control device".

Mobile body device 100 is an information processing device installed in mobile body 10, and holds a distributed ledger. Mobile body device 100 may be a mobile terminal, such as a smartphone or a tablet.

Figure 6:
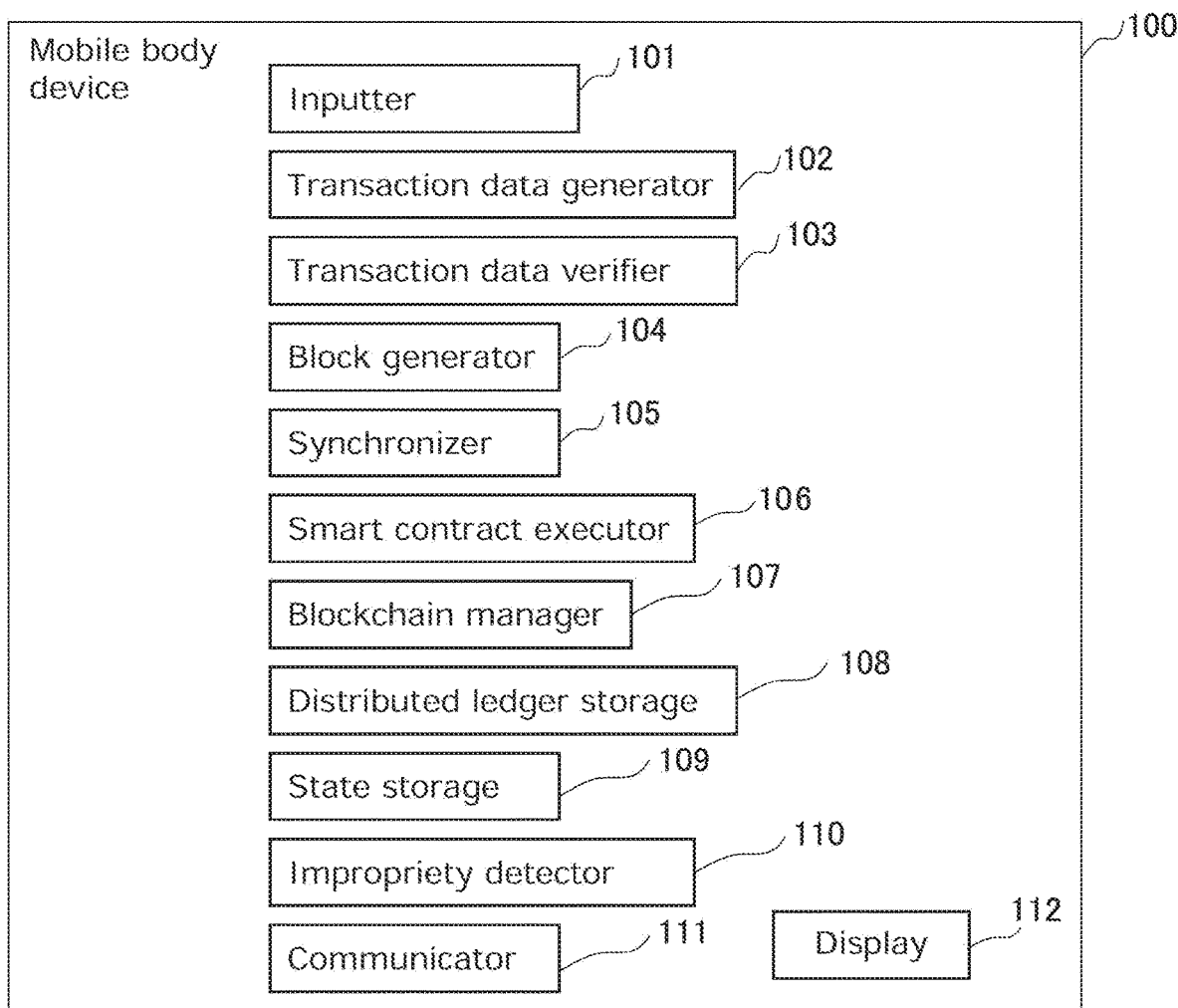
FIG. 6 is a diagram illustrating an example of the configuration of a mobile body device according to an embodiment.

FIG. 6 is a diagram illustrating an example of the configuration of mobile body device 100 according to the embodiment.

Mobile body device 100 according to the present embodiment includes inputter 101, transaction data generator 102, transaction data verifier 103, block generator 104, synchronizer 105, smart contract executor 106, blockchain manager 107, distributed ledger storage 108, state storage 109, impropriety detector 110, communicator 111, and display 112.

Inputter 101

Inputter 101 accepts inputs from a user. Inputter 101 displays the accepted information input in display 112, transmits the accepted information input to transaction data generator 102 or communicator 111, and the like. For example, inputter 101 may accept information input indicating a return from the user.

Transaction Data Generator 102

Transaction data generator 102 generates transaction data.

In the present embodiment, transaction data generator 102 generates renting transaction data that indicates that mobile body 10 has been rented to the user. Specifically, when mobile body 10 has been rented to the user, transaction data generator 102 generates the renting transaction data that indicates that mobile body 10 has been rented to the user. Transaction data generator 102, for example, generates the renting transaction data when an unlock request is accepted from the user and the mobile body is unlocked. The renting transaction data includes a user ID, a reservation number for identifying the use reservation (reservation ID), and a timestamp of the time mobile body 10 was rented to the user.

Additionally, transaction data generator 102 generates return transaction data that indicates that the user has returned mobile body 10. Specifically, when mobile body 10 has been returned by the user, transaction data generator 102 generates the return transaction data that indicates that the user has returned mobile body 10. The return of mobile body 10 by the user may be determined by inputter 101 accepting information input indicating the return from the user; by accepting information input indicating the return from the user through terminal 11 (i.e., communicator 111 receiving information input from terminal 11); by the user locking mobile body 10; or by communicator 111 receiving a notification transmitted by a return facility when the return of the mobile body is accepted at a predetermined return facility for mobile body 10. The return transaction data includes a user ID, a reservation number (reservation ID), and a timestamp of the time the user returned mobile body 10.

Although reservation transaction data is generated by terminal 11A, if mobile body device 100 accepts a use reservation from the user, transaction data generator 102 may generate the reservation transaction data for the use reservation. Specifically, transaction data generator 102 generates the reservation transaction data, which includes reservation information indicating the use reservation, when an input for the use reservation is made by the user through inputter 101. The reservation information includes a user ID, a reservation number for identifying the use reservation (reservation ID), a device ID for identifying mobile body devices 100 which is to be rented to the user, and a reservation time period.

Transaction Data Verifier 103

When communicator 111 receives transaction data, transaction data verifier 103 executes a verification algorithm and verifies the validity of the transaction data. Transaction data verifier 103 then stores the transaction data for which the validity has been verified in a transaction pool region of state storage 109. The transaction data for which the validity has been verified, stored in state storage 109, is transmitted by communicator 111 to another mobile body device 100 as information on the transaction data to be stored in the block to be generated next.

For example, transaction data verifier 103 verifies whether the transaction data received by communicator 111 has been given a digital signature generated by a correct method. Here, the transaction data received by communicator 111 is one of the reservation transaction data, the renting transaction data, and the return transaction data. In other words, transaction data verifier 103 verifies the validity of the reservation transaction data, the renting transaction data, and the return transaction data.

Transaction data verifier 103 need not verify the validity of the transaction data if the transaction data is generated by transaction data generator 102.

Block Generator 104

Block generator 104 generates a block containing the transaction data for which the validity has been verified by transaction data verifier 103. Block generator 104 generates a block containing a predetermined number of transaction data from a plurality of instances of verified transaction data stored in state storage 109. Block generator 104 selects a plurality of blocks for block generation from among a plurality of instances of transaction data that have not yet been subject to block generation. Block generator 104 may delete, from state storage 109, the plurality of instances of transaction data that have already been subject to block generation.

Note that the block generated by block generator 104 of mobile body device 100 may be different from the block generated by block generator 104 of the other mobile body device 100. This is because the verified transaction data stored in state storage 109 differs for each mobile body device 100 depending on the communication state of each mobile body device 100, and the determination criteria for block generation in block generator 104 differ.

Note also that the determination criteria for block generation (rules pertaining to the transaction data to be stored in the block) may be held in each mobile body device 100. Block generator 104 selects a plurality of instances of transaction data from the verified plurality of transaction data stored in state storage 109 based on the determination criteria for block generation held in mobile body device 100 that includes block generator 104, and generates a block containing the selected plurality of instances of transaction data.

Synchronizer 105

Synchronizer 105 synchronizes the blocks generated by block generator 104 with the other mobile body devices 100. In the present embodiment, synchronizer 105 transmits the block generated in block generator 104 via communicator 111 to the other mobile body device 100. Synchronizer 105 then executes a consensus algorithm together with the other mobile body device 100 for the transmitted block. Here, a consensus algorithm called Practical Byzantine Fault Tolerance (PBFT) may be used as the consensus algorithm, or another publicly-known consensus algorithm may be used. For example, Proof of Work (PoW), Proof of Stake (PoS), or the like can be given as publicly-known consensus algorithms. When using PBFT, synchronizer 105 first receives reports from each of the other mobile body devices 100 indicating whether or not the transaction data verification was successful, and determines whether the number of such reports exceeds a predetermined number. When the number of reports exceeds the predetermined number, synchronizer 105 may determine that the validity of the transaction data has been verified by the consensus algorithm. In this manner, synchronizer 105 consents to the transaction data being valid transaction data (i.e., is valid) based on the reports communicated by each of the other mobile body devices 100, and consents to the validity of the block.

Synchronizer 105 also concatenates the consented block to the first blockchain managed in the distributed ledger stored in distributed ledger storage 108.

Smart Contract Executor 106

Smart contract executor 106 operates a smart contract by executing contract code and the like contained in the transaction data stored in the distributed ledger in distributed ledger storage 108.

Reservation SC

In the present embodiment, smart contract executor 106 may operate a reservation smart contract to perform reservation processing for making a use reservation for the mobile body that is the service object. Smart contract executor 106 may cause the reservation processing to be performed when a block containing the reservation transaction data is added to the blockchain in the distributed ledger stored in distributed ledger storage 108.

Fee Collection SC

In the present embodiment, smart contract executor 106 may operate a fee collection smart contract to perform fee calculation processing. Smart contract executor 106 causes the fee calculation processing to be performed when a block containing the return transaction data is added to the blockchain in the distributed ledger stored in distributed ledger storage 108. The fee calculation processing is the same as the processing performed by blockchain manager 107 (described later).

Impropriety Detection SC

Additionally, in the present embodiment, smart contract executor 106 may operate an impropriety detection smart contract to perform impropriety detection processing. Smart contract executor 106 causes the impropriety detection processing to be performed when a block containing the reservation transaction data is added to the first blockchain in distributed ledger storage 108. Note that the impropriety detection processing is the same as the processing performed by impropriety detector 110 (described later).

Impropriety List Generation SC

Additionally, in the present embodiment, smart contract executor 106 may operate an impropriety list generation smart contract to perform impropriety list generation processing. When a block containing improper transaction data or impropriety detection transaction data has been added to the blockchain in the distributed ledger stored in distributed ledger storage 108, smart contract executor 106 causes the execution of processing for adding, to an impropriety list, improper transaction data determined to be improper in the impropriety detection processing or a transaction data ID identifying the improper transaction data.

Here, "impropriety detection transaction data" is transaction data generated when improper transaction data is detected in the impropriety detection processing, and is transaction data for causing the execution of the impropriety list generation processing. In addition to the transaction data ID of the improper transaction data determined to be improper, the impropriety list may include the user ID of the user who made the contract in the improper transaction data (e.g., a use reservation), the time at which the improper transaction data was generated, and the like. The impropriety list may be stored in state information storage 109, or may be stored in memory included in an external device. Through this, the user can search for transaction data determined to be improper transaction data by operating terminal 11, for example.

In this manner, by operating smart contracts, smart contract executor 106 can manage the collection of use fees, the detection of improper reservations, the generation of the impropriety list, and the like in a distributed ledger. It is assumed that the fee collection smart contract, the impropriety detection smart contract, and the impropriety list generation smart contract are generated by the user, for example, by an application in terminal 11, and the blocks containing these smart contracts are stored in the blockchain in advance.

Blockchain Manager 107

Blockchain manager 107 manages the blockchain (referred to as the "first blockchain" hereinafter) managed in the distributed ledger (referred to as the "first distributed ledger") stored in distributed ledger storage 108.

Main Chain and Sidechains

In the present embodiment, blockchain manager 107 obtains the blockchain (referred to as a "second blockchain" hereinafter) managed in the distributed ledger (referred to as a "second distributed ledger" hereinafter) held by the other mobile body device 100 via communicator 111, and compares the obtained second blockchain with the first blockchain managed in the first distributed ledger in distributed ledger storage 108. Blockchain manager 107 determines, through the comparison, whether the plurality of blocks constituting the first blockchain and the plurality of blocks constituting the second blockchain are the same. If the plurality of blocks constituting the first blockchain and the plurality of blocks constituting the second blockchain are not the same, blockchain manager 107 determines which of a number of at least one first different block contained in the first blockchain and not contained in the second blockchain, and a number of at least one second different block contained in the second blockchain and not contained in the first blockchain, is greater (longer). In other words, blockchain manager 107 determines which is a main chain block and which is a sidechain block by comparing the number of at least one first different block with the number of at least one second different block. Note that this determination is made when, as a result of the comparison of the first blockchain and the second blockchain, the first blockchain has at least one first different block and the second blockchain has at least one second different block.

Blockchain manager 107 adds the greater (longer) of the at least one first different block and the at least one second different block after at least one common block that is common between the first blockchain and the second blockchain. Then, after the greater number of blocks, blockchain manager 107 furthermore adds at least one block containing at least one instance of transaction data contained in the lesser (shorter) of the at least one first different block and the at least one second different block. In other words, blockchain manager 107 determines that the greater of the at least one first different block and the at least one second different block is a main chain block, and that the lesser of the at least one first different block and the at least one second different block is a sidechain block. Then, blockchain manager 107 adds the main chain block and an additional block after the at least one common block, in the order of the main chain block and an additional block generated from the at least one instance of transaction data included in the sidechain block.

In this manner, blockchain manager 107 updates the first blockchain managed in the first distributed ledger of distributed ledger storage 108. In other words, blockchain manager 107 compares the first blockchain with the second blockchain managed in the second distributed ledger held by the other mobile body devices 100, and if the blockchains have different configurations, updates the first blockchain such that the configurations are the same as each other.

Note that blockchain manager 107 updates the first blockchain by adding at least one second different block to the first blockchain when, as a result of the comparison of the first blockchain and the second blockchain, the first blockchain does not have at least one first different block.

Here, the "at least one first different block" is, for example, a block, not contained in the second blockchain, produced by being added to the first blockchain in a state where mobile body device 100 cannot communicate with the other mobile body device 100. Note that the number of the at least one first different block is likely to be lower than the number of the at least one second different block when a plurality of other mobile body devices 100 are capable of communicating with each other. This is because the second blockchain is managed in synchronization with the second distributed ledger held by each of the other mobile body devices 100, which is a greater number than mobile body device 100 managing the first blockchain, and it is therefore thought that the plurality of other mobile body devices 100 have more chances to generate blocks than the one mobile body device 100. Accordingly, the at least one first different block generated by the one mobile body device 100 that cannot communicate with the other mobile body devices 100 is more likely to be a sidechain block than a main chain block.

The at least one first different block may have a block containing transaction data including information pertaining to a contract. The contract is, for example, the use reservation for mobile body 10. The transaction data containing the information pertaining to the contract is, for example, the reservation transaction data, the return completion transaction data, the renting transaction data, and the return transaction data.

Note that blockchain manager 107 need not obtain all of the second blockchain, and need only obtain part. For example, "part" of the second blockchain obtained by blockchain manager 107 here is at least one block after the last block after the previous update of the first blockchain.

Renting Processing

Blockchain manager 107 may perform renting processing for renting mobile body 10 to the user. In this case, when communicator 111 receives the unlock request, blockchain manager 107 confirms whether a reservation based on the unlock request has been made by referring to the first blockchain in the first distributed ledger stored in distributed ledger storage 108. Specifically, blockchain manager 107 determines whether reservation transaction data containing the same reservation number as the reservation number contained in the unlock request is stored in the first blockchain. If reservation transaction data containing the same reservation number as the reservation number contained in the unlock request is stored in the first blockchain, blockchain manager 107 determines that a reservation based on the unlock request has been made, and makes an unlock instruction to mobile body 10. By making the unlock instruction, blockchain manager 107 permits the user to unlock mobile body 10. Upon obtaining the unlock instruction, mobile body 10 unlocks mobile body 10 by operating an actuator for unlocking, based on the unlock instruction.

The unlock request is information for unlocking mobile body device 100 which the user has reserved to be used in the use reservation. The unlock request may contain at least the reservation number for specifying the use reservation. The unlock request may further include the user ID of the user that made the use reservation, a mobile body ID of mobile body 10 subject to the use reservation, a device ID of mobile body device 100 that reserved mobile body 10, the reservation time period, and the like.

Note that blockchain manager 107 may make the unlock instruction to the mobile body in which mobile body device 100 is provided when a start time of the reservation time period of the use reservation stored in the first blockchain is reached, instead of receiving the unlock request.

Fee Calculation Processing

Blockchain manager 107 may perform fee calculation processing instead of the smart contract executed by smart contract executor 106. Blockchain manager 107 performs the fee calculation processing using, as a trigger, the passage of a set interval following the previous execution of the processing, or the return transaction data being contained in a block newly concatenated to the first blockchain in the first distributed ledger stored in distributed ledger storage 108. Blockchain manager 107 searches the first blockchain in distributed ledger storage 108, and determines whether at least two instances of transaction data containing at least two instances of contract information that conflict with each other are contained in the first blockchain managed in the first distributed ledger. "At least two instances of contract information that conflict with each other" are, specifically, at least two instances of reservation information that conflict with each other. The at least two instances of reservation information that conflict with each other are, for example, overlapping reservations having the same device ID and including at least two reservation time periods in which the time periods overlap partially.

Note that this determination is the same as a first impropriety determination made by impropriety detector 110 (described later), and thus when a determination result from the first impropriety determination by impropriety detector 110 is present, that determination result may be used. If the first blockchain contains reservation information that conflict with each other, of the at least two instances of transaction data containing the at least two instances of reservation information, blockchain manager 107 fulfils the contract corresponding to the contract information included in the one instance of transaction data added to the first blockchain first. In other words, when there are overlapping reservations, blockchain manager 107 calculates the fee for the most recent use reservation among the overlapping reservations, and executes the fee collection processing for collecting the calculated fee from the user. In other words, for use reservations aside from the most recent use reservation among overlapping reservations, blockchain manager 107 does not calculate the fee, and does not execute the fee collection processing, to prevent collecting the fee from the same user twice.

Note that the use reservation subject to fee calculation is a use reservation for the reservation number contained in the return transaction data stored in the first blockchain, and is a use reservation for which the fee has not yet been calculated. In other words, use reservations for which the fee has already been calculated are excluded from being subject to fee calculation. Additionally, if a use reservation corresponding to the reservation number included in the return transaction data is not stored in the first blockchain, fee calculation corresponding to the return transaction data is not performed.

Distributed Ledger Storage 108

Distributed ledger storage 108 stores the first distributed ledger managed by the first blockchain. In the present embodiment, the first distributed ledger stores the reservation transaction data, the renting transaction data, and the return transaction data.

State Storage 109

State storage 109 is storage that stores the data of the newest version of the distributed ledger. The data stored in state storage 109 is data which can be changed or deleted by a computer. State storage 109 includes, for example, an on-memory region in which variables, functions, and the like for executing smart contracts, and a transaction pool region that stores the transaction data. State storage 109 may store the transaction data for which the validity has been verified by transaction data verifier 103. State storage 109 may store the second blockchain obtained via communicator 111. State storage 109 may store at least one second different block of the second blockchain. State storage 109 may store the first blockchain stored in distributed ledger storage 108. State storage 109 may store the transaction data before being stored in the distributed ledger. State storage 109 may store smart contracts called by the transaction data. State storage 109 may also store variables of the smart contract stored in the distributed ledger. State storage 109 may store the transaction data generated by transaction data generator 102. State storage 109 may store the transaction data received by communicator 111.

State storage 109 may store the above-described data temporarily.

Impropriety Detector 110

Impropriety detector 110 executes the block storage target determination processing when the transaction data verified by transaction data verifier 103 is stored in the transaction pool region of state storage 109. Impropriety detector 110 may perform the block storage target determination processing by executing a block storage target determination algorithm stored in an on-memory region of state storage 109 or in the first distributed ledger of distributed ledger storage 108 in advance. Impropriety detector 110 counts the number of the other mobile body devices 100 that successfully communicated with its own mobile body device 100, and determines whether the counted number is greater than a predetermined number. Impropriety detector 110 permits a block to be generated when the number counted is greater than the predetermined number, but does not permit a block to be generated when the number counted is less than or equal to the predetermined number. In other words, impropriety detector 110 performs the impropriety detection processing for permitting block generation only when the number counted is greater than the predetermined number.

Although impropriety detector 110 is described as permitting block generation only when the number counted is greater than the predetermined number, impropriety detector 110 may permit storage in the first distributed ledger without being limited to permitting block generation. In other words, the sharing of the transaction data using the blockchain need not be performed by each mobile body device 100, and may be performed through the distributed ledgers.

Note that impropriety detector 110 may execute transmission processing for transmitting the transaction data to the plurality of other mobile body devices 100, and determine that communication is possible with the other mobile body devices 100 for which an error did not occur in the transmission processing. In this case, impropriety detector 110 may determine that the number of the other mobile body devices 100 that successfully communicated with its own mobile body device 100 is greater than the predetermined number when the number of the other mobile body devices 100 for which an error did not occur is greater than the predetermined number.

Additionally, upon receiving the transaction data, the plurality of other mobile body devices 100 return a reception completion notification to mobile body devices 100 that transmitted the transaction data. Using this, impropriety detector 110 may execute the transaction data transmission processing and determine that communication is possible with the other mobile body devices that transmitted the reception completion notification in the transmission processing. In this case, impropriety detector 110 may determine that the number of the other mobile body devices 100 that successfully communicated with its own mobile body device 100 is greater than the predetermined number when the number of the other mobile body devices 100 that transmitted the reception completion notification is greater than the predetermined number.

Note that when the counted number of the other mobile body devices 100 that successfully communicated with its own mobile body devices 100 is less than or equal to the predetermined number, impropriety detector 110 may re-execute the transaction data transmission processing at at least one time while continuing the counting, until a predetermined condition is met. The predetermined condition is that the number counted is greater than a predetermined number or that a predetermined period of time has passed following the start of the counting. In other words, impropriety detector 110 stops re-executing the transmission processing when the number counted is detected to have become greater than the predetermined number or when a predetermined period of time has passed following the start of the counting. Impropriety detector 110 permits the generation of a block containing the transaction data subject to the transmission processing when the re-execution of the transmission processing is stopped in response to the counted number being detected to have become greater than the predetermined number. When the re-execution of the transmission processing is stopped due to the predetermined period of time passing following the start of the counting, the counted number does not meet the condition, and thus impropriety detector 110 deletes the transaction data subject to the transmission processing.

In this manner, if communication with more than a predetermined number of other mobile body devices 100 is not possible, a block containing the transaction data transmitted in the transmission processing is not generated, which makes it possible to ensure that transaction data which may lead to mobile body 10 being improperly used is not stored in the blockchain. Through this, even if reservation transaction data which leads to the improper use of mobile body 10 is stored in the transaction pool, that data is not stored in the blockchain, making it possible to ensure that mobile body 10 is not used. It is thus possible to prevent an improper reservation for which a fee will not be collected from being made with the fee calculation algorithm.

Other

Impropriety detector 110 may perform the impropriety detection processing only when communicator 111 has shifted from a state in which communication with other mobile body devices 100 is not possible to a state in which such communication is possible. Additionally, impropriety detector 110 may perform the impropriety detection processing only when communicator 111 has shifted from a state in which communication with other mobile body devices 100 is not possible to a state in which such communication is possible, and when a main chain block and a sidechain block have been generated as a result of blockchain manager 107 comparing the first blockchain and the second blockchain.

Communicator 111

Communicator 111 transmits information to the other mobile body devices 100 or terminal 11, receives information from the other mobile body devices 100 or terminal 11, and the like over the network. Communicator 111 communicates with the other mobile body devices 100 or terminal 11 over the network. Note that this communication may be performed using Transport Layer Security (TLS), and communicator 111 may hold an encryption key for TLS communication.

In the present embodiment, communicator 111 receives the reservation transaction data from terminal 11. Communicator 111 also receives the unlock request from terminal 11. Communicator 111 also receives the transaction data verified by the other mobile body devices 100 from the other mobile body devices 100. Communicator 111 transmits and receives blocks to execute a consensus algorithm together with the other mobile body devices 100.

Display 112

Display 112 displays the information input accepted by inputter 101. Display 112 may display information transmitted from terminal 11. Display 112 may display a display (user interface; UI) for accepting the return of mobile body device 100 from the user.

Terminals 11A to 11C will be described next. Note that terminal 11A to terminal 11C have the same configuration, and will therefore be referred to as "terminal 11".

Terminal 11

Terminal 11 is an example of a terminal used by a user. Terminal 11 may be a personal computer, for example, or may be a mobile terminal such as a smartphone, a tablet, or the like.

Figure 7:
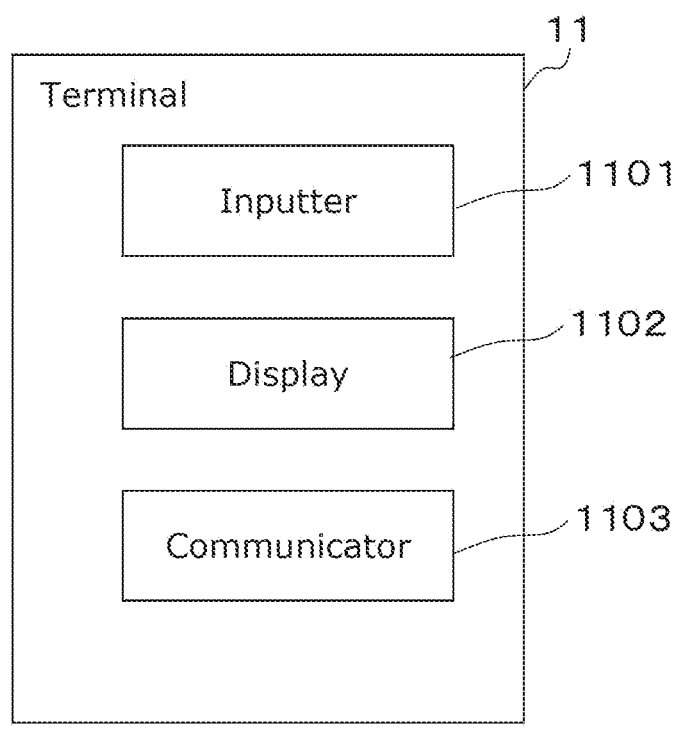
FIG. 7 is a diagram illustrating an example of the configuration of a terminal according to an embodiment.

FIG. 7 is a diagram illustrating an example of the configuration of terminal 11 according to Embodiment 1.

Terminal 11 according to the present embodiment includes inputter 1101, display 1102, and communicator 1103.

Inputter 1101

Inputter 1101 accepts information input through operations made by the user. Inputter 1101 displays the accepted information input in display 1102, transmits the information input to communicator 1103, and the like.

For example, an application for making a use reservation is installed, and inputter 1101 accepts inputs to a display (a UI) for making a use reservation. This display (UI) is displayed in display 1102. Inputter 1101 accepts the digital signature of the user holding terminal 11, and generates the reservation transaction data containing the accepted input for making the use reservation and the digital signature.

Additionally, inputter 1101 accepts inputs to a display (a user interface, or "UI") for making an unlock request to the reserved mobile body device 100. This display (UI) is displayed in display 1102. Inputter 1101 accepts an input for making the unlock request, and generates the unlock request.

Display 1102

Display 1102 displays the information input accepted by inputter 1101. Display 1102 displays a display (a UI) for making a use reservation. Display 1102 also displays a display (a UI) for making an unlock request.

Communicator 1103

Communicator 1103 transmits information to mobile body device 100, receives or is notified of information from mobile body device 100, and the like over the network. Communicator 1103 may also transmit information to another terminal 11, receive information from another terminal 11, and the like over the network.

In this manner, communicator 1103 communicates with mobile body device 100 or another terminal 11 over the network. Note that this communication may be performed using TLS, and communicator 1103 may hold an encryption key for TLS communication.

For example, communicator 1103 transmits the reservation transaction data to mobile body device 100. Communicator 1103 also transmits the unlock request to the reserved mobile body device 100.

Operations, etc. of System

Operations of the system configured as described above will be described next.

First, as a comparative example, normal processing in which processing is performed normally for mobile body A in a service that shares a plurality of mobile bodies will be described, and then processing performed when the blockchain mechanism is exploited to improperly use mobile body A, i.e., improper processing, will be described. The corresponding processing of the present disclosure as a measure against such improper use will then be described.

Comparative Example 1

Processing performed when mobile body A is always in an online state will be described as Comparative Example 1.

Figure 8:
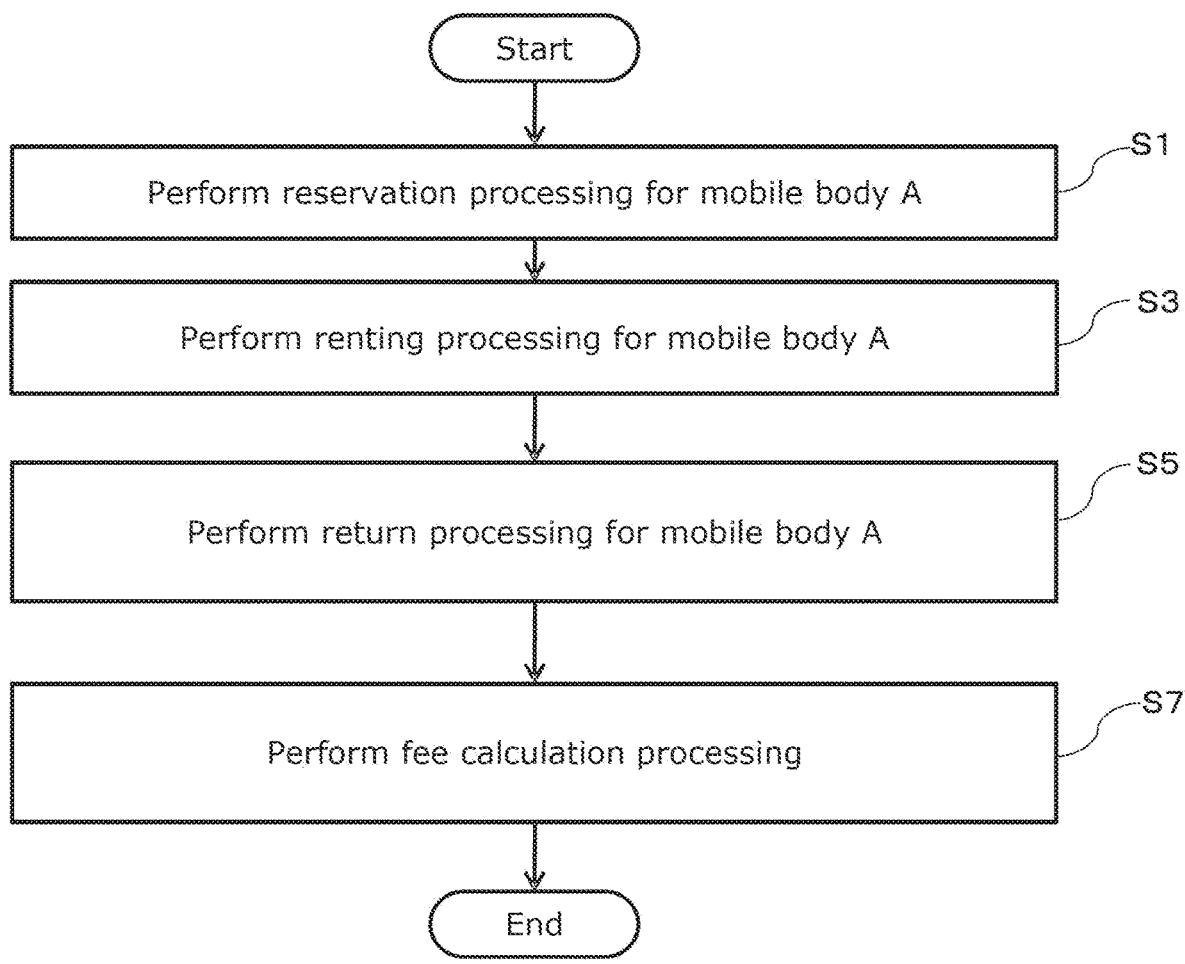
FIG. 8 is a flowchart illustrating an overview of operations in normal processing by a system according to Comparative Example 1.
Figure 9B:
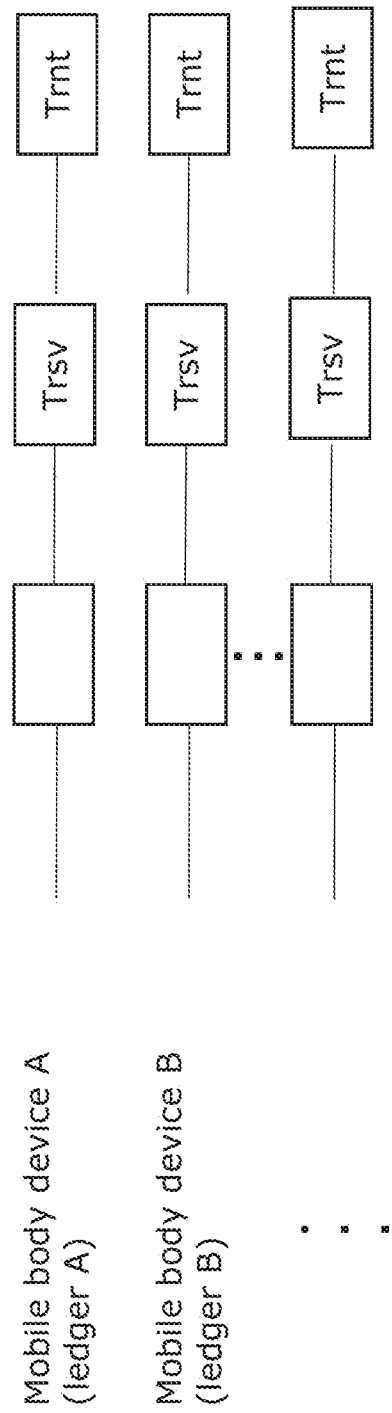
FIG. 9B is a diagram conceptually illustrating blocks of blockchains stored in ledger A and ledger B as a result of the operation of step S3 in FIG. 8.
Figure 9C:
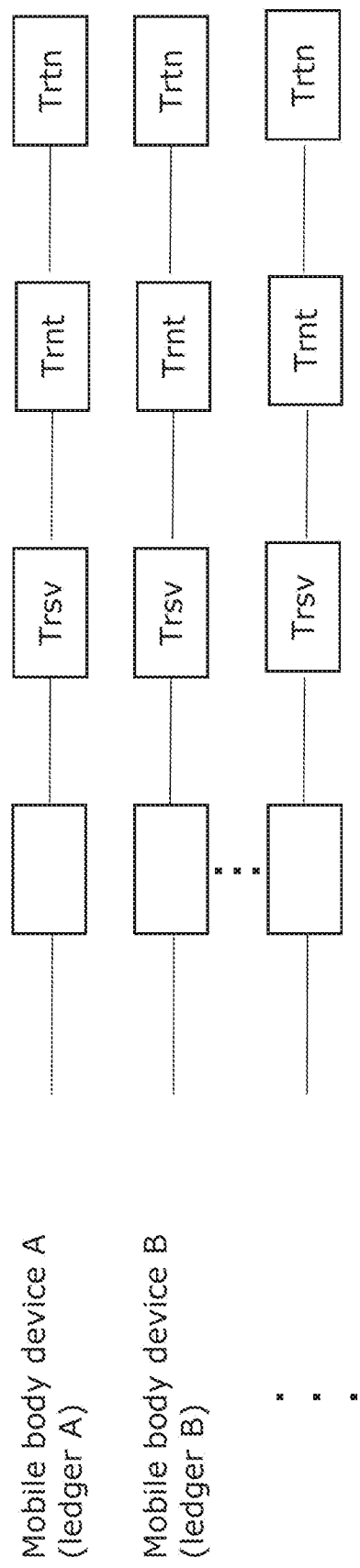
FIG. 9C is a diagram conceptually illustrating blocks of blockchains stored in ledger A and ledger B as a result of the operation of step S5 in FIG. 8.

FIG. 8 is a flowchart illustrating an overview of operations in normal processing by a system according to Comparative Example 1. FIG. 8 illustrates an overview of operations in the normal processing, in which processing is performed normally for mobile body A in a state where mobile body devices A, B, and C are online. FIG. 9A to 9C are diagrams conceptually illustrating blocks of blockchains stored in ledger A of mobile body device A and ledger B of mobile body device B. FIG. 9A is a diagram conceptually illustrating blocks of blockchains stored in ledger A and ledger B as a result of the operation of step 51 in FIG. 8. FIG. 9B is a diagram conceptually illustrating blocks of blockchains stored in ledger A and ledger B as a result of the operation of step S3 in FIG. 8. FIG. 9C is a diagram conceptually illustrating blocks of blockchains stored in ledger A and ledger B as a result of the operation of step S5 in FIG. 8. The following descriptions will assume that a user who wishes to use mobile body A uses terminal A to perform processing in mobile body device A, which is installed in mobile body A.

As illustrated in FIG. 8, first, for example, terminal A communicates with mobile body device A and performs reservation processing for mobile body A in which mobile body device A is installed (S1). More specifically, terminal A communicates with mobile body device A, generates reservation transaction data Trsv for making a use reservation for mobile body A, and transmits the data to mobile body device A. In this case, for example, as illustrated in FIG. 9A, mobile body device A and mobile body device B are capable of communicating with other mobile body devices (that is, are online), and thus a block containing reservation transaction data Trsv for making a use reservation for mobile body A is stored in both ledger A and ledger B.

Next, for example, terminal A communicates with mobile body device A and performs the renting processing for mobile body A (S3). More specifically, terminal A communicates with mobile body device A and transmits an unlock request for mobile body A in order to use mobile body A. Mobile body device A then unlocks mobile body A, and generates renting transaction data Trnt indicating the start of the rental of mobile body A triggered by mobile body A being unlocked. In this case, for example, as illustrated in FIG. 9B, mobile body device A and mobile body device B are capable of communicating with other mobile body devices (that is, are online), and thus a block containing renting transaction data Trnt indicating the start of the rental of mobile body A is stored in both ledger A and ledger B.

Next, for example, terminal A communicates with mobile body device A and performs the return processing for mobile body A (S5). More specifically, user who operated terminal A uses the unlocked mobile body A for the time reserved for use, and then returns mobile body A. When mobile body A is returned, mobile body device A generates return transaction data Trtn indicating the return of mobile body A is complete. In this case, for example, as illustrated in FIG. 9C, mobile body device A and mobile body device B are capable of communicating with other mobile body devices (that is, are online), and thus a block containing return transaction data Trtn indicating the return of mobile body A is complete is stored in both ledger A and ledger B.

Next, the fee calculation processing is performed in mobile body device A and the like (S7). More specifically, in mobile body device A and the like, the fee calculation algorithm is executed, and the fee for using mobile body A is collected for the use reservation made for mobile body A by the user.

Details of the processing of steps S1 to S5 in FIG. 8, i.e., the reservation processing, the renting processing, and the return processing, will be described with reference to sequence charts. The following descriptions also assume that a user who wishes to use mobile body A uses terminal A to perform the reservation processing, the renting processing, and the return processing for mobile body A in mobile body device A, which is installed in mobile body A.

Reservation Processing According to Comparative Example 1

Figure 10:
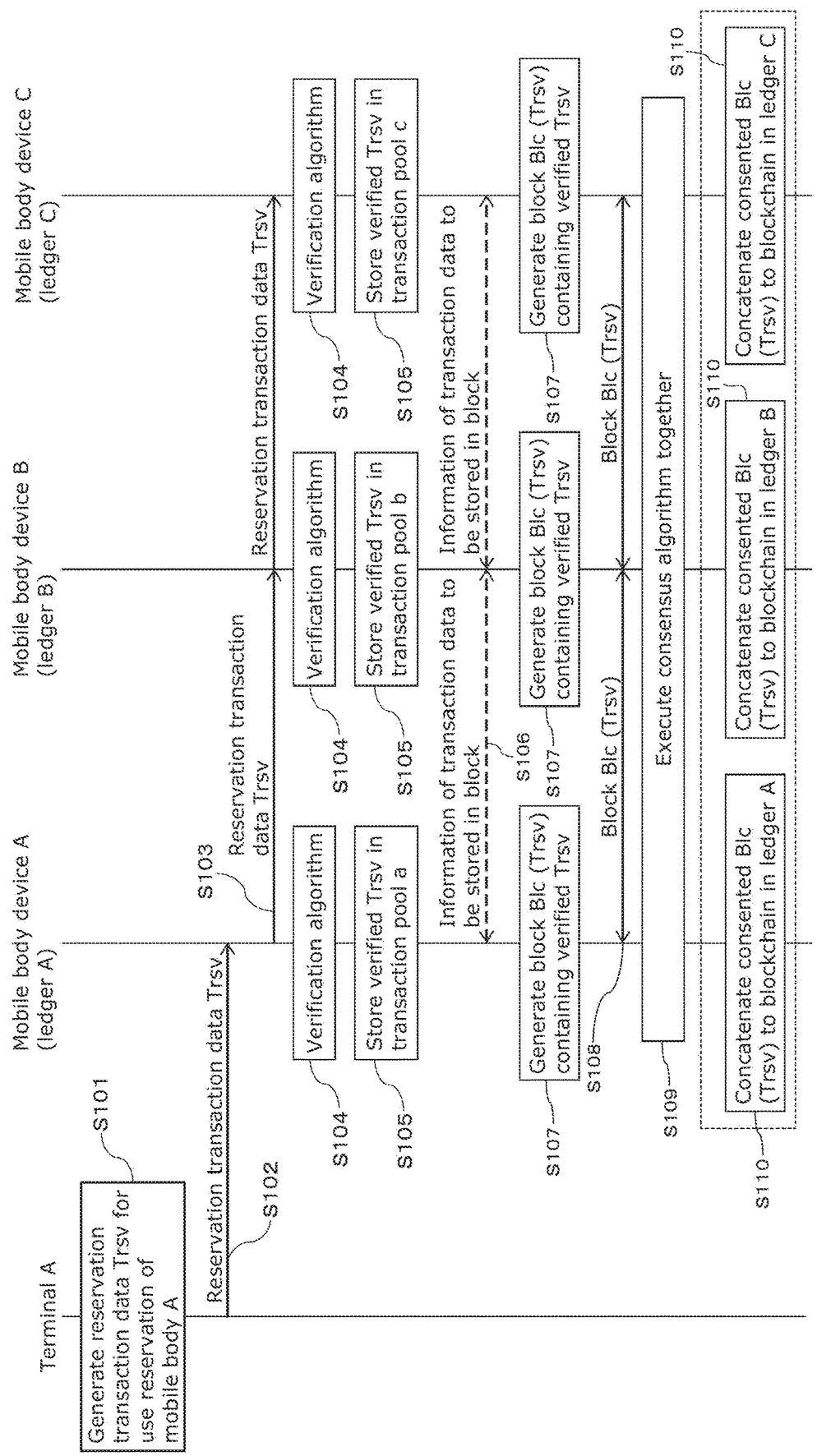
FIG. 10 is a sequence chart illustrating reservation processing by the system according to Comparative Example 1.

FIG. 10 is a sequence chart illustrating reservation processing by the system according to Comparative Example 1.

First, based on an operation by the user who wishes to use mobile body A, terminal A generates reservation transaction data Trsv for making a use reservation for mobile body A (S101). Here, an application is installed as inputter 1101 in terminal A, i.e., in terminal 11A, and the application may generate reservation transaction data Trsv based on the operation by the user.

Next, terminal A communicates with mobile body device A of mobile body A and transmits reservation transaction data Trsv generated in step S101 to mobile body device A (S102).

Next, upon receiving reservation transaction data Trsv transmitted in step S102, mobile body device A forwards reservation transaction data Trsv to mobile body devices B and C, which are other mobile body devices (S103). Through this, mobile body devices B and C obtain reservation transaction data Trsv.

Next, each of mobile body devices A, B, and C executes the verification algorithm that verifies the validity of the obtained reservation transaction data Trsv (S104). Note that the reservation processing ends if the verification of reservation transaction data Trsv fails.

Next, each of mobile body devices A, B, and C stores reservation transaction data Trsv verified by the verification algorithm executed in step S104 in a transaction pool (S105). More specifically, mobile body device A stores the verified reservation transaction data Trsv in transaction pool a, and mobile body device B stores the verified reservation transaction data Trsv in transaction pool b. Mobile body device C stores the verified reservation transaction data Trsv in transaction pool c.

Next, mobile body devices A, B, and C are capable of communicating with each other and therefore exchange information of transaction data to be stored in the block to be generated next (S106). In the example illustrated in FIG. 10, mobile body devices A, B, and C confirm that the verified reservation transaction data Trsv is in the transaction data to be stored in the block to be generated next.

Next, each of mobile body devices A, B, and C generates block Blc (Trsv) containing the verified reservation transaction data Trsv (S107).

Next, each of mobile body devices A, B, and C transmits block Blc (Trsv) generated in step S107 to the other mobile body devices (S108). Through this, each of mobile body devices A, B, and C can communicate, to the other mobile body devices, a report that the validity of reservation transaction data Trsv contained in block Blc (Trsv) was successfully verified.

Next, mobile body devices A, B, and C execute a consensus algorithm together (S109). Specifically, each of mobile body devices A, B, and C consents to reservation transaction data Trsv being valid transaction data (i.e., is valid) based on the reports communicated in step S108, and consents to the validity of block Blc (Trsv). In the example illustrated in FIG. 10, reservation transaction data Trsv contained in block Blc (Trsv) is consented to as valid transaction data (i.e., is valid), and the validity of block Blc (Trsv) is also consented to. Note that the processing of step S107 and step S108 may be performed when executing the consensus algorithm in step S109.

Next, each of mobile body devices A, B, and C concatenates block Blc (Trsv) consented to in step S109 to the blockchain within the distributed ledger (S110). More specifically, mobile body device A concatenates block Blc (Trsv) consented to to the blockchain in ledger A, and mobile body device B concatenates block Blc (Trsv) consented to to the blockchain in ledger B. Mobile body device C concatenates block Blc (Trsv) consented to to the blockchain in ledger C.

Through this, as illustrated in FIG. 9A, ledger A, ledger B, and ledger C all store the block containing reservation transaction data Trsv for making a use reservation for mobile body A.

Renting Processing According to Comparative Example 1

Figure 11:
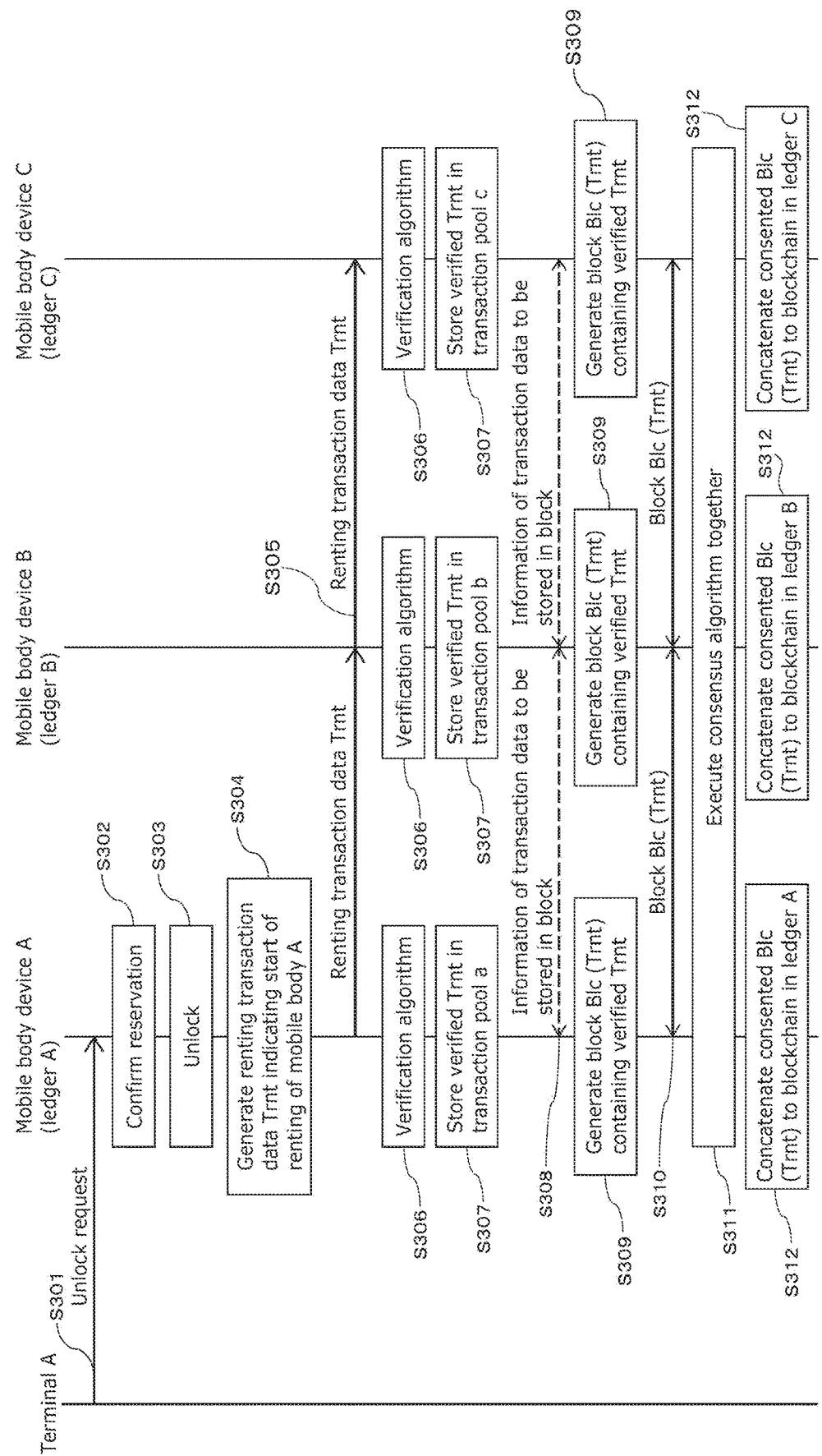
FIG. 11 is a sequence chart illustrating renting processing by the system according to Comparative Example 1.

FIG. 11 is a sequence chart illustrating renting processing by the system according to Comparative Example 1.

First, based on an operation by the user who wishes to use mobile body A, terminal A transmits an unlock request for mobile body A to mobile body device A (S301). Here, an application is installed as inputter 1101 in terminal A, i.e., in terminal 11A, and the application may generate and transmit the unlock request for mobile body A based on the operation by the user. The unlock request for mobile body A contains information enabling the reservation for the corresponding mobile body A to be identified, such as a reservation ID of the user or the like.

Next, upon receiving the unlock request transmitted in step S301, mobile body device A confirms whether there is a reservation corresponding to the unlock request in the blockchain in ledger A (S302). Here, mobile body device A may confirm whether there is a reservation corresponding to the unlock request by confirming whether reservation transaction data Trsv is present in the blockchain in ledger A. In the example illustrated in FIG. 10, the blockchain in ledger A contains reservation transaction data Trsv, and thus mobile body device A can confirm that a reservation corresponding to the unlock request is present in the blockchain in ledger A.

Next, mobile body device A unlocks mobile body A (S303). Here, mobile body device A may unlock mobile body A my making an unlock instruction to a device managing a lock of mobile body A, or may unlock mobile body A directly.

Next, mobile body device A generates renting transaction data Trnt indicating the start of the rental of mobile body A triggered by mobile body A being unlocked (S304). Renting transaction data Trnt contains the user ID of the user using mobile body A and a rental start time. The rental start time is, for example, the time when the mobile body is unlocked.

Next, mobile body device A forwards renting transaction data Trnt to mobile body devices B and C, which are the other mobile body devices (S305). Through this, mobile body devices B and C obtain renting transaction data Trnt.

Next, each of mobile body devices A, B, and C executes the verification algorithm that verifies the validity of renting transaction data Trnt (S306).

Next, each of mobile body devices A, B, and C stores renting transaction data Trnt verified by the verification algorithm executed in step S306 in a transaction pool (S307). More specifically, mobile body device A stores the verified renting transaction data Trnt in transaction pool a, and mobile body device B stores the verified renting transaction data Trnt in transaction pool b. Mobile body device C stores the verified renting transaction data Trnt in transaction pool c.

Next, mobile body devices A, B, and C are capable of communicating with each other and therefore exchange information of transaction data to be stored in the block to be generated next (S308). In the example illustrated in FIG. 11, mobile body devices A, B, and C confirm that the verified renting transaction data Trnt is in the transaction data to be stored in the block to be generated next.

Next, each of mobile body devices A, B, and C generates block Blc (Trnt) containing the verified renting transaction data Trnt (S309).

Next, each of mobile body devices A, B, and C transmits block Blc (Trnt) generated in step S309 to the other mobile body devices (S310). Through this, each of mobile body devices A, B, and C can communicate, to the other mobile body devices, a report that the validity of renting transaction data Trnt contained in block Blc (Trnt) was successfully verified.

Next, mobile body devices A, B, and C execute a consensus algorithm together (S311). Specifically, each of mobile body devices A, B, and C consents to renting transaction data Trnt being valid transaction data (i.e., is valid) based on the reports communicated in step S310, and consents to the validity of block Blc (Trnt). In the example illustrated in FIG. 11, renting transaction data Trnt contained in block Blc (Trnt) is consented to as valid transaction data (i.e., is valid), and the validity of block Blc (Trnt) is also consented to. Note that the processing of step S309 and step S310 may be performed when executing the consensus algorithm in step S311.

Next, each of mobile body devices A, B, and C concatenates block Blc (Trnt) consented to in step S311 to the blockchain within the distributed ledger (S312). More specifically, mobile body device A concatenates block Blc (Trnt) consented to to the blockchain in ledger A, and mobile body device B concatenates block Blc (Trnt) consented to to the blockchain in ledger B. Mobile body device C concatenates block Blc (Trnt) consented to to the blockchain in ledger C.

Through this, as illustrated in FIG. 9B, ledger A, ledger B, and ledger C all store the block containing renting transaction data Trnt, and the start of the renting of mobile body A is recorded.

Return Processing According to Comparative Example 1

Figure 12:
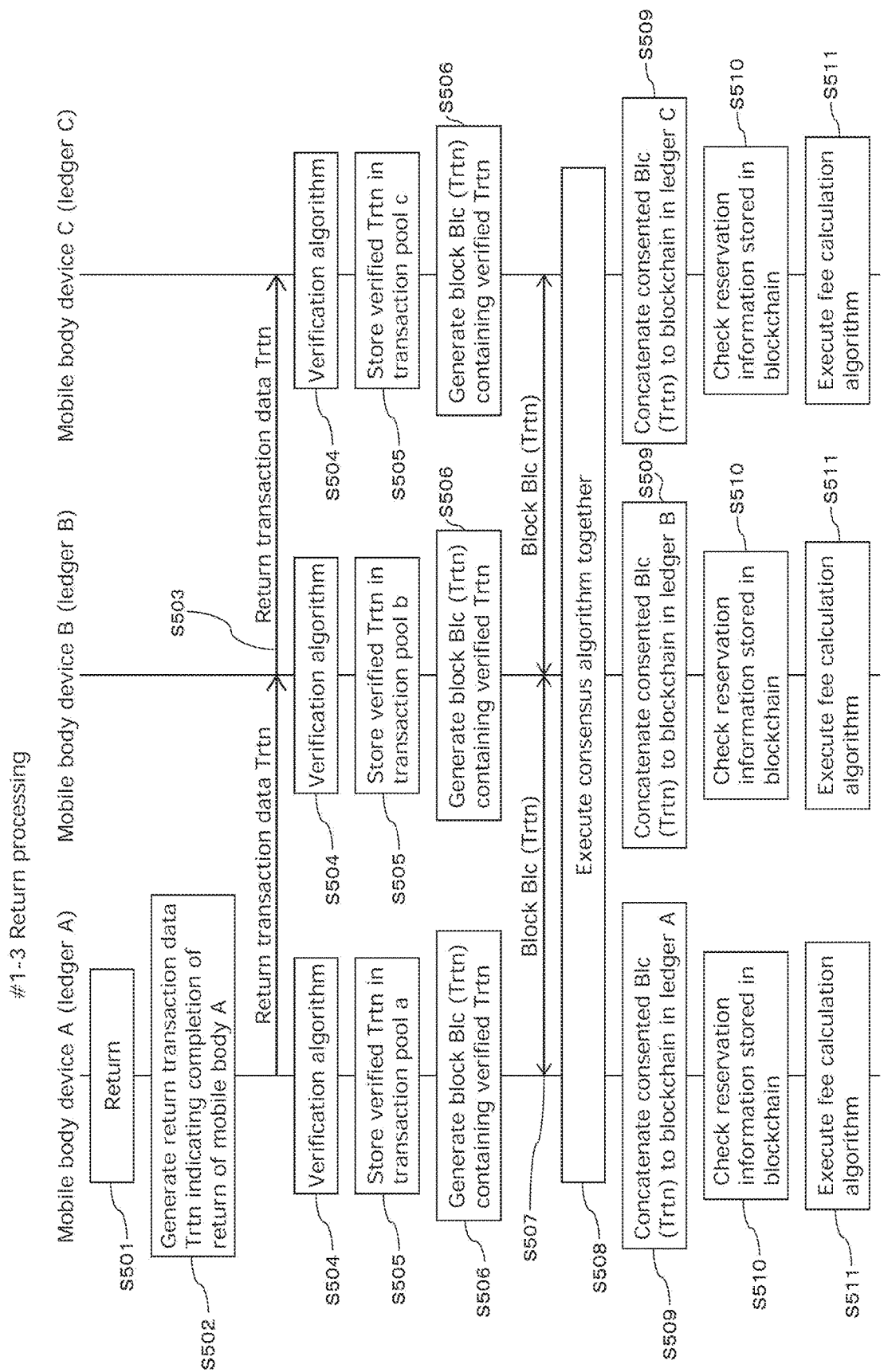
FIG. 12 is a sequence chart illustrating return processing by the system according to Comparative Example 1.

FIG. 12 is a sequence chart illustrating return processing by the system according to Comparative Example 1.

First, when mobile body A is returned by the user who used mobile body A, mobile body device A confirms that mobile body A has been returned (S501). Here, for example, user A can return mobile body A by placing mobile body A at a predetermined return facility, pressing a "return" button in the UI of mobile body device A after placing mobile body A at a predetermined location, or the like. User A may return mobile body A by pressing a "return" button in a UI displayed in terminal A. Mobile body device A may confirm that mobile body A has been returned in response to the input of a message indicating that mobile body A has been returned from the predetermined return facility or from terminal A, or may confirm that mobile body A has been returned in response to the "return" button in the UI of mobile body device A being pressed.

Next, mobile body device A generates return transaction data Trtn indicating the return of mobile body A is complete, triggered by confirming that mobile body A has been returned (S502). Return transaction data Trtn contains the user ID of the user who used mobile body A, a return time, and a reservation ID from when mobile body A was used. The return time is, for example, the time when mobile body device A confirms that mobile body A has been returned. Note that return transaction data Trtn is not limited to containing the reservation ID, and may contain any information that makes it possible to calculate the use fee of mobile body A for the user.

Next, mobile body device A forwards return transaction data Trtn to mobile body devices B and C, which are the other mobile body devices (S503). Through this, mobile body devices B and C obtain return transaction data Trtn.

Next, each of mobile body devices A, B, and C executes the verification algorithm that verifies the validity of the obtained return transaction data Trtn (S504).

Next, each of mobile body devices A, B, and C stores return transaction data Trtn verified by the verification algorithm executed in step S504 in a transaction pool (S505). More specifically, mobile body device A stores the verified return transaction data Trtn in transaction pool a, and mobile body device B stores the verified return transaction data Trtn in transaction pool b. Mobile body device C stores the verified return transaction data Trtn in transaction pool c. Note that although not illustrated here, mobile body devices A, B, and C are capable of communicating with each other and therefore exchange information of transaction data to be stored in the block to be generated next. In the example illustrated in FIG. 12, mobile body devices A, B, and C confirm that the verified return transaction data Trtn is in the transaction data to be stored in the block to be generated next.

Next, each of mobile body devices A, B, and C generates block Blc (Trtn) containing the verified return transaction data Trtn (S506).

Next, each of mobile body devices A, B, and C transmits block Blc (Trtn) generated in step S506 to the other mobile body devices (S507). Through this, each of mobile body devices A, B, and C can communicate, to the other mobile body devices, a report that the validity of return transaction data Trtn contained in block Blc (Trtn) was successfully verified.

Next, mobile body devices A, B, and C execute a consensus algorithm together (S508). Specifically, each of mobile body devices A, B, and C consents to return transaction data Trtn being valid transaction data (i.e., is valid) based on the reports communicated in step S507, and consents to the validity of block Blc (Trtn). In the example illustrated in FIG. 12, return transaction data Trtn contained in block Blc (Trtn) is consented to as valid transaction data (i.e., is valid), and the validity of block Blc (Trtn) is also consented to. Note that the processing of step S506 and step S507 may be performed when executing the consensus algorithm in step S508.

Next, each of mobile body devices A, B, and C concatenates block Blc (Trnt) consented to in step S508 to the blockchain within the distributed ledger (S509). More specifically, mobile body device A concatenates block Blc (Trtn) consented to to the blockchain in ledger A, and mobile body device B concatenates block Blc (Trtn) consented to to the blockchain in ledger B. Mobile body device C concatenates block Blc (Trtn) consented to to the blockchain in ledger C. Through this, as illustrated in FIG. 9C, ledger A, ledger B, and ledger C all store the block containing return transaction data Trtn, and the completion of the return of mobile body A is recorded.

Next, each of mobile body devices A, B, and C checks the reservation information stored in the blockchain (S510). More specifically, by concatenating the block containing return transaction data Trtn to the blockchain in its own ledger, each of mobile body devices A, B, and C causes the reservation smart contract to be executed, and confirms that reservation transaction data Trsv is present as the reservation information stored in the blockchain.

Next, each of mobile body devices A, B, and C executes the fee calculation algorithm (S511). In the example illustrated in FIG. 12, the fee for using mobile body A is collected. Here, the fee calculation algorithm may be included in the reservation smart contract, or may be included in the fee collection smart contract. Each of mobile body devices A, B, and C may execute the fee collection smart contract or the reservation smart contract, and cause processing for collecting the fee corresponding to the use reservation for mobile body A contained in reservation transaction data Trsv to be performed. Although the execution of the fee calculation algorithm is described as part of the return processing in the example illustrated in FIG. 12, the configuration is not limited thereto. This may be performed in the fee calculation processing illustrated in FIG. 8.

Fee Calculation Processing According to Comparative Example

Next, details of the fee calculation processing in step S7 indicated in FIG. 8 will be described with reference to a flowchart.

FIG. 13 is a flowchart illustrating details of fee calculation processing by a system according to a comparative example. The following will describe a case where mobile body device A performs the processing as a representative example.

In step S7 indicated in FIG. 8, first, mobile body device A confirms whether there is a trigger for fee collection (S71). This trigger may be a set interval passing, or may be return transaction data Trtn contained in a block newly concatenated to the blockchain in ledger A.

When there is a trigger in step S71 (Yes in S71), mobile body device A searches within the blockchain in ledger A (S72). Note that when there is no trigger in step S71 (No in S71), mobile body device A returns to step S71.

Next, mobile body device A confirms whether there is another reservation in the blockchain of ledger A (i.e., overlapping reservations) (S73).

If there is an overlapping reservation in step S73 (Yes in S73), it is confirmed whether the reservation, i.e., the reservation ID contained in return transaction data Trtn, is the most recent among the overlapping reservations (S74). Note that when there are no overlapping reservations in step S73 (No in S73), the sequence returns to step S75.

When the reservation is the most recent among the overlapping reservations in step S74 (Yes in S74), mobile body device A executes the fee calculation algorithm (S75). Through this, the fee is calculated for the reservation, i.e., the reservation ID indicating the use reservation for mobile body A contained in return transaction data Trtn. Note that if the reservation is not the most recent among the overlapping reservations in step S74 (No in S74), the fee calculation processing ends.

Next, mobile body device A executes the fee collection processing (S76). Through this, the fee for using mobile body A is collected for the reservation ID indicating the use reservation for mobile body A made by the user. Processing for collecting the fee for the use reservation for mobile body A contained in reservation transaction data Trsv may be performed.

Comparative Example 2

Comparative Example 1 described a case where the reservation processing, renting processing, and return processing are performed normally for mobile body A, in the service which shares a plurality of mobile bodies, when mobile body A is in an online state. Processing performed when, with mobile body device A in an offline state, the reservation processing, renting processing, and return processing are performed normally for mobile body A, and mobile body device A then goes back online, will be described next as Comparative Example 2.

Figure 15A:
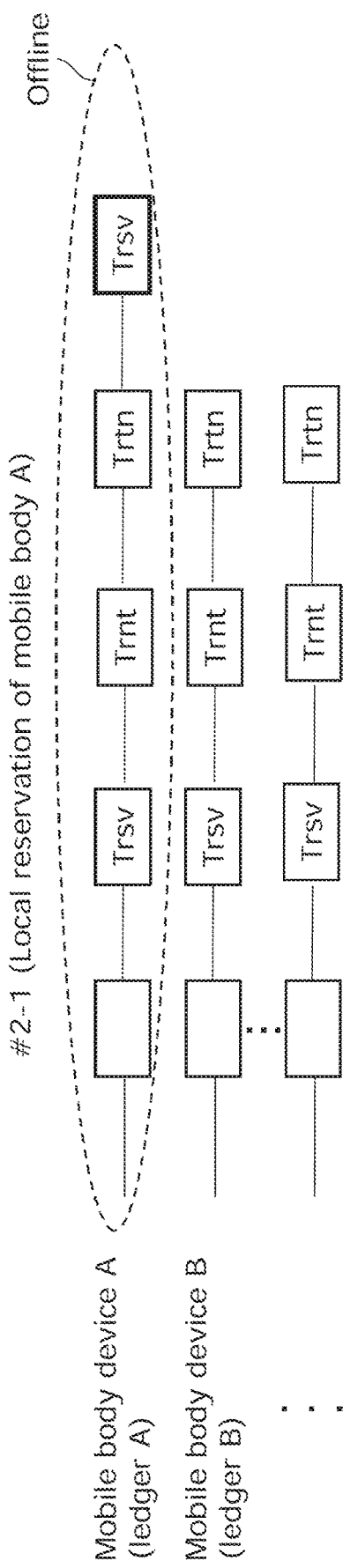
FIG. 15A is a diagram conceptually illustrating blocks of a blockchain stored in ledger A as a result of the operation of step S1A in FIG. 14.
Figure 15B:
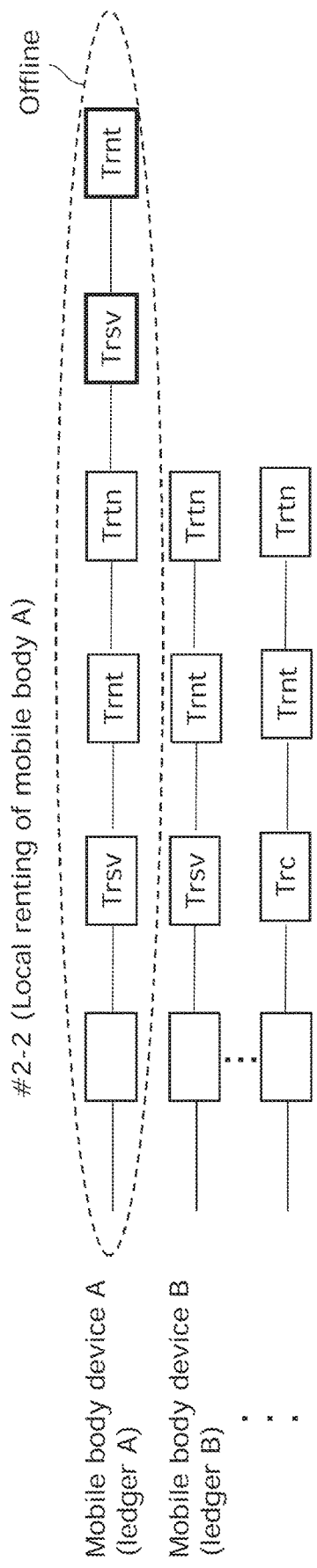
FIG. 15B is a diagram conceptually illustrating blocks of a blockchain stored in ledger A as a result of the operation of step S3A in FIG. 14.
Figure 15C:
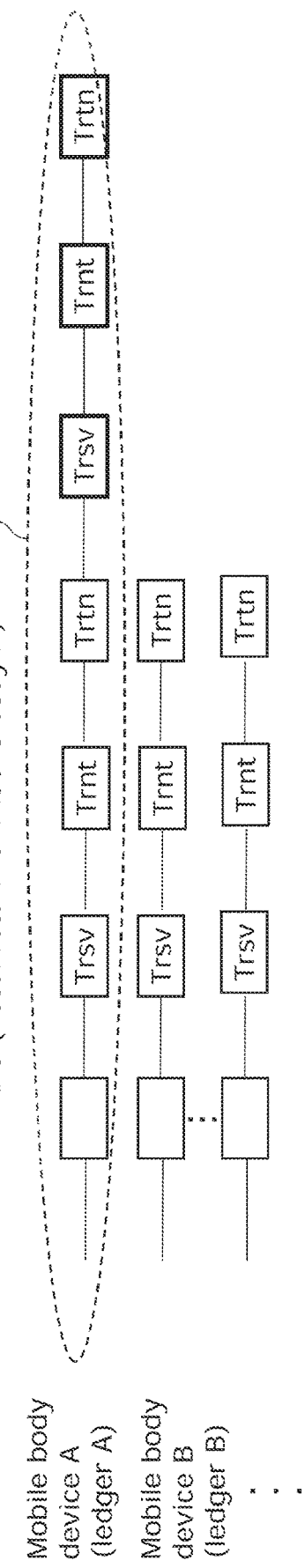
FIG. 15C is a diagram conceptually illustrating blocks of a blockchain stored in ledger A as a result of the operation of step S5A in FIG. 14.
Figure 16:
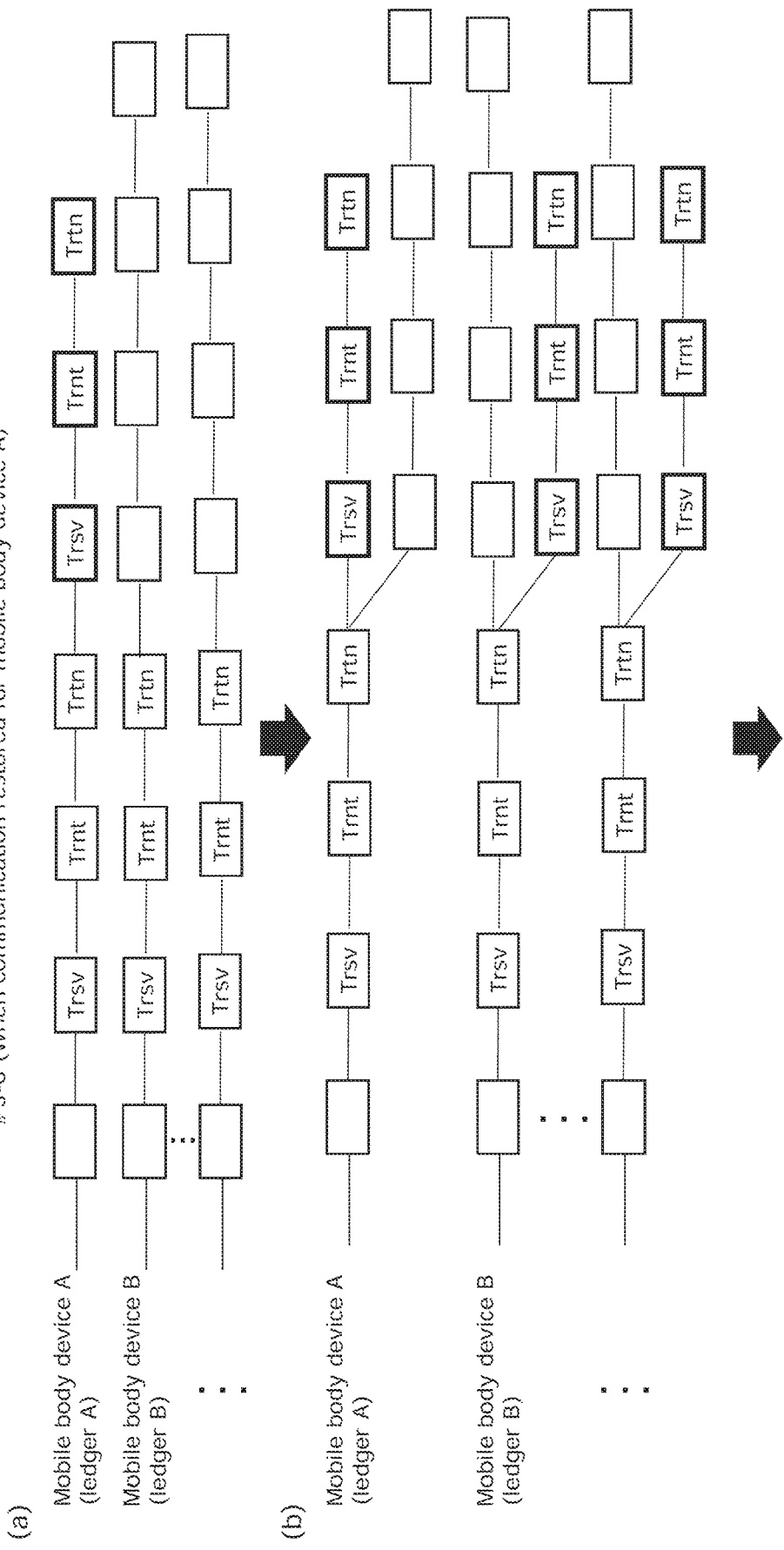
FIG. 16 is a diagram conceptually illustrating blocks of blockchains stored in ledger A and ledger B as a result of the operation of step S6A in FIG. 14.
Figure 17:
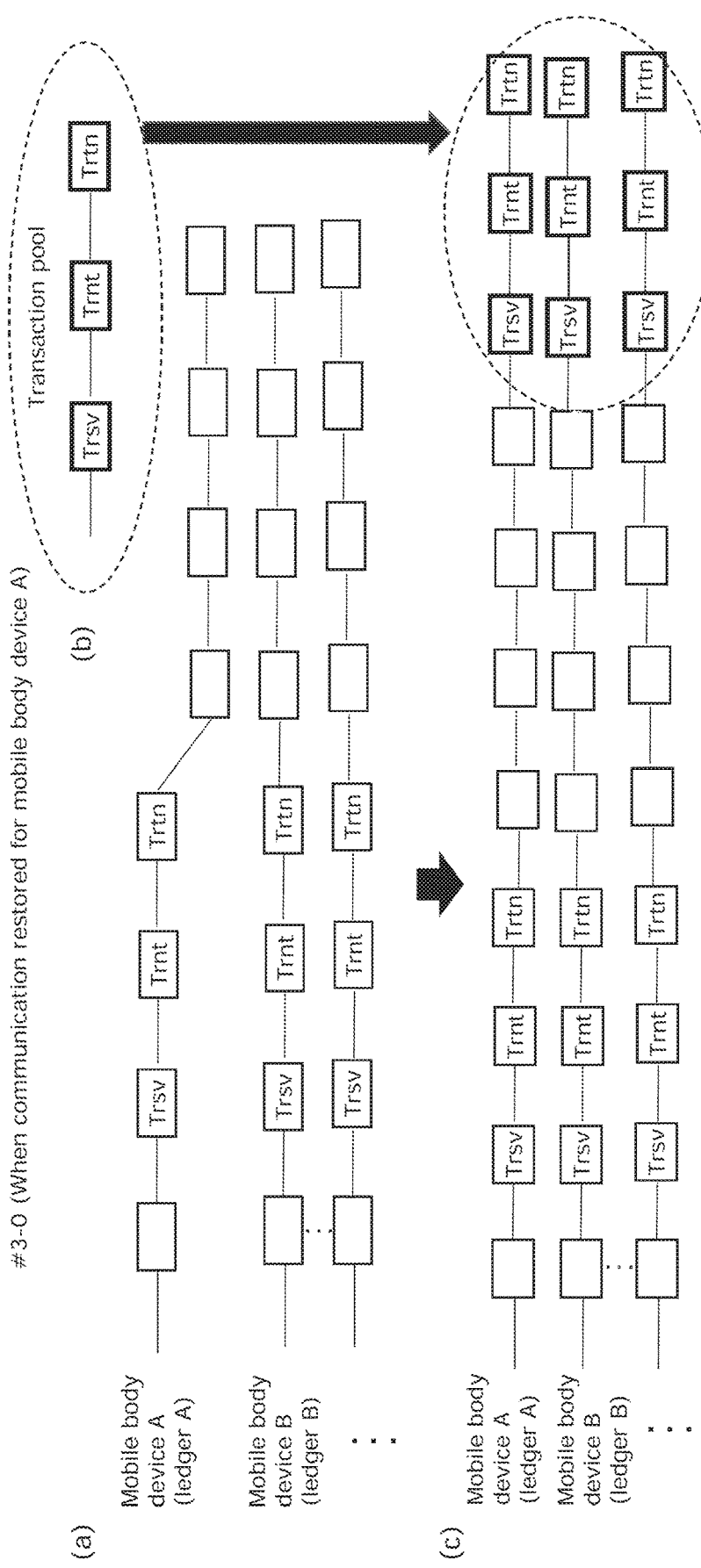
FIG. 17 is a diagram conceptually illustrating blocks of blockchains stored in ledger A and ledger B as a result of the operation of step S6A in FIG. 14.

FIG. 14 is a flowchart illustrating an overview of operations in normal processing by a system according to Comparative Example 2. FIG. 14 illustrates an overview of operations in normal processing in which the reservation processing, renting processing, and return processing for mobile body A are performed normally, with mobile body device A in an offline state and mobile body devices B and C in an online state. FIGS. 15A to 17 are diagrams conceptually illustrating blockchains stored in ledger A of mobile body device A and ledger B of mobile body device B. FIG. 15A is a diagram conceptually illustrating blocks of a blockchain stored in ledger A as a result of the operation of step S1A in FIG. 14. FIG. 15B is a diagram conceptually illustrating blocks of a blockchain stored in ledger A as a result of the operation of step S3A in FIG. 14. FIG. 15C is a diagram conceptually illustrating blocks of a blockchain stored in ledger A as a result of the operation of step S5A in FIG. 14. FIGS. 16 and 17 are diagrams conceptually illustrating blocks of blockchains stored in ledger A and ledger B as a result of the operation of step S6A in FIG. 14. The following descriptions will assume that a user who wishes to use mobile body A uses terminal A to perform processing in mobile body device A, which is installed in mobile body A.

As illustrated in FIG. 14, first, for example, terminal A communicates with mobile body device A, which is not capable of communicating with the other mobile body devices B and C (i.e., is offline), and performs the reservation processing for mobile body A in which mobile body device A, which is offline, is installed (S1A). In other words, terminal A performs reservation processing for locally reserving mobile body A with mobile body device A, which is offline. More specifically, terminal A communicates with mobile body device A, generates reservation transaction data Trsv for making a use reservation for mobile body A, and transmits the data to mobile body device A. In this case, for example, as illustrated in FIG. 15A, mobile body device A and mobile body device B not capable of communicating (that is, are offline), and thus a block containing reservation transaction data Trsv for making a use reservation for mobile body A is stored in ledger A only.

Next, for example, terminal A communicates with mobile body device A, which is offline, and performs the renting processing for mobile body A (S3A). In other words, terminal A performs renting processing for locally renting mobile body A with mobile body device A, which is offline. More specifically, terminal A can communicate with mobile body device A and transmit an unlock request for mobile body A in order to use mobile body A. Mobile body device A then unlocks mobile body A, mobile body A is unlocked, and mobile body device A generates renting transaction data Trnt indicating the start of the rental of mobile body A. In this case, for example, as illustrated in FIG. 15B, mobile body device A is offline, and thus a block containing renting transaction data Trnt indicating the start of the rental of mobile body A is stored in ledger A only.

Next, for example, terminal A communicates with mobile body device A, which is offline, and performs the return processing for mobile body A (S5A). In other words, terminal A performs return processing for locally returning mobile body A with mobile body device A, which is offline. More specifically, user who operated terminal A uses the unlocked mobile body A for the time reserved for use, and then returns mobile body A. When mobile body A is returned, mobile body device A generates return transaction data Trtn indicating the return of mobile body A is complete. In this case, for example, as illustrated in FIG. 15C, mobile body device A is offline, and thus a block containing return transaction data Trtn indicating the completion of the return of mobile body A is stored in ledger A only.

Assume that mobile body device A then goes back online. Then, when mobile body device A is restored to an online state, return processing is performed in the system (S6A). More specifically, in steps S1A to SSA, mobile body device A cannot communicate with mobile body device B (is offline), as described above. Accordingly, as indicated by (a) in FIG. 16, different blocks are concatenated to the blockchains in ledger A and ledger B at the point in time when mobile body device A goes back online. Next, as indicated by (b) in FIG. 16, when mobile body device A goes back online, a fork occurs due to ledger A of mobile body device A and ledger B of mobile body device B sharing different blockchains. Here, the block concatenated to the blockchain in ledger A of mobile body device A, which is offline, corresponds to a sidechain block, and the block concatenated to the blockchain in ledger B of mobile body device B, which is online, corresponds to a main chain block. Accordingly, as indicated by (a) and (b) in FIG. 17, in ledger A of mobile body device A and ledger B of mobile body device B, the fork is eliminated by deleting the sidechain block and storing the transaction data contained in the sidechain block in the transaction pool. Note that in (b) in FIG. 17, reservation transaction data Trsv, renting transaction data Trnt, and return transaction data Trtn are stored in the transaction pool. Then, as indicated by (c) in FIG. 17, in the blockchains in ledger A of mobile body device A and ledger B of mobile body device B, a block containing the transaction data stored in the transaction pool is generated and concatenated when a new block is generated.

Next, the fee calculation processing is performed in mobile body device A and the like (S7). The fee calculation processing in step S7 is as described above, and will therefore not be described here Details of the reservation processing of step S1A, the renting processing of step S3A, and the return processing of step S5A indicated in FIG. 14, i.e., the details of the processing of the local reservation, the local renting, and the local return, will be described with reference to sequence charts. Details of processing performed when communication is restored for mobile body device A in step S6A indicated in FIG. 14 will also be described with reference to sequence charts. The following descriptions assume that a user who wishes to use mobile body A uses terminal A to perform the reservation processing, the renting processing, and the return processing for mobile body A in mobile body device A, which is installed in mobile body A.

Reservation Processing According to Comparative Example 2

Figure 18:
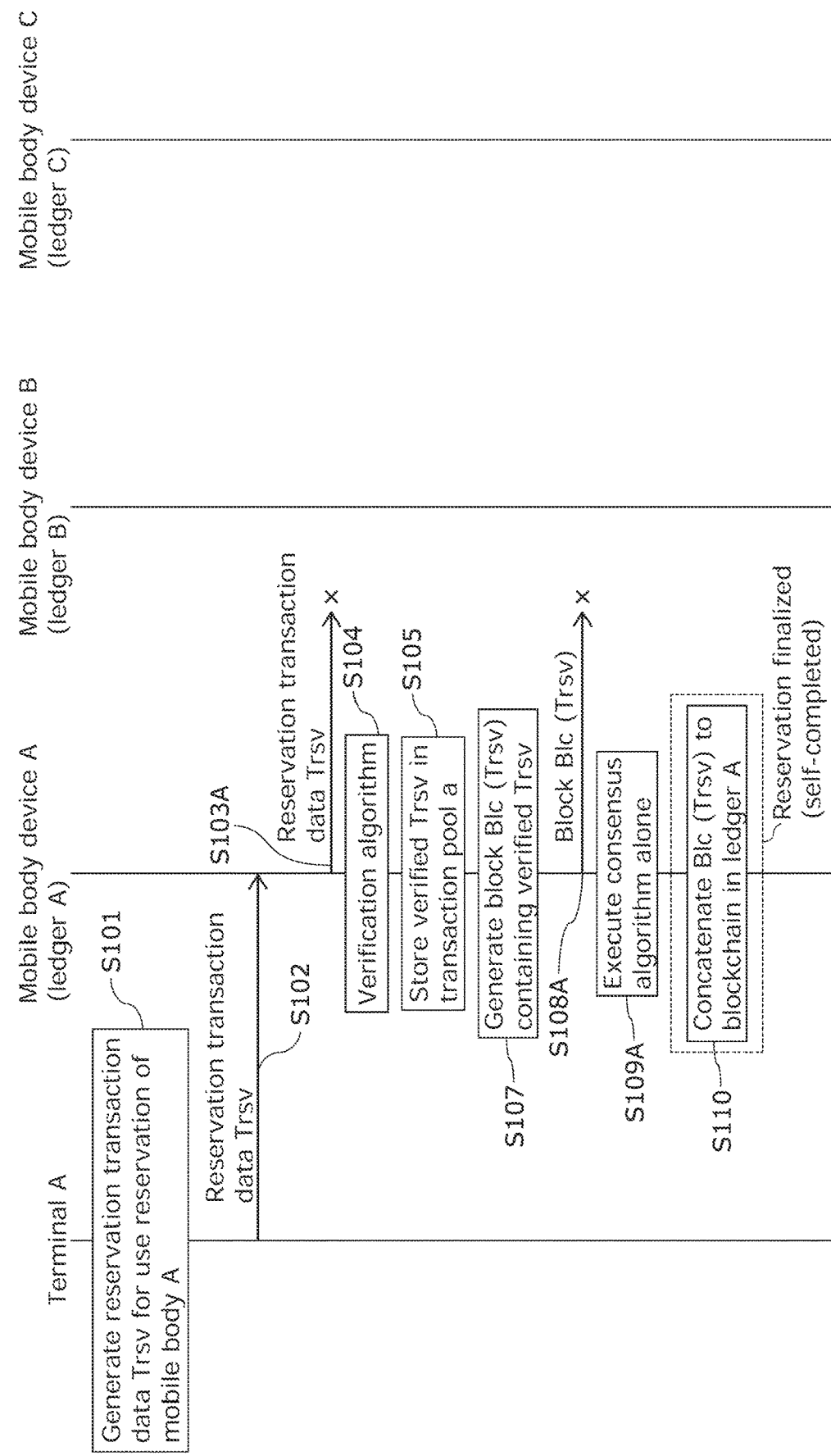
FIG. 18 is a sequence chart illustrating reservation processing by the system according to Comparative Example 2.

FIG. 18 is a sequence chart illustrating the reservation processing by the system according to Comparative Example 2, i.e., local reservation processing. Elements identical to those in FIG. 10 are given the same reference signs and will not be described in detail.

First, based on an operation by the user who wishes to use mobile body A, terminal A generates reservation transaction data Trsv for making a use reservation for mobile body A (S101), and transmits the generated reservation transaction data Trsv to mobile body device A (S102).

Next, upon receiving reservation transaction data Trsv transmitted in step S102, mobile body device A attempts to forward reservation transaction data Trsv to mobile body devices B and C, which are other mobile body devices, but fails (S103A). This is because mobile body device A is offline and therefore cannot forward reservation transaction data Trsv to mobile body devices B and C. Accordingly, mobile body devices B and C do not obtain reservation transaction data Trsv.

Next, mobile body device A executes the verification algorithm that verifies the validity of the obtained reservation transaction data Trsv (S104). Note that the reservation processing ends if the verification of reservation transaction data Trsv fails.

Next, mobile body device A stores reservation transaction data Trsv verified by the verification algorithm executed in step S104 in transaction pool a (S105).

Next, mobile body device A generates block Blc (Trsv) containing the verified reservation transaction data Trsv (S107).

Note that mobile body device A is offline, and therefore generates block Blc (Trsv) without exchanging information on the transaction data to be stored in the block to be generated next with mobile body devices B and C.

Next, mobile body device A attempts to transmit block Blc (Trsv) generated in step S107 to mobile body devices B and C, which are the other mobile body devices, but fails (S108A). This is because mobile body device A is offline and therefore cannot transmit block Blc (Trsv) to mobile body devices B and C.

Next, mobile body device A executes a consensus algorithm alone (S109A). Specifically, mobile body device A consents to reservation transaction data Trsv being valid transaction data (i.e., is valid) alone, and consents to the validity of block Blc (Trsv) alone. In the example illustrated in FIG. 18, mobile body device A consents to reservation transaction data Trsv contained in block Blc (Trsv) being valid transaction data (i.e., is valid), and therefore also consents to the validity of block Blc (Trsv). Note that the processing of step S107 may be performed when executing the consensus algorithm in step S109A alone.

Next, mobile body device A concatenates block Blc (Trsv) consented to in step S109A to the blockchain within ledger A (S110).

Through this, as illustrated in FIG. 15A, only ledger A stores the block containing reservation transaction data Trsv for making a use reservation for mobile body A, and the reservation is finalized. A reservation which is self-completed only in ledger A, which is offline, in this manner is called a "local reservation".

Renting Processing According to Comparative Example 2

Figure 19:
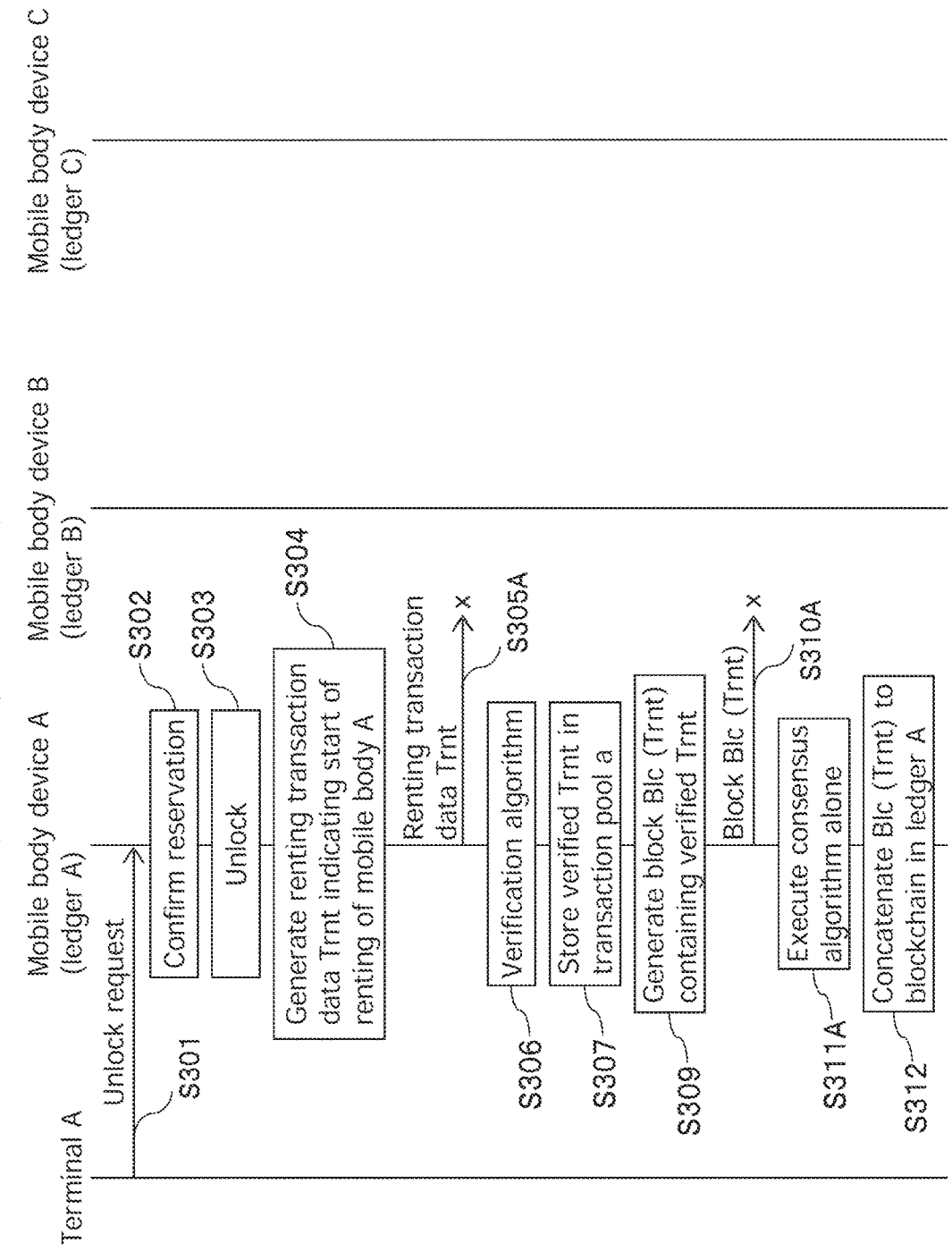
FIG. 19 is a sequence chart illustrating renting processing by the system according to Comparative Example 2.

FIG. 19 is a sequence chart illustrating renting processing by the system according to Comparative Example 2, i.e., processing for local renting. Elements identical to those in FIG. 11 are given the same reference signs and will not be described in detail.

First, based on an operation by the user who wishes to use mobile body A, terminal A transmits an unlock request for mobile body A to mobile body device A (S301).

Next, upon receiving the unlock request transmitted in step S301, mobile body device A confirms whether there is a reservation corresponding to the unlock request in the blockchain in ledger A (S302), and unlocks mobile body A (S303).

Next, mobile body device A generates renting transaction data Trnt indicating the start of the rental of mobile body A triggered by mobile body A being unlocked (S304).

Next, mobile body device A attempts to forward renting transaction data Trnt to mobile body devices B and C, which are the other mobile body devices, but fails (S305A). This is because mobile body device A is offline and therefore cannot forward renting transaction data Trnt to mobile body devices B and C. Accordingly, mobile body devices B and C do not obtain renting transaction data Trnt.

Next, mobile body device A executes the verification algorithm that verifies the validity of renting transaction data Trnt (S306).

Next, mobile body device A stores renting transaction data Trnt verified by the verification algorithm executed in step S306 in transaction pool a (S307).

Next, mobile body device A generates block Blc (Trnt) containing the verified renting transaction data Trnt (S309). Note that mobile body device A is offline, and therefore generates block Blc (Trnt) without exchanging information on the transaction data to be stored in the block to be generated next with mobile body devices B and C.

Next, mobile body device A attempts to transmit block Blc (Trnt) generated in step S309 to mobile body devices B and C, which are the other mobile body devices, but fails (S310A). This is because mobile body device A is offline and therefore cannot transmit block Blc (Trnt) to mobile body devices B and C.

Next, mobile body device A executes a consensus algorithm alone (S311A). Specifically, mobile body device A consents to renting transaction data Trnt being valid transaction data (i.e., is valid) alone, and consents to the validity of block Blc (Trnt) alone. In the example illustrated in FIG. 19, mobile body device A consents to renting transaction data Trnt contained in block Blc (Trnt) being valid transaction data (i.e., is valid), and therefore also consents to the validity of block Blc (Trnt). Note that the processing of step S309 may be performed when executing the consensus algorithm in step S311

Next, mobile body device A concatenates block Blc (Trnt) consented to in step S311A to the blockchain within ledger A (S312).

Through this, as illustrated in FIG. 15B, only ledger A stores the block containing renting transaction data Trnt, and the start of the renting of mobile body A is recorded. The recording of the start of the rental of mobile body A which is self-completed only in ledger A, which is offline, in this manner is called "local renting".

Return Processing According to Comparative Example 2

Figure 20:
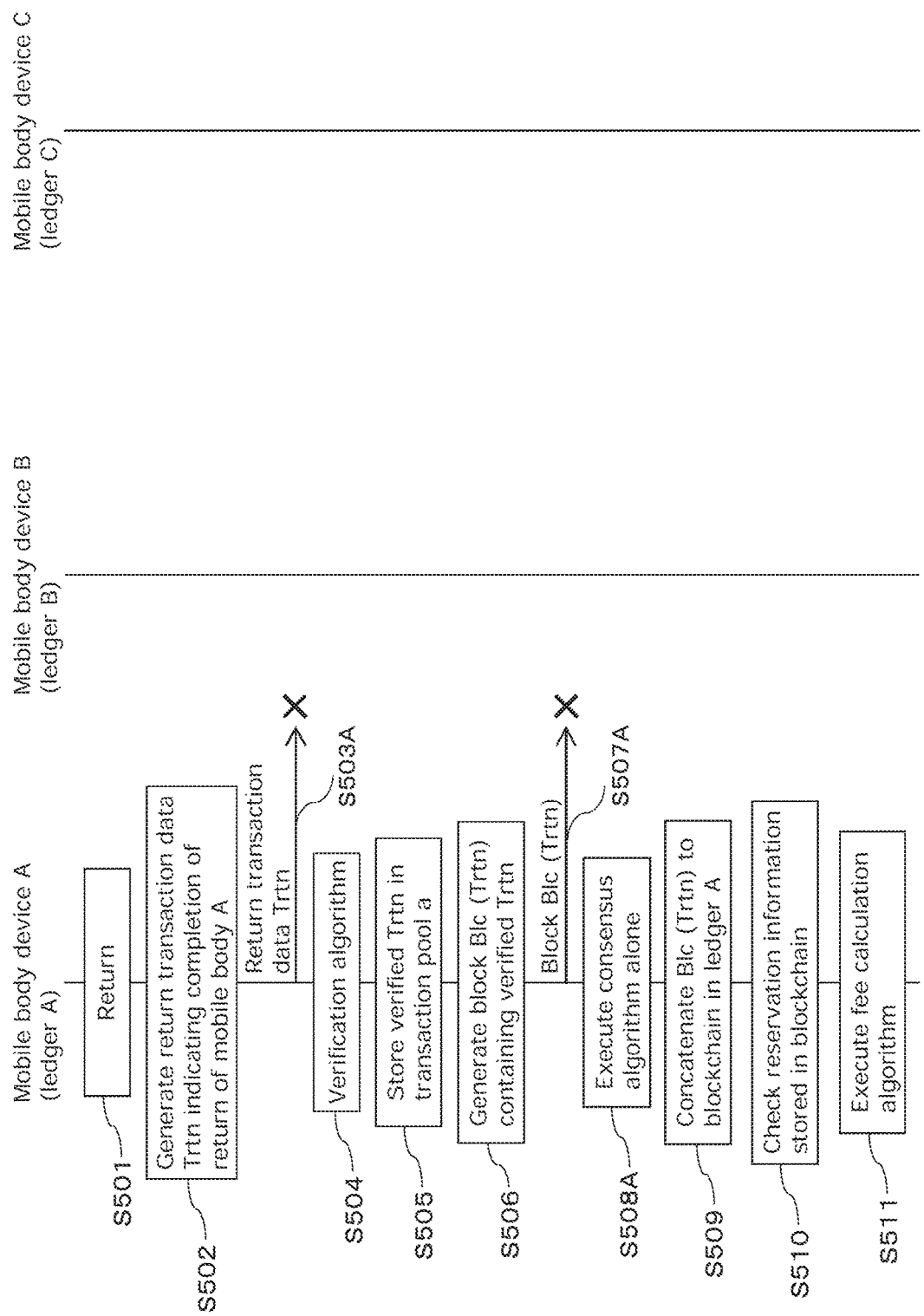
FIG. 20 is a sequence chart illustrating return processing by the system according to Comparative Example 2.

FIG. 20 is a sequence chart illustrating return processing by the system according to Comparative Example 2. Elements identical to those in FIG. 12 are given the same reference signs and will not be described in detail.

First, when mobile body A is returned by the user who used mobile body A, mobile body device A confirms that mobile body A has been returned (S501).

Next, mobile body device A generates return transaction data Trtn indicating the return of mobile body A is complete, triggered by confirming that mobile body A has been returned (S502).

Next, mobile body device A attempts to forward return transaction data Trtn to mobile body devices B and C, which are the other mobile body devices, but fails (S503A). This is because mobile body device A is offline and therefore cannot forward return transaction data Trtn to mobile body devices B and C. Accordingly, mobile body devices B and C do not obtain return transaction data Trtn.

Next, mobile body device A executes the verification algorithm that verifies the validity of the obtained return transaction data Trtn (S504).

Next, mobile body device A stores return transaction data Trtn verified by the verification algorithm executed in step S504 in transaction pool a (S505).

Next, mobile body device A generates block Blc (Trtn) containing the verified return transaction data Trtn (S506). Note that mobile body device A is offline, and therefore generates block Blc (Trtn) without exchanging information on the transaction data to be stored in the block to be generated next with mobile body devices B and C.

Next, mobile body device A attempts to transmit block Blc (Trtn) generated in step S506 to mobile body devices B and C, which are the other mobile body devices, but fails (S507A). This is because mobile body device A is offline and therefore cannot transmit block Blc (Trtn) to mobile body devices B and C.

Next, mobile body device A executes a consensus algorithm alone (S508A). Specifically, mobile body device A consents to return transaction data Trtn being valid transaction data (i.e., is valid) alone, and consents to the validity of block Blc (Trtn) alone. In the example illustrated in FIG. 20, mobile body device A consents to return transaction data Trtn contained in block Blc (Trtn) being valid transaction data (i.e., is valid), and therefore also consents to the validity of block Blc (Trtn). Note that the processing of step S506 may be performed when executing the consensus algorithm in step S508A.

Next, mobile body device A concatenates block Blc (Trtn) consented to in step S508A to the blockchain within ledger A (S509). Through this, as illustrated in FIG. 15C, only ledger A stores the block containing return transaction data Trtn, and the completion of the return of mobile body A is recorded. The recording of the completion of the return of mobile body A which is self-completed only in ledger A, which is offline, in this manner is called "local return".

Next, mobile body device A checks the reservation information stored in the blockchain (S510). More specifically, by concatenating return transaction data Trtn to the blockchain in its own ledger, each of mobile body devices A, B, and C causes the reservation smart contract to be executed, and confirms that reservation transaction data Trsv is present as the reservation information stored in the blockchain.

Next, mobile body device A executes the fee calculation algorithm (S511).

Processing when Communication is Restored for Mobile Body Device A According to Comparative Example 2

Details of processing performed when communication is restored for mobile body device A in step S6A indicated in FIG. 14 will be described next.

Figure 21:
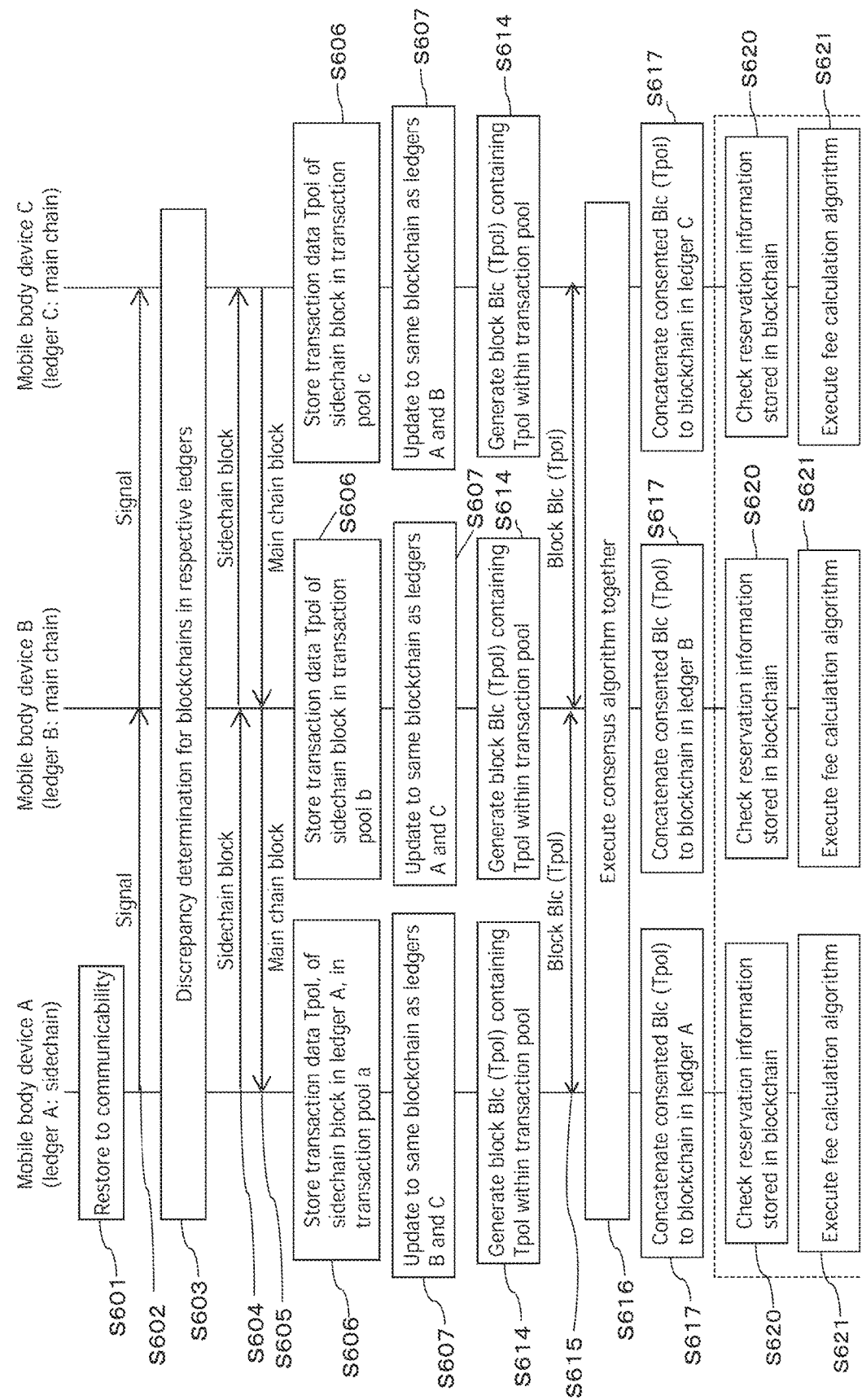
FIG. 21 is a sequence chart illustrating processing by the system, performed when communication is restored for mobile body device A, according to Comparative Example 2.

FIG. 21 is a sequence chart illustrating processing by the system, performed when communication is restored for mobile body device A, according to Comparative Example 2.

First, assume that mobile body device A has returned to communicability with mobile body devices B and C, which are the other mobile body devices (that is, is back online) (S601). Being installed in mobile body A, mobile body device A can go offline and come online depending on the location of mobile body A.

Then, mobile body device A transmits signals to mobile body devices B and C, which are the other mobile body devices (S602). The signals may be any signals capable of communicating that mobile body device A has come online.

Next, mobile body devices A, B, and C perform discrepancy determination for the blockchains in the respective ledgers (S603). More specifically, mobile body device A determines a discrepancy between the blockchain within ledger A and the blockchains within ledgers B and C of mobile body devices B and C, which are the other mobile body devices. Mobile body devices B and C determine a discrepancy between the blockchains within ledgers B and C and the blockchain within ledger A of mobile body device A, which is the other mobile body device. Here, as in the example indicated by (a) in FIG. 16, different blocks are concatenated to the blockchain in ledger A and the blockchains in ledgers B and C, and thus the blockchain in ledger A differs from the blockchain in ledgers B and C. Accordingly, as in the example indicated by (b) in FIG. 16, mobile body devices A, B, and C share different blockchains in ledgers A, B, and C, and a fork therefore occurs.

Next, mobile body devices A, B, and C transmit information on the blocks that correspond to sidechain blocks and main chain blocks to each other (S604, S605). In the present comparative example, the block concatenated to the blockchain in ledger A of mobile body device A, which was offline for a set period of time, corresponds to the sidechain block. The blocks concatenated to the blockchains in ledgers B and C of mobile body devices B and C correspond to the main chain blocks.

Next, each of mobile body devices A, B, and C stores transaction data Tpol of the sidechain block obtained in step S604 in the transaction pools (S606). More specifically, mobile body device A stores a copy of transaction data Tpol of the sidechain block concatenated to the blockchain in ledger A in transaction pool a. Mobile body device B stores transaction data Tpol of the sidechain block in transaction pool b, and mobile body device C stores transaction data Tpol of the sidechain block in transaction pool c.

Next, mobile body devices A, B, and C update the blockchains in ledgers A, B, and C, respectively, to be the same as each other (S607). More specifically, mobile body device A updates the blockchain in ledger A to be the same as the blockchains in ledgers B and C by deleting the sidechain block concatenated to the blockchain in ledger A and leaving the main chain blocks. Mobile body device B updates the blockchain in ledger B to be the same as the blockchains in ledgers A and C by deleting the sidechain block concatenated to the blockchain in ledger B and leaving the main chain blocks. Mobile body device C updates the blockchain in ledger C to be the same as the blockchains in ledgers A and B by deleting the sidechain block concatenated to the blockchain in ledger C and leaving the main chain blocks.

Next, at a block generation timing following a predetermined period of time, each of mobile body devices A, B, and C generates block Blc (Tpol) containing transaction data Tpol stored in the transaction pools (S614).

Next, each of mobile body devices A, B, and C transmits block Blc (Tpol) generated in step S614 to the other mobile body devices (S615).

Next, mobile body devices A, B, and C execute a consensus algorithm together (S616). Specifically, each of mobile body devices A, B, and C consents to transaction data Tpol being valid transaction data (i.e., is valid), and consents to the validity of block Blc (Tpol). In the example illustrated in FIG. 21, transaction data Tpol contained in block Blc (Tpol) is consented to as valid transaction data (i.e., is valid), and the validity of block Blc (Tpol) is also consented to. Note that the processing of step S614 and step S615 may be performed when executing the consensus algorithm in step S616.

Next, each of mobile body devices A, B, and C concatenates block Blc (Tpol) consented to in step S616 to the blockchain within the distributed ledger (S617). More specifically, mobile body device A concatenates block Blc (Tpol) consented to to the blockchain in ledger A, and mobile body device B concatenates block Blc (Tpol) consented to to the blockchain in ledger B. Mobile body device C concatenates block Blc (Tpol) consented to to the blockchain in ledger C. Through this, as indicated by (c) in FIG. 17, blocks containing reservation transaction data Trsv, renting transaction data Trnt, and return transaction data Trtn are stored, and the local reservation, the local renting, and the local return of mobile body A are recorded.

Next, mobile body device A checks the reservation information stored in the blockchain (S620). More specifically, by concatenating the block containing return transaction data Trtn to the blockchain in its own ledger, each of mobile body devices A, B, and C causes the reservation smart contract to be executed, and confirms that reservation transaction data Trsv is present as the reservation information stored in the blockchain.

Then, each of mobile body devices A, B, and C executes the fee calculation algorithm (S621). Note that the processing of step S621 is the same as the processing of step S511 described above, and will therefore not be described here.

Block Concatenation Processing According to Comparative Example

A comparative example of the block concatenation processing for concatenating a generated block to a blockchain will be described next.

Figure 22:
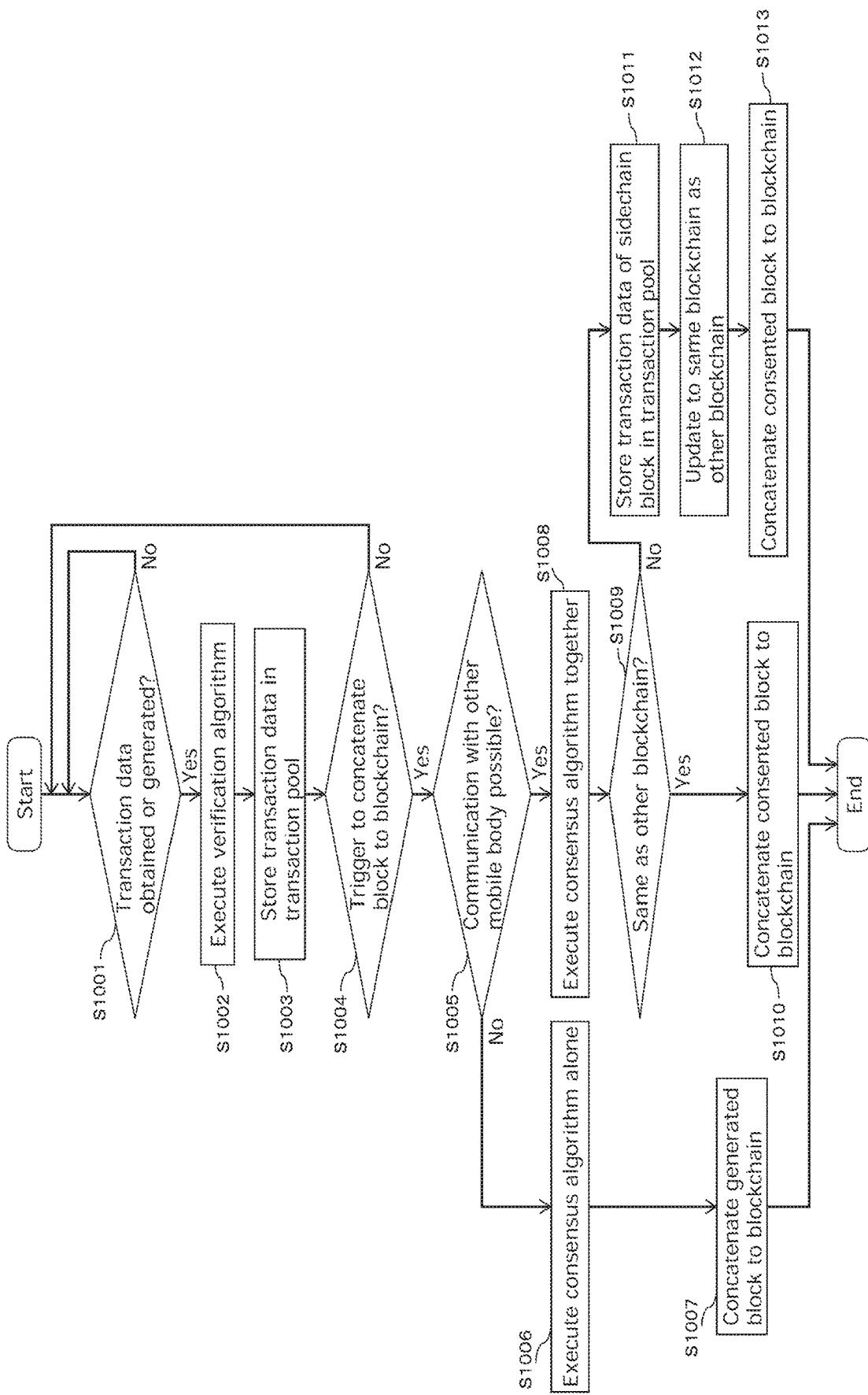
FIG. 22 is a flowchart illustrating block concatenation processing by a system according to a comparative example.

FIG. 22 is a flowchart illustrating block concatenation processing by a system according to a comparative example. The following will describe a case where mobile body device A performs the block concatenation processing as a representative example.

First, when transaction data is obtained or generated (S1001), mobile body device A executes a verification algorithm for verifying the obtained or generated transaction data (S1002).

Next, mobile body device A stores the transaction data verified by the verification algorithm executed in step S1002 in the transaction pool (S1003).

Next, mobile body device A confirms whether there is a trigger to concatenate a block to the blockchain in ledger A (S1004). The "trigger" here is that a set interval such as, for example, several minutes, has passed.

If there is a trigger in step S1004 (Yes in S1004), mobile body device A confirms whether communication with other mobile bodies is possible (S1005). Note that if there is no trigger in step S1004 (No in S1004), the processing is repeated from step S1001.

In step S1005, if mobile body device A cannot communicate with other mobile bodies, i.e., is offline (No in S1005), mobile body device A executes a consensus algorithm alone (S1006). Mobile body device A generates a block on the blockchain containing the obtained or generated transaction data, and forms a consensus by executing the consensus algorithm. Note that mobile body device A may verify the validity of the obtained or generated transaction data, and generate a block containing that transaction data.

Next, mobile body device A concatenates the generated block to the blockchain in ledger A (S1007).

On the other hand, in step S1005, if mobile body device A can communicate with other mobile bodies (Yes in S1005), mobile body device A executes a consensus algorithm together with the other mobile bodies (S1008). Each of mobile body device A and the other mobile bodies generates a block on the blockchain containing the transaction data, and forms a consensus for the generated block by executing the consensus algorithm.

Next, mobile body device A determines whether the blockchain in ledger A is the same as the blockchains in the ledgers of the other mobile bodies (S1009).

If in step S1009 the blockchains are the same (Yes in S1009), mobile body device A concatenates the block consented to to the blockchain in ledger A (S1010).

On the other hand, if in step S1009 the blockchains are not the same (No in S1009), the transaction data of the block that will become the sidechain, i.e., the sidechain block, is stored in the transaction pool (S1011).

Next, mobile body device A updates the blockchain in ledger A to be the same as the blockchains in the ledgers in the other mobile bodies (S1012).

Next, mobile body device A concatenates the block consented to in step S1009 to the blockchain in ledger A (S1013).

Comparative Example 3

Improper processing performed when the blockchain mechanism is exploited to improperly use mobile body A will be described next. Processing performed when, with mobile body device A in an offline state, improper reservation processing and normal renting processing are performed for mobile body A, and mobile body device A then goes back online and the return processing is performed, will be described as Comparative Example 3.

Figure 23:
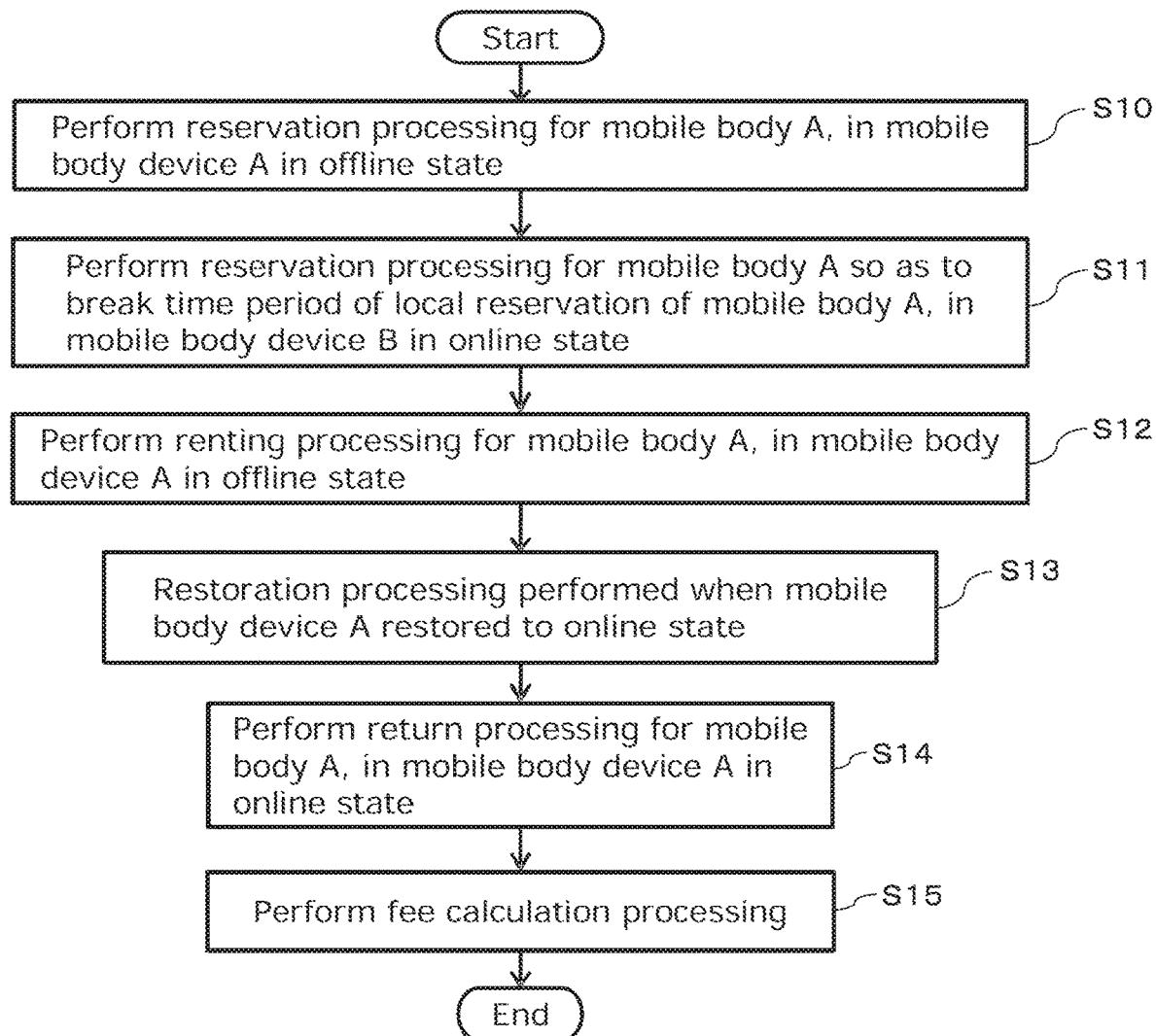
FIG. 23 is a flowchart illustrating an overview of operations in improper processing by a system according to Comparative Example 3.
Figure 25:
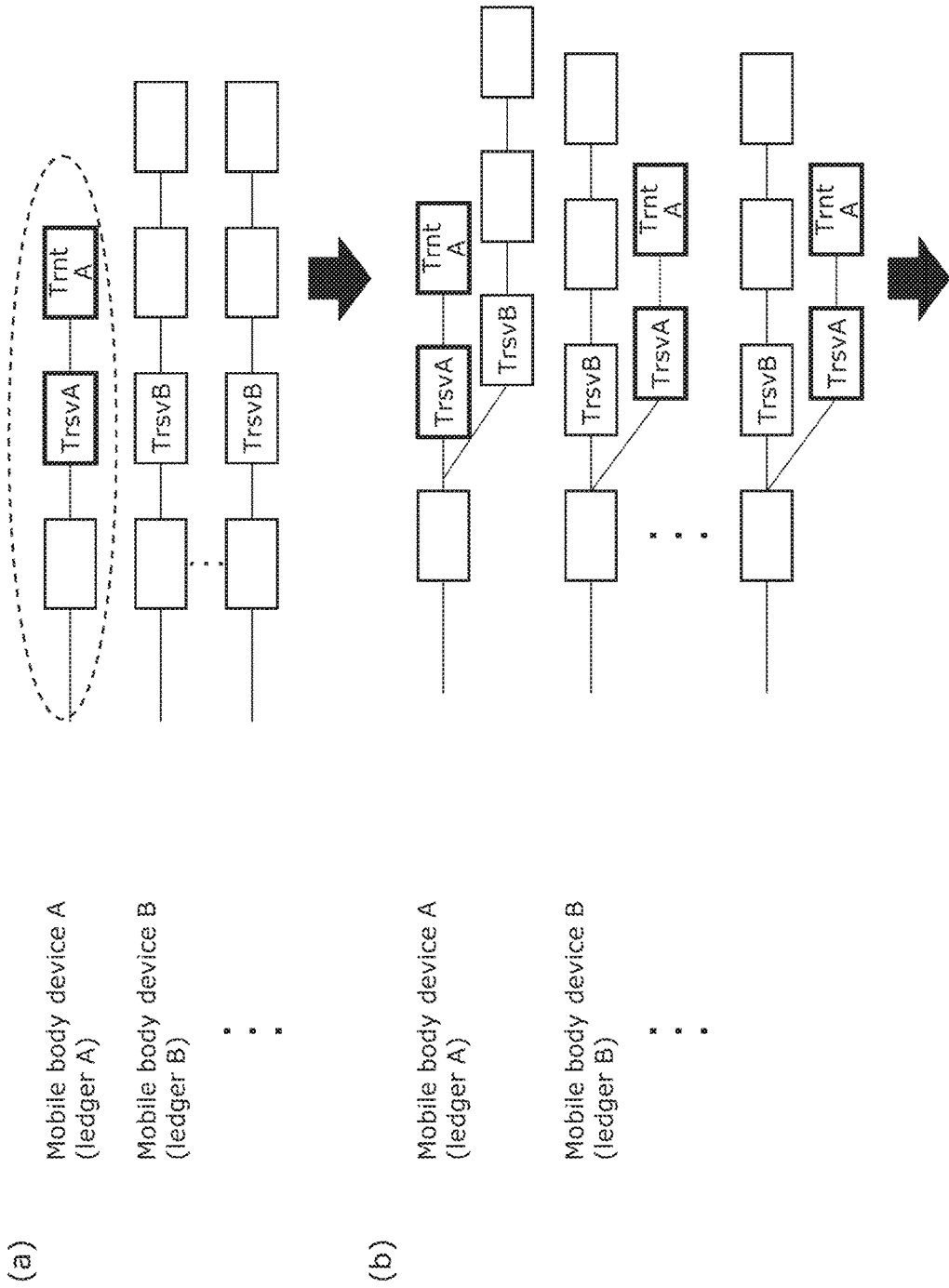
FIG. 25 is a diagram conceptually illustrating blocks of blockchains stored in ledger A and ledger B as a result of the operation of step S13 in FIG. 23.
Figure 26:
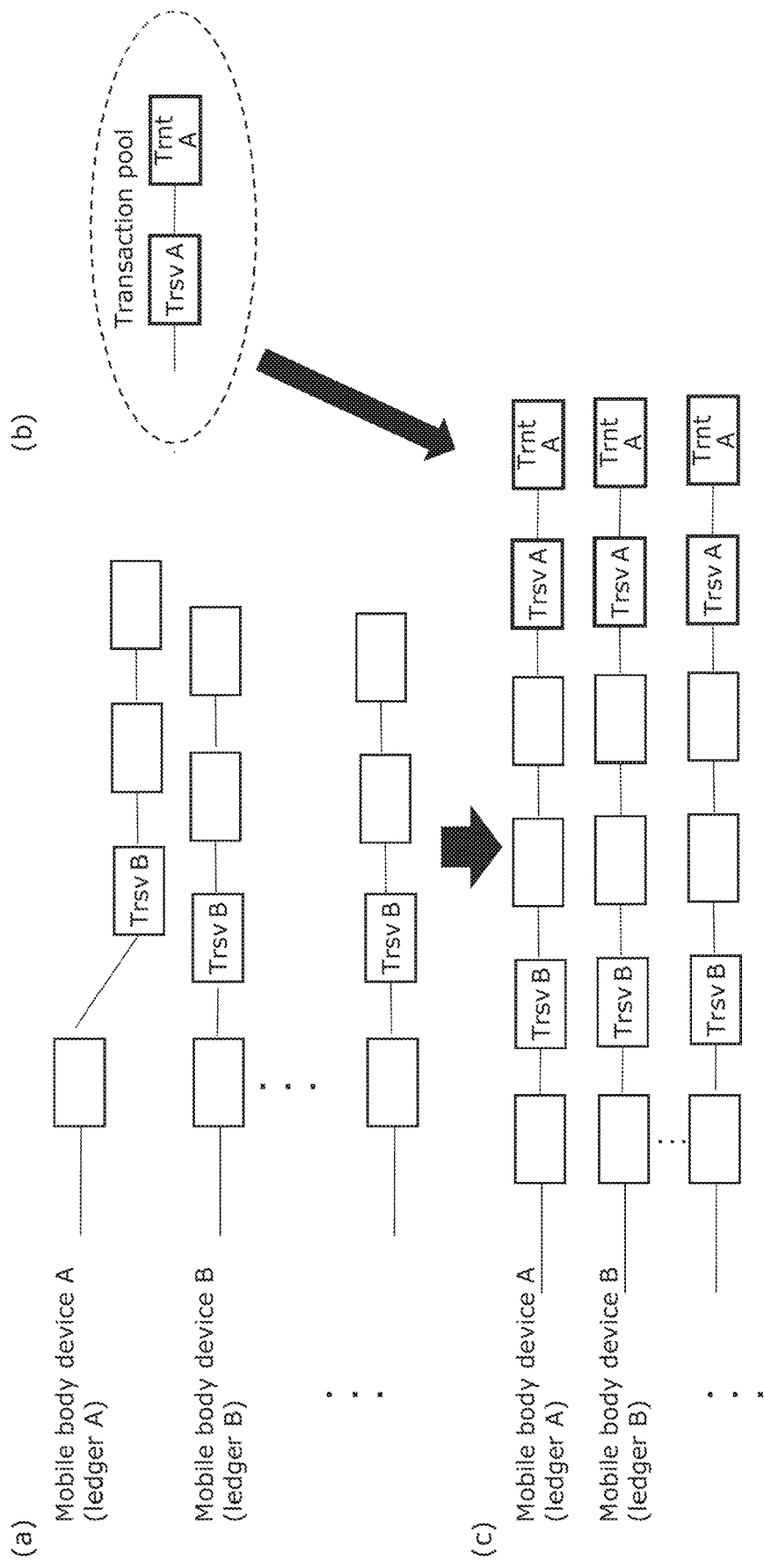
FIG. 26 is a diagram conceptually illustrating blocks of blockchains stored in ledger A and ledger B as a result of the operation of step S13 in FIG. 23.
Figure 27:
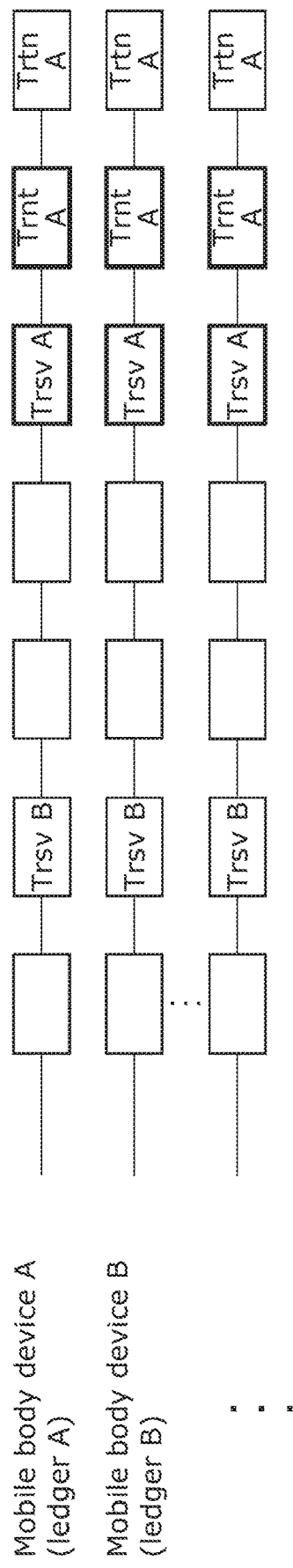
FIG. 27 is a diagram conceptually illustrating blocks of blockchains stored in ledger A and ledger B as a result of the operation of step S14 in FIG. 23.

FIG. 23 is a flowchart illustrating an overview of operations in improper processing by a system according to Comparative Example 3. FIGS. 24A to 27 are diagrams conceptually illustrating blockchains stored in ledger A of mobile body device A and ledger B of mobile body device B. FIG. 24A is a diagram conceptually illustrating blocks of a blockchain stored in ledger A as a result of the operation of step S10 in FIG. 23. FIG. 24B is a diagram conceptually illustrating blocks of a blockchain stored in ledger A as a result of the operation of step S11 in FIG. 23. FIG. 24C is a diagram conceptually illustrating blocks of a blockchain stored in ledger A as a result of the operation of step S12 in FIG. 23. FIGS. 25 and 26 are diagrams conceptually illustrating blocks of blockchains stored in ledger A and ledger B as a result of the operation of step S13 in FIG. 23. FIG. 27 is a diagram conceptually illustrating blocks of blockchains stored in ledger A and ledger B as a result of the operation of step S14 in FIG. 23. The following descriptions will assume that a user who wishes to use mobile body A uses terminal A to perform improper processing in mobile body device A, which is installed in mobile body A.

As illustrated in FIG. 23, first, for example, terminal A performs reservation processing for mobile body A in which mobile body device A is installed, mobile body device A being in an offline state (S10). Here, as described above, terminal A performs reservation processing for locally reserving mobile body A with mobile body device A, which is offline. More specifically, terminal A can communicate with mobile body device A, generate reservation transaction data TrsvA for making a use reservation for mobile body A, and transmit the data to mobile body device A. In this case, for example, as illustrated in FIG. 24A, mobile body device A is offline, and thus a block containing reservation transaction data TrsvA for making a use reservation for mobile body A is stored in ledger A only.

Next, reservation processing for mobile body A is performed with mobile body device B, which is online, so as to break the time period of the local reservation for mobile body A made in step S10, through some means such as using terminal A, using the personal smartphone of the user, or the like (S11). In other words, conflicting reservation processing for mobile body A, which conflicts with the local reservation of mobile body A, is performed for mobile body device B, which is online. In the present comparative example, the user uses terminal A to generate reservation transaction data TrsvB for making a conflicting reservation for mobile body A, and transmits the data to mobile body device B, which is online. In this case, for example, as illustrated in FIG. 24B, mobile body device B and the like store a block containing reservation transaction data TrsvB for the conflicting reservation of mobile body A in ledger B and the like aside from ledger A of mobile body device A, which is offline.

Next, for example, terminal A communicates with mobile body device A, which is offline, and performs the renting processing for mobile body A (S12). In other words, as described above, terminal A performs renting processing for locally renting mobile body A with mobile body device A, which is offline. More specifically, by communicating with mobile body device A and transmitting an unlock request for mobile body A to use mobile body A, terminal A causes mobile body device A to unlock mobile body A and generate renting transaction data TrntA indicating the start of the renting of mobile body A, triggered by mobile body A being unlocked. In this case, for example, as illustrated in FIG. 24C, mobile body device A is offline, and thus a block containing renting transaction data TrntA indicating the start of the rental of mobile body A is stored in ledger A only.

Next, assume that the user brings mobile body device A back online. Then, when mobile body device A is restored to an online state, return processing is performed in the system (S13).

More specifically, as described above, in steps S10 to S12, mobile body device A is offline, and thus as indicated by (a) in FIG. 25, different blocks are concatenated to the blockchains in ledger A and ledger B at the point in time when mobile body device A goes back online. Next, as indicated by (b) in FIG. 25, when mobile body device A goes back online, a fork occurs due to ledger A of mobile body device A and ledger B of mobile body device B sharing different blockchains. Here, the block concatenated to the blockchain in ledger A of mobile body device A, which is offline, corresponds to a sidechain block, and the block concatenated to the blockchain in ledger B of mobile body device B, which is online, corresponds to a main chain block. Accordingly, as indicated by (a) and (b) in FIG. 26, in ledger A of mobile body device A and ledger B of mobile body device B, the fork is eliminated by deleting the sidechain block and storing the transaction data contained in the sidechain block in the transaction pool. Note that in (b) in FIG. 26, reservation transaction data TrsvA ad renting transaction data TrntA are stored in the transaction pool. Then, as indicated by (c) in FIG. 26, in the blockchains in ledger A of mobile body device A and ledger B of mobile body device B, a block containing the transaction data stored in the transaction pool is generated and concatenated when a new block is generated.

Next, for example, terminal A communicates with mobile body device A, which is online, and performs the return processing for mobile body A (S14). More specifically, user who operated terminal A uses the unlocked mobile body A for the time reserved for use, and then returns mobile body A. When mobile body A is returned, mobile body device A generates return transaction data TrtnA indicating the return of mobile body A is complete. In this case, for example, as illustrated in FIG. 27, mobile body device A is online, and thus a block return transaction data TrtnA Trtn indicating the completion of the return of mobile body A is stored in all of ledgers A and B and the like.

Next, the fee calculation processing is performed in mobile body device A and the like (S15). The fee calculation processing in step S15 is the same processing as the fee calculation processing in step S7, and will therefore not be described here. Reservation transaction data TrsvA and reservation transaction data TrsvB conflict, and the block containing reservation transaction data TrsvA is concatenated later, in terms of time, than the block containing reservation transaction data TrsvB. As a result, no fee is collected for the reservation corresponding to reservation transaction data TrsvA, and thus an impropriety arises in that the fee for using mobile body A through the reservation corresponding to reservation transaction data TrsvA is not paid.

Details of the local reservation processing in step S10 indicated in FIG. 23, the conflicting reservation processing in step S11, and the local renting processing in step S12 will be described next with reference to sequence charts.

Reservation Processing According to Comparative Example 3

Figure 28:
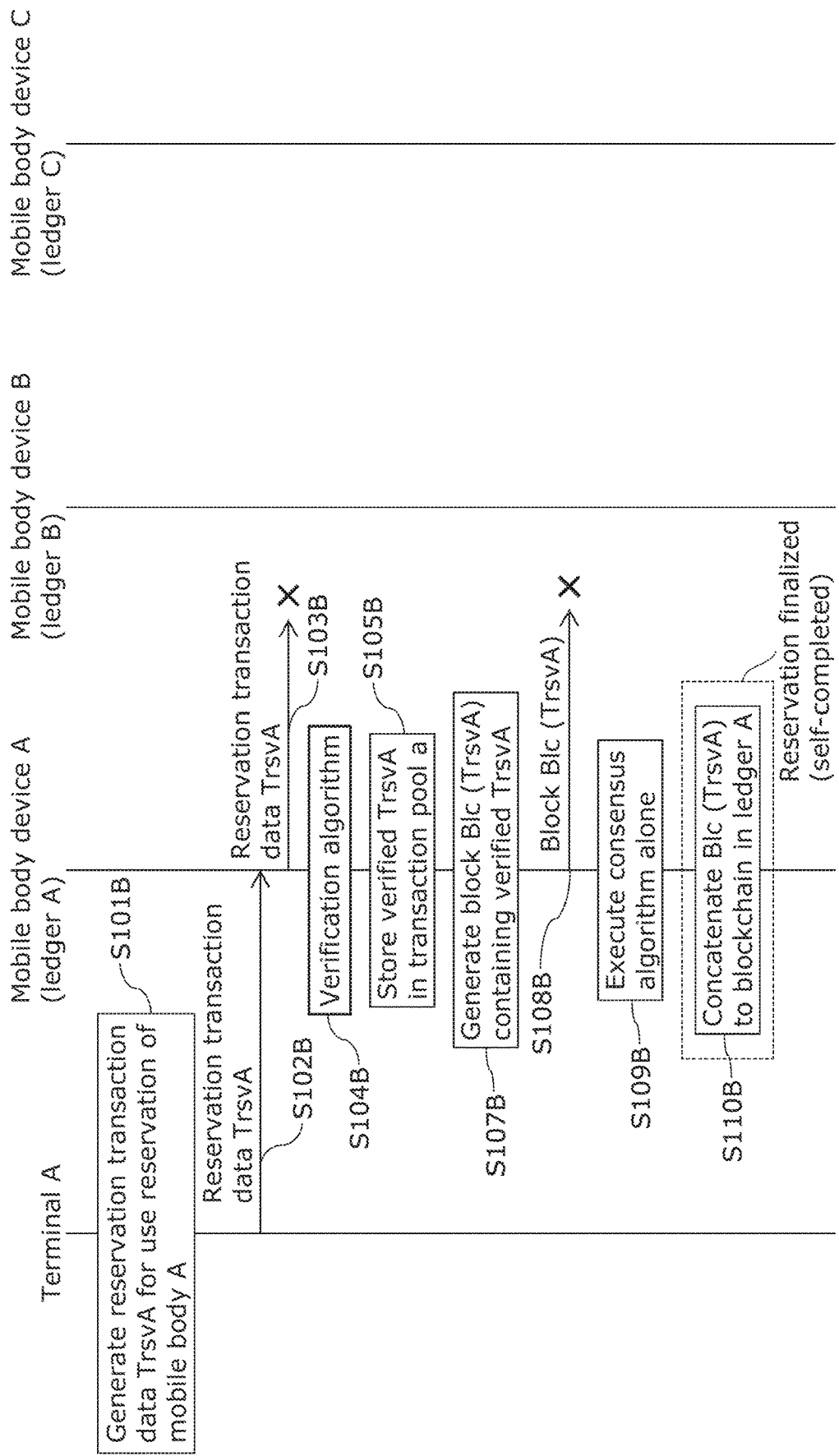
FIG. 28 is a sequence chart illustrating processing when making a local reservation, performed by the system according to Comparative Example 3.

FIG. 28 is a sequence chart illustrating processing when making a local reservation, performed by the system according to Comparative Example 3. Elements identical to those in FIG. 18 are given the same reference signs and will not be described in detail.

First, based on an operation by the user who wishes to use mobile body A, terminal A generates reservation transaction data TrsvA for making a use reservation for mobile body A (S101B), and transmits the generated reservation transaction data TrsvA to mobile body device A (S102B).

Next, upon receiving reservation transaction data TrsvA transmitted in step S102B, mobile body device A attempts to forward reservation transaction data TrsvA to mobile body devices B and C, which are other mobile body devices, but fails (S103B). This is because mobile body device A is offline and therefore cannot forward reservation transaction data TrsvA to mobile body devices B and C.

Next, mobile body device A executes the verification algorithm that verifies the validity of the obtained reservation transaction data TrsvA (S104B).

Next, mobile body device A stores reservation transaction data TrsvA verified by the verification algorithm executed in step S104B in transaction pool a (S105B).

Next, mobile body device A generates block Blc (TrsvA) containing the verified reservation transaction data TrsvA (S107B).

Next, mobile body device A attempts to transmit block Blc (TrsvA) generated in step S107B to mobile body devices B and C, which are the other mobile body devices, but fails (S108B). This is because mobile body device A is offline and therefore cannot transmit block Blc (TrsvA) to mobile body devices B and C.

Next, mobile body device A executes a consensus algorithm alone (S109B). Note that the processing of step S107B may be performed when executing the consensus algorithm in step S109B alone.

Next, mobile body device A concatenates block Blc (TrsvA) consented to in step S109B to the blockchain within ledger A (S110B).

Through this, as illustrated in FIG. 24A, only ledger A stores the block containing reservation transaction data TrsvA for making a use reservation for mobile body A, and the local reservation is finalized.

Figure 29:
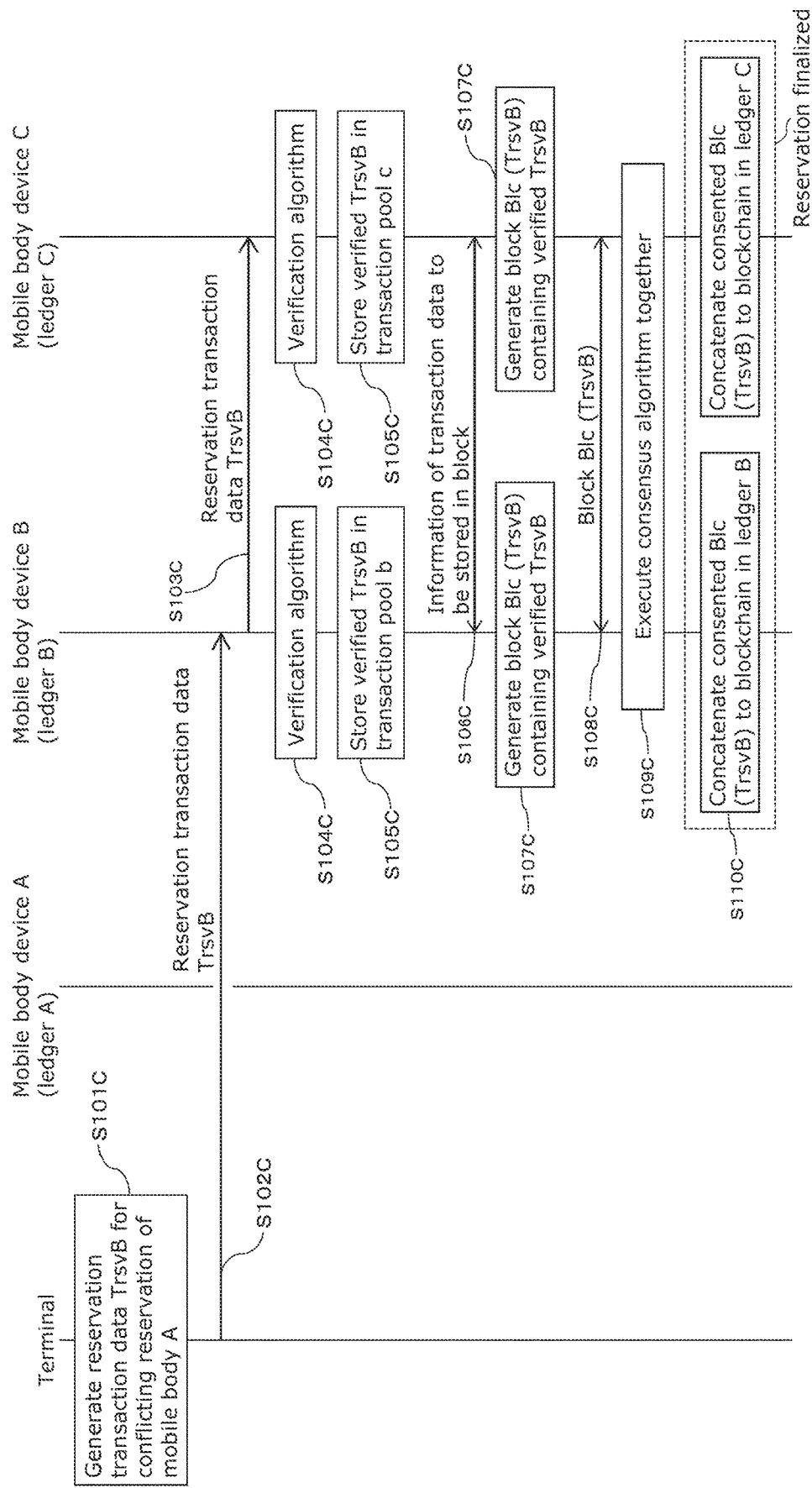
FIG. 29 is a sequence chart illustrating processing when making a conflicting reservation, performed by the system according to Comparative Example 3.

FIG. 29 is a sequence chart illustrating processing when making a conflicting reservation, performed by the system according to Comparative Example 3.

First, for example, using terminal A, the user generates reservation transaction data TrsvB for making a conflicting reservation for mobile body A (S101C).

Next, for example, using terminal A, the user transmits reservation transaction data TrsvB generated in step S101C to mobile body device B (S102C).

Next, upon receiving reservation transaction data TrsvB transmitted in step S102C, mobile body device B is online, and therefore forwards reservation transaction data TrsvB to mobile body device C, which is another mobile body device (S103C). Through this, mobile body device C aside from mobile body device A obtains reservation transaction data TrsvB.

Next, each of mobile body devices B and C executes the verification algorithm that verifies the validity of the obtained reservation transaction data TrsvB (S104C).

Next, each of mobile body devices B and C stores reservation transaction data TrsvB verified by the verification algorithm executed in step S104C in a transaction pool (S105C). More specifically, mobile body device B stores the verified reservation transaction data TrsvB in transaction pool b, and mobile body device C stores the verified reservation transaction data TrsvB in transaction pool c.

Next, mobile body devices B and C are capable of communicating with each other and therefore exchange information of transaction data to be stored in the block to be generated next (S106C). In the example illustrated in FIG. 29, mobile body devices B and C confirm that the verified reservation transaction data TrsvB is in the transaction data to be stored in the block to be generated next.

Next, each of mobile body devices B and C generates block Blc (TrsvB) containing the verified reservation transaction data TrsvB (S107C).

Next, each of mobile body devices B and C transmits block Blc (TrsvB) generated in step S107C to the other mobile body devices aside from mobile body device A (S108C). Through this, each of mobile body devices B and C can communicate, to the other mobile body devices aside from mobile body device A, a report that the validity of reservation transaction data TrsvB contained in block Blc (TrsvB) was successfully verified.

Next, mobile body devices B and C execute a consensus algorithm together (S109C). Specifically, each of mobile body devices B and C consents to reservation transaction data TrsvB being valid transaction data (i.e., is valid) based on the reports communicated in step S108C, and consents to the validity of block Blc (TrsvB). Note that the processing of step S107C and step S108C may be performed when executing the consensus algorithm in step S109C.

Next, each of mobile body devices B and C concatenates block Blc (TrsvB) consented to in step S109C to the blockchain within the distributed ledger (S110C). More specifically, mobile body device B concatenates block Blc (TrsvB) consented to to the blockchain in ledger B, and mobile body device C concatenates block Blc (TrsvB) consented to to the blockchain in ledger C.

Through this, as illustrated in FIG. 24B, ledger B and ledger C both store the block containing reservation transaction data TrsvB.

Renting Processing According to Comparative Example 3

Figure 30:
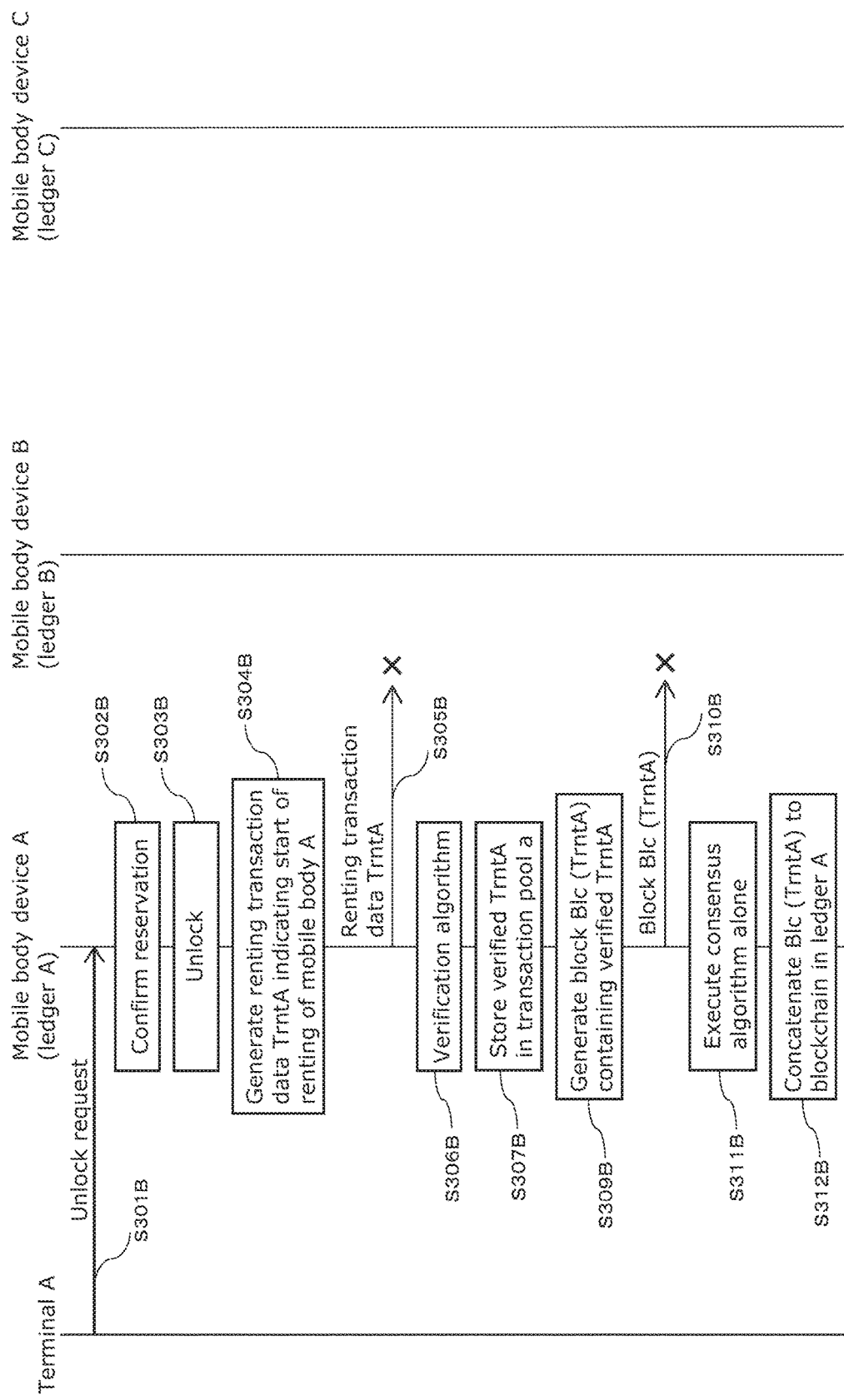
FIG. 30 is a sequence chart illustrating processing for local renting, by the system according to Comparative Example 3.

FIG. 30 is a sequence chart illustrating processing for local renting, by the system according to Comparative Example 3. Elements identical to those in FIG. 19 are given the same reference signs and will not be described in detail.

First, based on an operation by the user who will use mobile body A, terminal A transmits an unlock request for mobile body A to mobile body device A (S301B).

Next, upon receiving the unlock request transmitted in step S301B, mobile body device A confirms whether there is a reservation corresponding to the unlock request in the blockchain in ledger A (S302B), and unlocks mobile body A (S303B).

Next, mobile body device A generates renting transaction data TrntA indicating the start of the rental of mobile body A triggered by mobile body A being unlocked (S304B).

Next, mobile body device A attempts to forward renting transaction data TrntA to mobile body devices B and C, which are the other mobile body devices, but fails (S305B). This is because mobile body device A is offline and therefore cannot forward renting transaction data TrntA to mobile body devices B and C.

Next, mobile body device A executes the verification algorithm that verifies the validity of renting transaction data TrntA (S306B).

Next, mobile body device A stores renting transaction data TrntA verified by the verification algorithm executed in step S306B in transaction pool a (S307B).

Next, mobile body device A generates block Blc (TrntA) containing the verified renting transaction data TrntA (S309B).

Next, mobile body device A attempts to transmit block Blc (TrntA) generated in step S309B to mobile body devices B and C, which are the other mobile body devices, but fails (S310B). This is because mobile body device A is offline and therefore cannot transmit block Blc (TrntA) to mobile body devices B and C.

Next, mobile body device A executes a consensus algorithm alone (S311B). Specifically, mobile body device A consents to renting transaction data TrntA being valid transaction data (i.e., is valid) alone, and consents to the validity of block Blc (TrntA) alone. Note that the processing of step S309B may be performed when executing the consensus algorithm in step S311B.

Next, mobile body device A concatenates block Blc (TrntA) consented to in step S311B to the blockchain within ledger A (S312B).

Through this, as illustrated in FIG. 24C, only ledger A stores the block containing renting transaction data TrntA, and the local renting of mobile body A is recorded.

Processing when Communication is Restored for Mobile Body Device A According to Comparative Example 3

Details of processing performed when communication is restored for mobile body device A in step S13 indicated in FIG. 23 will be described next.

Figure 31:
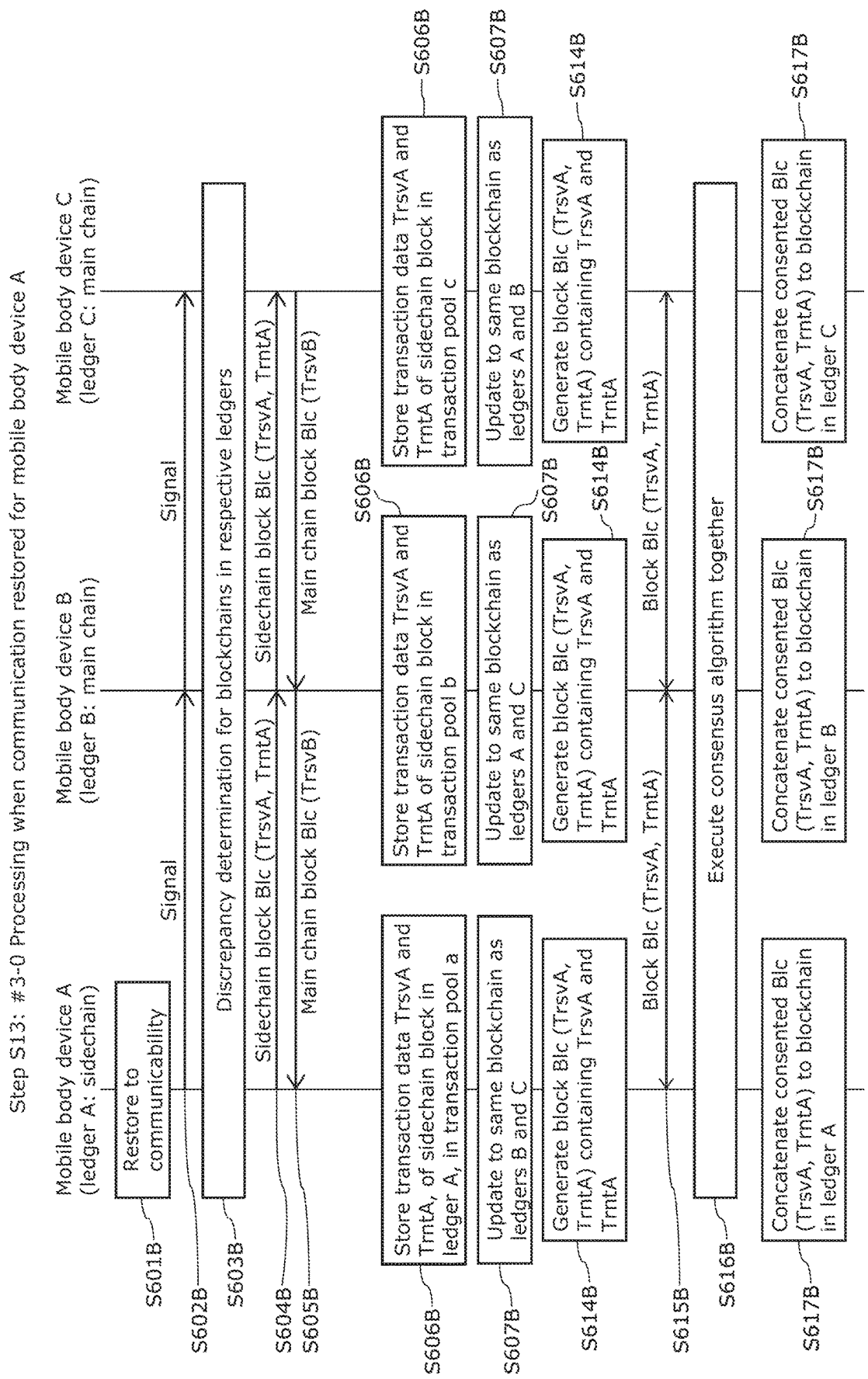
FIG. 31 is a sequence chart illustrating processing by the system, performed when communication is restored for mobile body device A, according to Comparative Example 3.

FIG. 31 is a sequence chart illustrating processing by the system, performed when communication is restored for mobile body device A, according to Comparative Example 3. Elements identical to those in FIG. 21 are given the same reference signs and will not be described in detail.

First, assume that mobile body device A has returned to communicability with mobile body devices B and C, which are the other mobile body devices (that is, is back online) (S601B).

Then, mobile body device A transmits signals indicating that mobile body device A has come online to mobile body devices B and C, which are the other mobile body devices (S602B).

Next, mobile body devices A, B, and C perform discrepancy determination for the blockchains in the respective ledgers (S603B). More specifically, mobile body device A determines a discrepancy between the blockchain within ledger A and the blockchains within ledgers B and C of mobile body devices B and C, which are the other mobile body devices. Mobile body devices B and C determine a discrepancy between the blockchains within ledgers B and C and the blockchain within ledger A of mobile body device A, which is the other mobile body device. Here, as in the example indicated by (a) in FIG. 25, different blocks are concatenated to the blockchain in ledger A and the blockchains in ledgers B and C, and thus the blockchain in ledger A differs from the blockchain in ledgers B and C. Accordingly, as in the example indicated by (b) in FIG. 25, mobile body devices A, B, and C share different blockchains in ledgers A, B, and C, and a fork therefore occurs.

Next, mobile body devices A, B, and C transmit information on the blocks that correspond to sidechain blocks and main chain blocks to each other (S604B, S605B). In the present comparative example, the blocks concatenated to the blockchain in ledger A of mobile body device A, which was offline for a set period of time, correspond to sidechain blocks Blc (TrsvA, TrntA). The blocks concatenated to the blockchains in ledgers B and C of mobile body devices B and C correspond to main chain block Blc (TrsvB).

Next, each of mobile body devices A, B, and C stores reservation transaction data TrsvA and renting transaction data TrntA contained in the sidechain blocks obtained in step S604B in the transaction pools (S606B). More specifically, mobile body device A stores a copy of transaction data TrsvA and TrntA of the sidechain blocks concatenated to the blockchain in ledger A in transaction pool a. Mobile body device B stores transaction data TrsvA and TrntA of the sidechain blocks in transaction pool b, and mobile body device C stores transaction data TrsvA and TrntA of the sidechain blocks in transaction pool c.

Next, mobile body devices A, B, and C update the blockchains in ledgers A, B, and C, respectively, to be the same as each other (S607B). More specifically, mobile body device A updates the blockchain in ledger A to be the same as the blockchains in ledgers B and C by deleting the sidechain block concatenated to the blockchain in ledger A and leaving the main chain blocks. Mobile body device B updates the blockchain in ledger B to be the same as the blockchains in ledgers A and C by deleting the sidechain block concatenated to the blockchain in ledger B and leaving the main chain blocks. Mobile body device C updates the blockchain in ledger C to be the same as the blockchains in ledgers A and B by deleting the sidechain block concatenated to the blockchain in ledger C and leaving the main chain blocks.

Next, at a block generation timing following a predetermined period of time, each of mobile body devices A, B, and C generates blocks Blc (TrsvA, TrntA) containing transaction data TrsvA and TrntA stored in the transaction pools (S614B).

Next, each of mobile body devices A, B, and C transmits blocks Blc (TrsvA, TrntA) generated in step S614B to the other mobile body devices (S615B). Through this, each of mobile body devices A, B, and C can communicate, to the other mobile body devices, a report that the validity of transaction data TrsvA and TrntA contained in blocks Blc (TrsvA, TrntA) was successfully verified.

Next, mobile body devices A, B, and C execute a consensus algorithm together (S616B). Specifically, each of mobile body devices A, B, and C consents to transaction data TrsvA and TrntA being valid transaction data (i.e., is valid) based on the reports communicated in step S615B, and consents to the validity of blocks Blc (TrsvA, TrntA). Note that the processing of step S614B and step S615B may be performed when executing the consensus algorithm in step S616B.

Next, each of mobile body devices A, B, and C concatenates blocks Blc (TrsvA, TrntA) consented to in step S616B to the blockchain within the distributed ledger (S617B). More specifically, mobile body device A concatenates blocks Blc (TrsvA, TrntA) consented to to the blockchain in ledger A, and mobile body device B concatenates blocks Blc (TrsvA, TrntA) consented to to the blockchain in ledger B. Mobile body device C concatenates blocks Blc (TrsvA, TrntA) consented to to the blockchain in ledger C. Through this, as indicated by (c) in FIG. 26, blocks containing reservation transaction data TrsvA, reservation transaction data TrsvB, and renting transaction data TrntA are stored, and the local reservation, the conflicting reservation, and the local renting of mobile body A are recorded.

Return Processing According to Comparative Example 3

Details of the return processing for mobile body device A in step S14 indicated in FIG. 23 will be described next.

Figure 32:
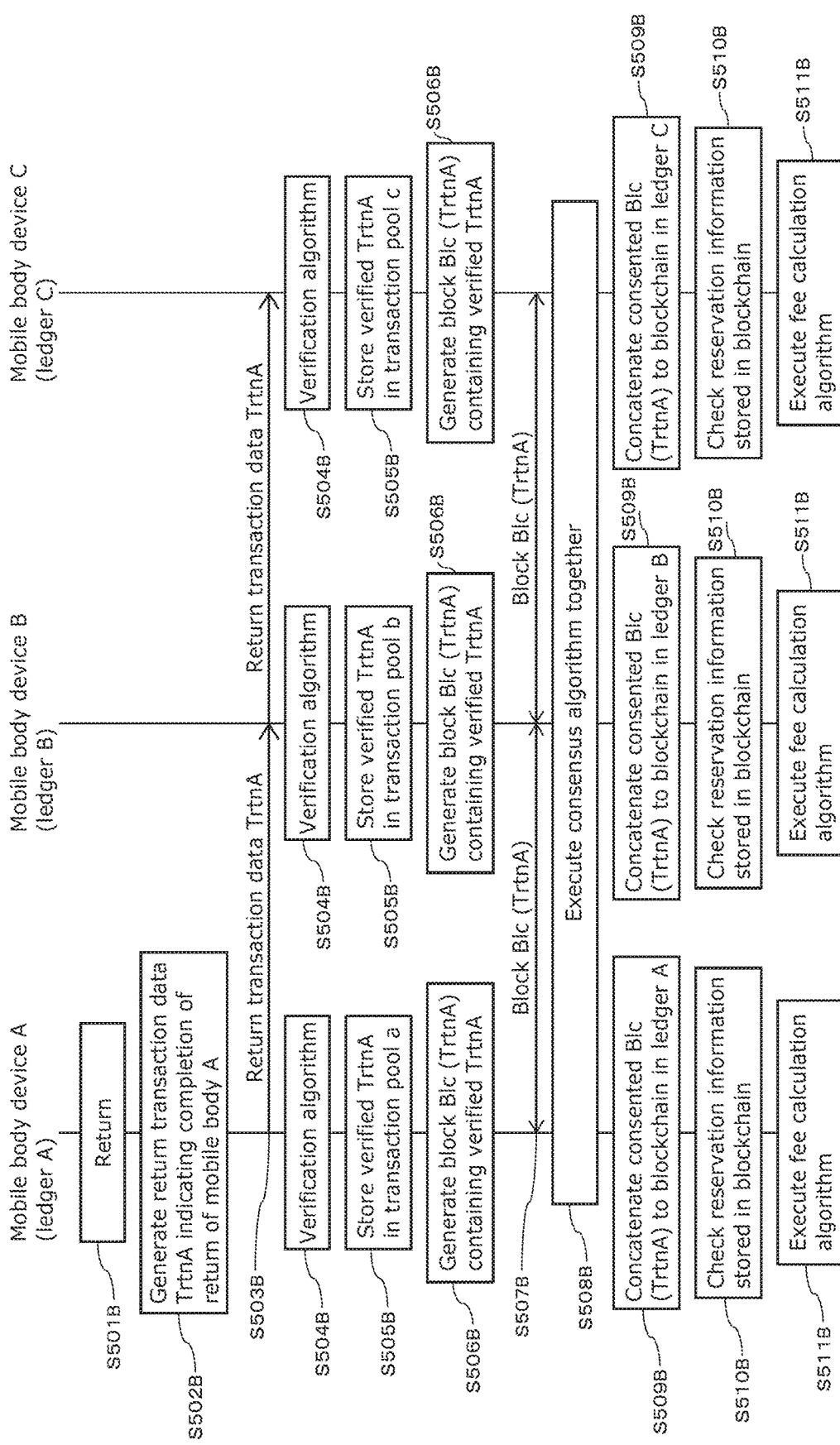
FIG. 32 is a sequence chart illustrating return processing by the system according to Comparative Example 3.

FIG. 32 is a sequence chart illustrating return processing by the system according to Comparative Example 3. Elements identical to those in FIG. 12 are given the same reference signs and will not be described in detail.

First, when mobile body A is returned by the user who used mobile body A, mobile body device A confirms that mobile body A has been returned (S501B).

Next, mobile body device A generates return transaction data TrtnA indicating the return of mobile body A is complete, triggered by confirming that mobile body A has been returned (S502B).

Next, mobile body device A forwards return transaction data TrtnA to mobile body devices B and C, which are the other mobile body devices (S503B). Through this, mobile body devices B and C obtain return transaction data TrtnA.

Next, each of mobile body devices A, B, and C executes the verification algorithm that verifies the validity of the obtained return transaction data TrtnA (S504B).

Next, each of mobile body devices A, B, and C stores return transaction data TrtnA verified by the verification algorithm executed in step S504B in a transaction pool (S505B). More specifically, mobile body device A stores the verified return transaction data TrtnA in transaction pool a, and mobile body device B stores the verified return transaction data TrtnA in transaction pool b. Mobile body device C stores the verified return transaction data TrtnA in transaction pool c. Note that although not illustrated here, mobile body devices A, B, and C are capable of communicating with each other and therefore exchange information of transaction data to be stored in the block to be generated next. In the example illustrated in FIG. 32, mobile body devices A, B, and C confirm that the verified return transaction data TrtnA is in the transaction data to be stored in the block to be generated next.

Next, each of mobile body devices A, B, and C generates block Blc (TrtnA) containing the verified return transaction data TrtnA (S506B).

Next, each of mobile body devices A, B, and C transmits block Blc (TrtnA) generated in step S506B to the other mobile body devices (S507B). Through this, each of mobile body devices A, B, and C can communicate, to the other mobile body devices, a report that the validity of return transaction data TrtnA contained in block Blc (TrtnA) was successfully verified.

Next, mobile body devices A, B, and C execute a consensus algorithm together (S508B). Specifically, each of mobile body devices A, B, and C consents to return transaction data TrtnA being valid transaction data (i.e., is valid) based on the reports communicated in step S507B, and consents to the validity of block Blc (TrtnA). Note that the processing of step S506B and step S507B may be performed when executing the consensus algorithm in step S508B.

Next, each of mobile body devices A, B, and C concatenates block Blc (TrntA) consented to in step 508B to the blockchain within the distributed ledger (S509B). More specifically, mobile body device A concatenates block Blc (TrtnA) consented to to the blockchain in ledger A, and mobile body device B concatenates block Blc (TrtnA) consented to to the blockchain in ledger B. Mobile body device C concatenates block Blc (TrtnA) consented to to the blockchain in ledger C. Through this, as illustrated in FIG. 27, ledger A, ledger B, and ledger C all store the block containing return transaction data TrtnA, and the completion of the return of mobile body A is recorded.

Next, each of mobile body devices A, B, and C checks the reservation information stored in the blockchain (S510B). More specifically, by concatenating the block containing return transaction data TrtnA to the blockchain in its own ledger, each of mobile body devices A, B, and C causes the reservation smart contract to be executed, and confirms that reservation transaction data Trsv is present as the reservation information stored in the blockchain.

Next, each of mobile body devices A, B, and C executes the fee calculation algorithm (S511B). Here, as illustrated in FIG. 27, for example, reservation transaction data TrsvA and reservation transaction data TrsvB conflict, and the block containing reservation transaction data TrsvA is concatenated later, in terms of time, than the block containing reservation transaction data TrsvB. Accordingly, even if the fee calculation algorithm is executed, the fee for the reservation corresponding to reservation transaction data TrsvA is not collected, and only the fee for the reservation corresponding to reservation transaction data TrsvB is collected.

In this manner, no fee is collected for the reservation corresponding to reservation transaction data TrsvA, and thus an impropriety arises in that the fee for using mobile body A through the reservation corresponding to reservation transaction data TrsvA is not paid Comparative Example 4

Comparative Example 3 described improper processing performed when performing return processing after bringing mobile body device A back online, but the processing is not limited thereto. If mobile body device A is offline, mobile body device A may be brought back online after performing the return processing. The improper processing in this case will be described hereinafter as Comparative Example 4.

Figure 33:
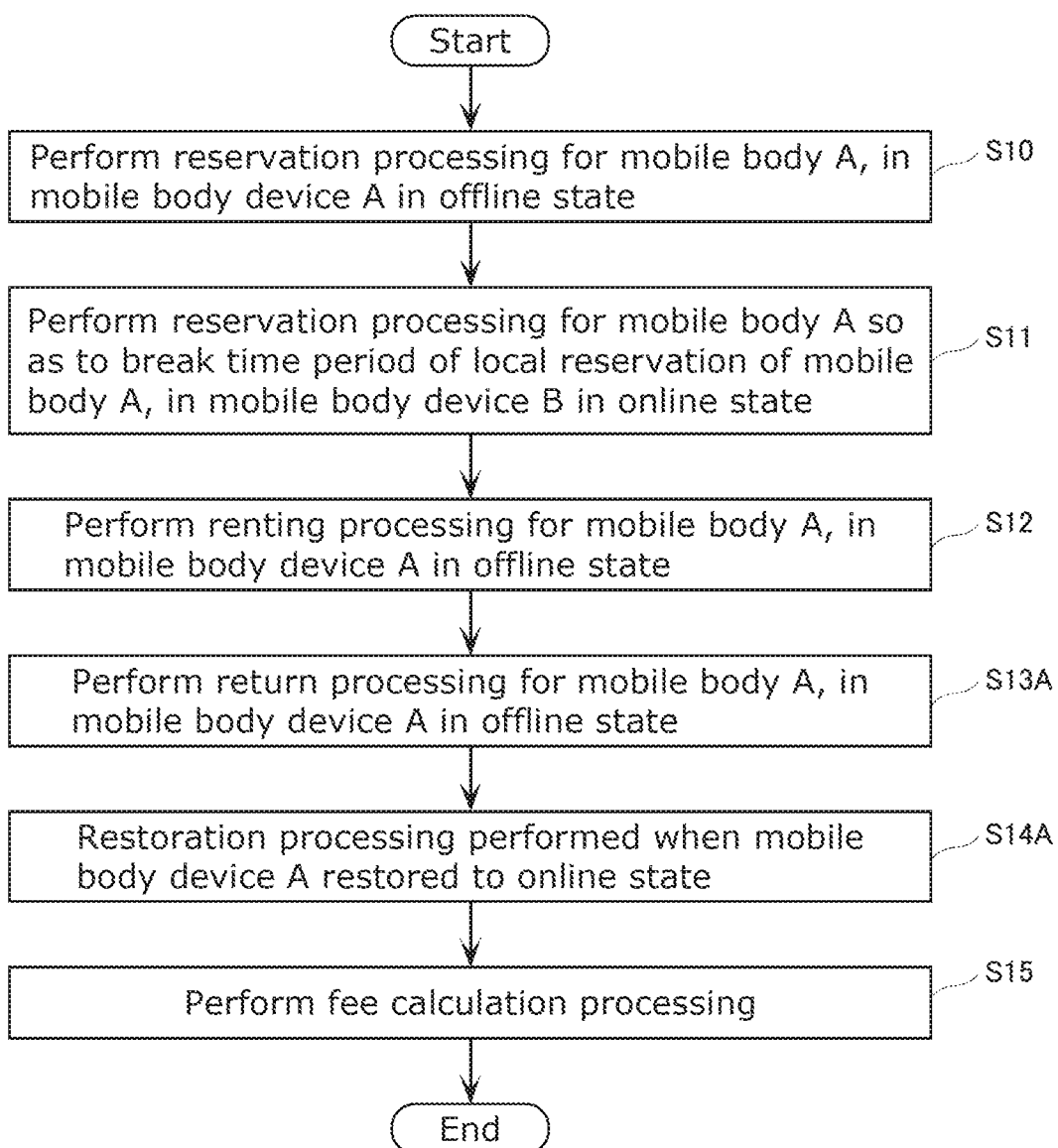
FIG. 33 is a flowchart illustrating an overview of operations in improper processing by a system according to Comparative Example 4.
Figure 34A:
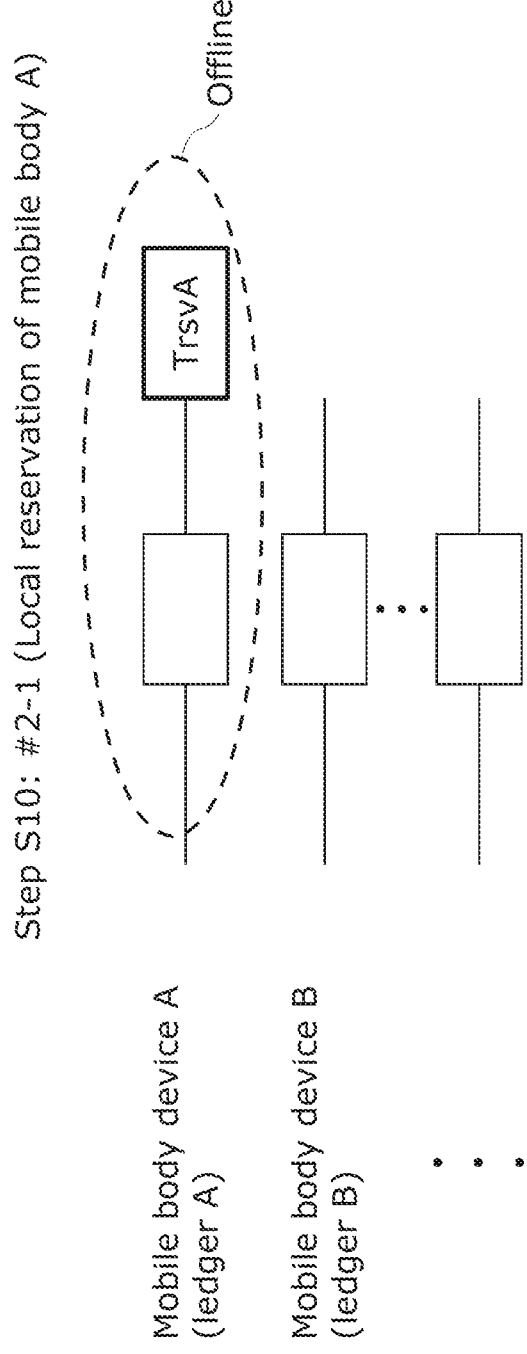
FIG. 34A is a diagram conceptually illustrating blocks of a blockchain stored in ledger A as a result of the operation of step S10 in FIG. 33.
Figure 34D:
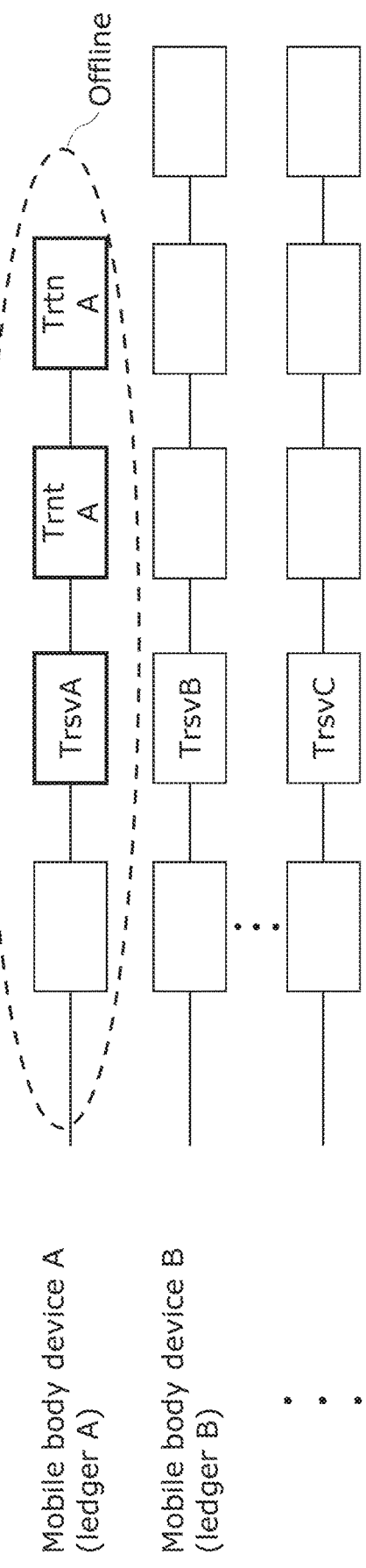
FIG. 34D is a diagram conceptually illustrating blocks of a blockchain stored in ledger A as a result of the operation of step S13A in FIG. 33.
Figure 35:
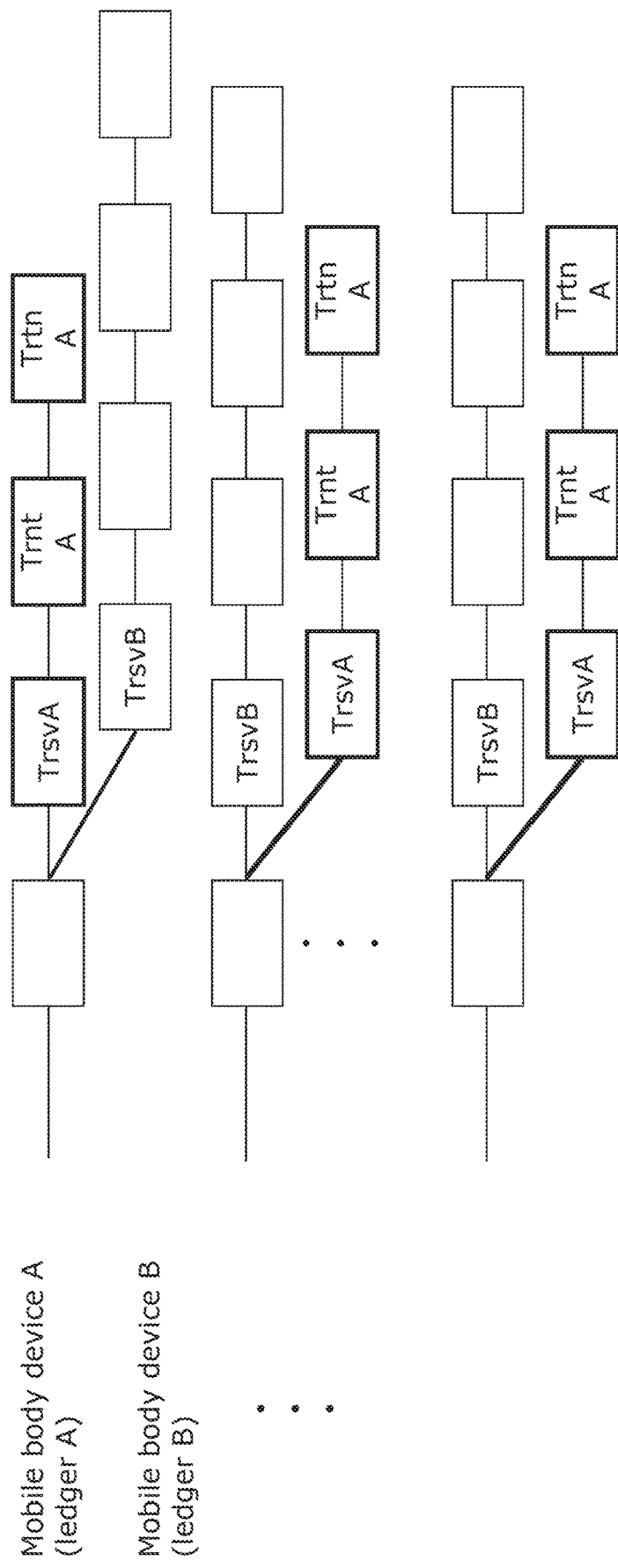
FIG. 35 is a diagram conceptually illustrating blocks of blockchains stored in ledger A and ledger B as a result of the operation of step S14A in FIG. 33.
Figure 36:
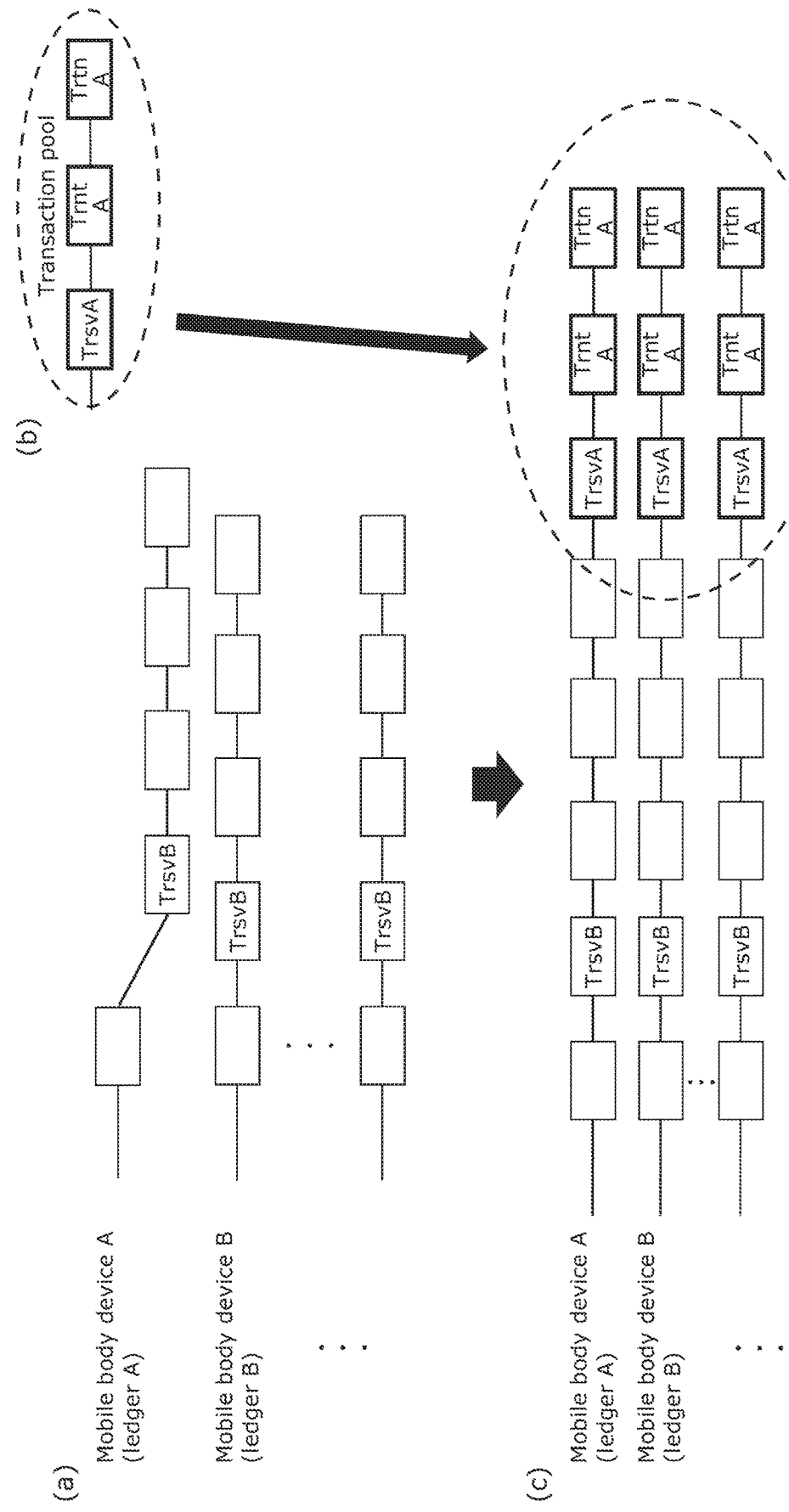
FIG. 36 is a diagram conceptually illustrating blocks of blockchains stored in ledger A and ledger B as a result of the operation of step S14A in FIG. 33.

FIG. 33 is a flowchart illustrating an overview of operations in improper processing by a system according to Comparative Example 4. FIGS. 34A to 36 are diagrams conceptually illustrating blockchains stored in ledger A of mobile body device A and ledger B of mobile body device B. FIG. 34A is a diagram conceptually illustrating blocks of a blockchain stored in ledger A as a result of the operation of step S10 in FIG. 33. FIG. 34B is a diagram conceptually illustrating blocks of a blockchain stored in ledger A as a result of the operation of step S11 in FIG. 33. FIG. 34C is a diagram conceptually illustrating blocks of a blockchain stored in ledger A as a result of the operation of step S12 in FIG. 33. FIG. 34D is a diagram conceptually illustrating blocks of a blockchain stored in ledger A as a result of the operation of step 513A in FIG. 33. FIGS. 35 and 36 are diagrams conceptually illustrating blocks of blockchains stored in ledger A and ledger B as a result of the operation of step 514A in FIG. 33. The following descriptions will also assume that a user who wishes to use mobile body A uses terminal A to perform improper processing in mobile body device A, which is installed in mobile body A.

Steps S10 to S12 indicated in FIG. 33 are the same processing as steps S10 to S12 described with reference to FIG. 23, and will therefore not be described here. Additionally, FIGS. 34A to 34C are the same as FIGS. 24A to 24C, and will therefore not be described.

Next, in step 513A, for example, terminal A communicates with mobile body device A, which is offline, and performs the return processing for mobile body A. In other words, terminal A performs return processing for locally returning mobile body A with mobile body device A, which is offline. More specifically, user who operated terminal A uses the unlocked mobile body A for the time reserved for use, and then returns mobile body A. When mobile body A is returned, mobile body device A generates return transaction data TrtnA indicating the return of mobile body A is complete. In this case, for example, as illustrated in FIG. 34D, mobile body device A is offline, and thus a block containing return transaction data TrtnA indicating the completion of the return of mobile body A is stored in ledger A only.

Next, assume that the user brings mobile body device A back online. Then, when mobile body device A is restored to an online state, return processing is performed in the system (S14A). More specifically, in steps S10 to S13A, mobile body device A is offline, and thus different blocks are concatenated to the blockchains in ledger A and ledger B at the point in time when mobile body device A goes back online, as illustrated in FIG. 34D, for example. Next, as illustrated in FIG. 35, when mobile body device A goes back online, a fork occurs due to ledger A of mobile body device A and ledger B of mobile body device B sharing different blockchains. Here, the block concatenated to the blockchain in ledger A of mobile body device A, which is offline, is shorter and therefore corresponds to a sidechain block, and the block concatenated to the blockchain in ledger B of mobile body device B, which is online, is longer and therefore corresponds to a main chain block. Accordingly, as indicated by (a) and (b) in FIG. 36, in ledger A of mobile body device A and ledger B of mobile body device B, the fork is eliminated by deleting the sidechain block and storing the transaction data contained in the sidechain block in the transaction pool. Note that in (b) in FIG. 36, reservation transaction data TrsvA, renting transaction data TrntA, and return transaction data TrtnA are stored in the transaction pool. Then, as indicated by (c) in FIG. 36, in the blockchains in ledger A of mobile body device A and ledger B of mobile body device B, a block containing the transaction data stored in the transaction pool is generated and concatenated when a new block is generated.

Next, the fee calculation processing is performed in mobile body device A and the like (S15). Similar to Comparative Example 3, reservation transaction data TrsvA and reservation transaction data TrsvB conflict, and the block containing reservation transaction data TrsvA is concatenated after the block containing reservation transaction data TrsvB. As a result, no fee is collected for the reservation corresponding to reservation transaction data TrsvA, and thus an impropriety arises in that the fee for using mobile body A through the reservation corresponding to reservation transaction data TrsvA is not paid.

Details of the processing for the local return in step 513A indicated in FIG. 33 and the processing when communication is restored for mobile body device A in step 514A will be described next with reference to sequence charts.

Return Processing According to Comparative Example 4

Figure 37:
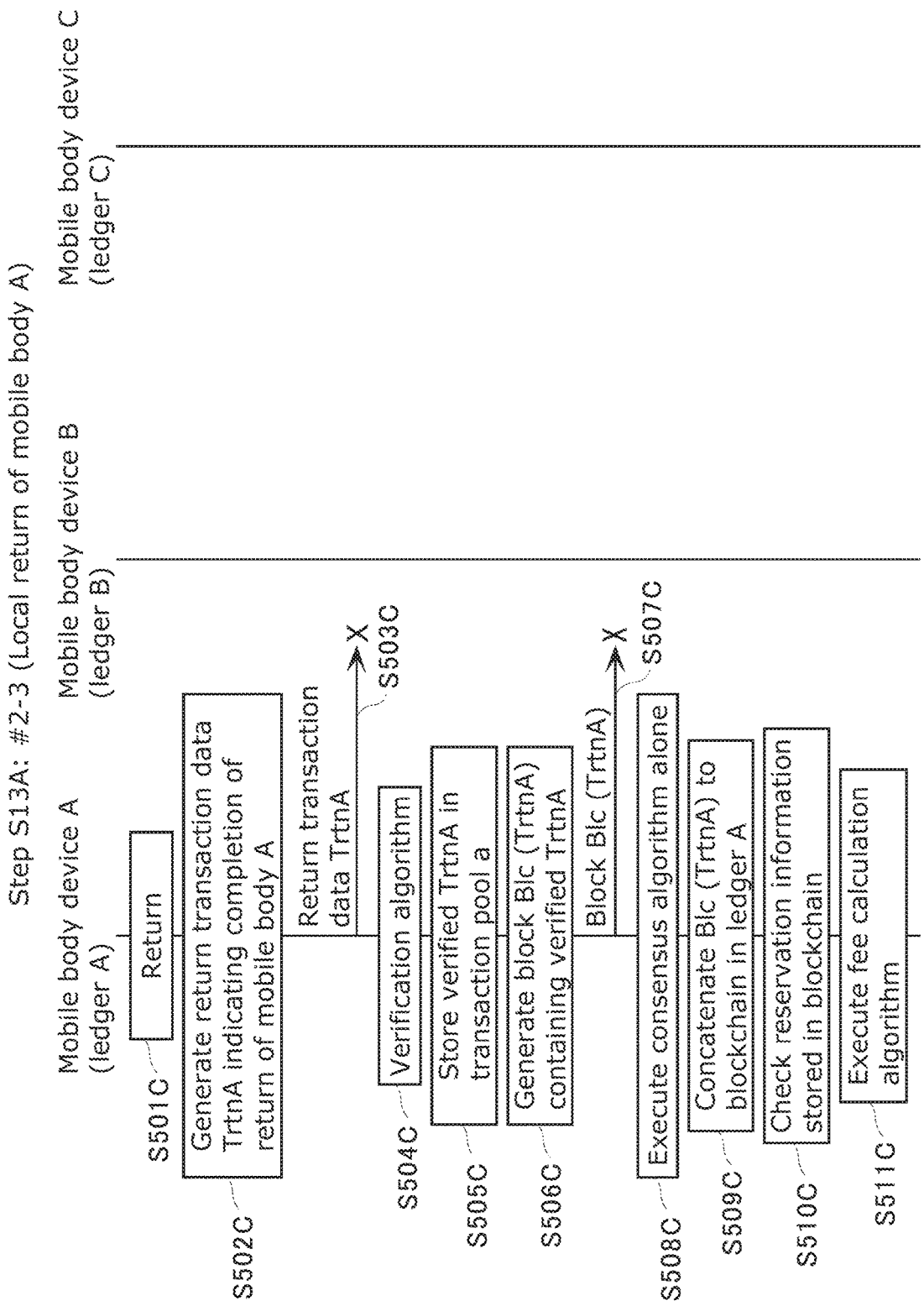
FIG. 37 is a sequence chart illustrating processing for local return, by the system according to Comparative Example 4.

FIG. 37 is a sequence chart illustrating processing for local return, by the system according to Comparative Example 4. Elements identical to those in FIG. 20 are given the same reference signs and will not be described in detail.

First, when mobile body A is returned by the user who used mobile body A, mobile body device A confirms that mobile body A has been returned (S501C).

Next, mobile body device A generates return transaction data TrtnA indicating the return of mobile body A is complete, triggered by confirming that mobile body A has been returned (S502C).

Next, mobile body device A attempts to forward return transaction data TrtnA to mobile body devices B and C, which are the other mobile body devices, but fails (S503C). This is because mobile body device A is offline and therefore cannot forward return transaction data TrtnA to mobile body devices B and C.

Next, mobile body device A executes the verification algorithm that verifies the validity of the obtained return transaction data TrtnA (S504C).

Next, mobile body device A stores return transaction data TrtnA verified by the verification algorithm executed in step 5504C in transaction pool a (S505C).

Next, mobile body device A generates block Blc (TrtnA) containing the verified return transaction data TrtnA (S506C).

Next, mobile body device A attempts to transmit block Blc (TrtnA) generated in step S506C to mobile body devices B and C, which are the other mobile body devices, but fails (S507C). This is because mobile body device A is offline and therefore cannot transmit block Blc (TrtnA) to mobile body devices B and C.

Next, mobile body device A executes a consensus algorithm alone (S508C). Specifically, mobile body device A consents to return transaction data TrtnA being valid transaction data (i.e., is valid) alone, and consents to the validity of block Blc (TrtnA) alone. Note that the processing of step S506C may be performed when executing the consensus algorithm in step S508C.

Next, mobile body device A concatenates block Blc (TrtnA) consented to in step S508C to the blockchain within ledger A (S509C). Through this, as illustrated in FIG. 34D, only ledger A stores the block containing return transaction data TrtnA, and the local return of mobile body A is recorded.

Next, mobile body device A checks the reservation information stored in the blockchain (S510C). More specifically, by concatenating return transaction data TrtnA to the blockchain in its own ledger, each of mobile body devices A, B, and C causes the reservation smart contract to be executed, and confirms that reservation transaction data TrsvA is present as the reservation information stored in the blockchain.

Then, mobile body device A executes the fee calculation algorithm (S511C). Mobile body device A is offline, and thus the fee for the reservation corresponding to reservation transaction data TrsvA is calculated by the fee calculation algorithm.

Processing when Communication is Restored for Mobile Body Device A According to Comparative Example 4

Details of processing performed when communication is restored for mobile body device A in step 514A indicated in FIG. 33 will be described next.

Figure 38:
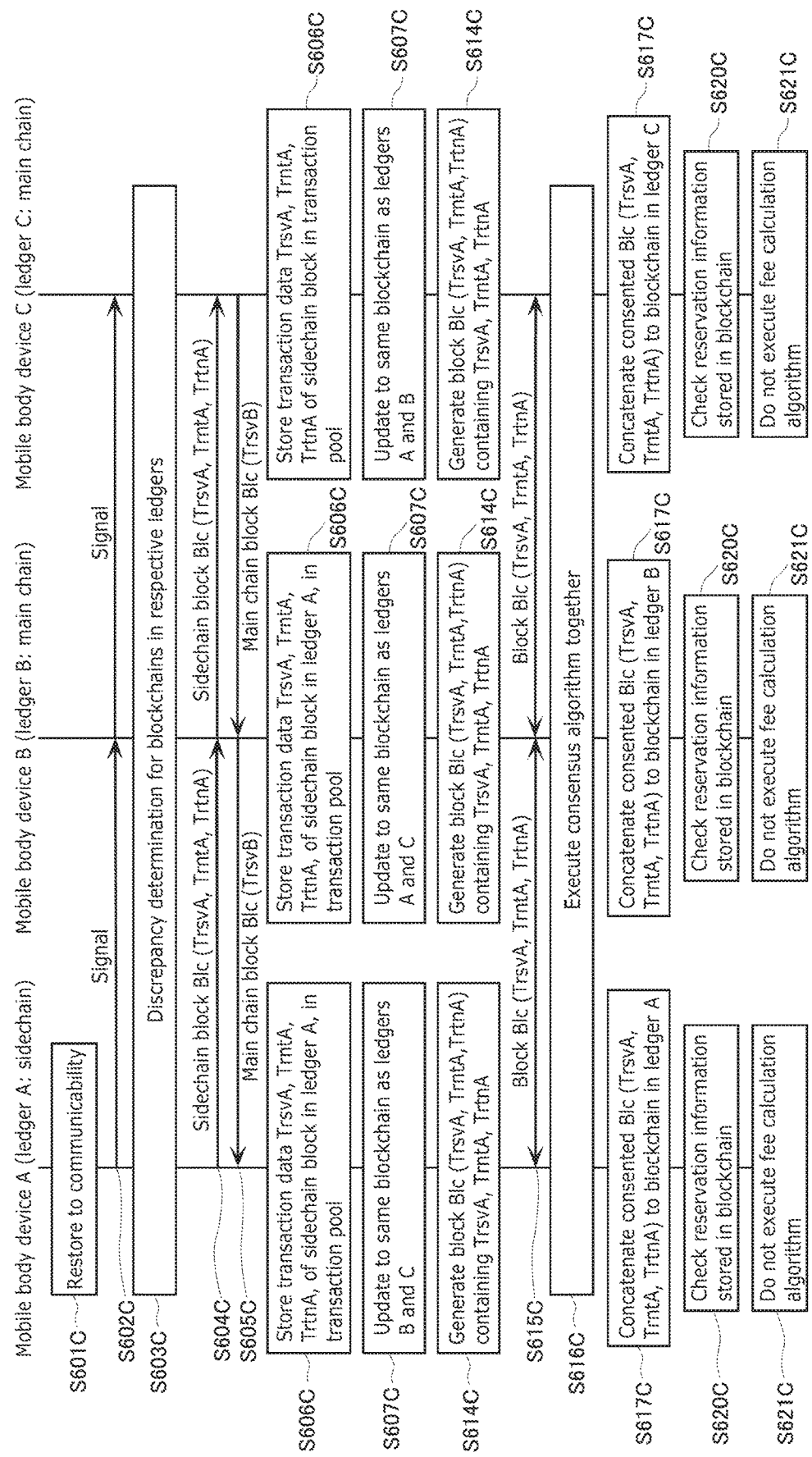
FIG. 38 is a sequence chart illustrating processing by the system, performed when communication is restored for mobile body device A, according to Comparative Example 4.

FIG. 38 is a sequence chart illustrating processing by the system, performed when communication is restored for mobile body device A, according to Comparative Example 4. Elements identical to those in FIG. 21 are given the same reference signs and will not be described in detail.

First, assume that mobile body device A has returned to communicability with mobile body devices B and C, which are the other mobile body devices (that is, is back online) (S601C).

Then, mobile body device A transmits signals indicating that mobile body device A has come online to mobile body devices B and C, which are the other mobile body devices (S602C).

Next, mobile body devices A, B, and C perform discrepancy determination for the blockchains in the respective ledgers (S603C). Before communication is restored for mobile body device A, for example, as in the example illustrated in FIG. 34D, different blocks are concatenated to the blockchain in ledger A and the blockchains in ledgers B and C, and thus the blockchain in ledger A differs from the blockchain in ledgers B and C. Accordingly, when communication is restored for mobile body device A, for example, as in the example illustrated in FIG. 35, ledgers A, B, and C in mobile body devices A, B, and C share different blockchains, and a fork therefore occurs.

Next, mobile body devices A, B, and C transmit information on the blocks that correspond to sidechain blocks and main chain blocks to each other (S604C, S605C). In the present comparative example, the blocks concatenated to the blockchain in ledger A of mobile body device A, which was offline for a set period of time, correspond to sidechain blocks Blc (TrsvA, TrntA, TrtnA). On the other hand, the blocks concatenated to the blockchains in ledgers B and C of mobile body devices B and C correspond to main chain block Blc (TrsvB).

Next, each of mobile body devices A, B, and C stores transaction data TrsvA, TrntA, and TrtnA of the sidechain block obtained in step S604C in the transaction pools (S606C).

Next, mobile body devices A, B, and C update the blockchains in ledgers A, B, and C, respectively, to be the same as each other (S607C). More specifically, each of mobile body devices A, B, and C updates the blockchain in ledger A to be the same as the blockchains in ledgers A, B, and C by deleting the sidechain block concatenated to the blockchain in ledger A and leaving the main chain blocks.

Next, at a block generation timing following a predetermined period of time, each of mobile body devices A, B, and C generates blocks Blc (TrsvA, TrntA, TrtnA) containing transaction data TrsvA, TrntA, and TrtnA stored in the transaction pools (S614C).

Next, each of mobile body devices A, B, and C transmits blocks Blc (TrsvA, TrntA, TrtnA) generated in step S614C to the other mobile body devices (S615C). Through this, each of mobile body devices A, B, and C can communicate, to the other mobile body devices, a report that the validity of transaction data TrsvA, TrntA, and TrtnA contained in blocks Blc (TrsvA, TrntA, TrtnA) was successfully verified.

Next, mobile body devices A, B, and C execute a consensus algorithm together (S616C). Specifically, each of mobile body devices A, B, and C consents to transaction data TrsvA, TrntA, and TrtnA being valid transaction data (i.e., is valid) based on the reports communicated in step S615C. The validity of blocks Blc (TrsvA, TrntA, TrtnA) is then consented to. Note that the processing of step S614C and step S615C may be performed when executing the consensus algorithm in step S616C.

Next, each of mobile body devices A, B, and C concatenates blocks Blc (TrsvA, TrntA, TrtnA) consented to in step S616C to the blockchain within the distributed ledger (S617C). More specifically, mobile body device A concatenates blocks Blc (TrsvA, TrntA, TrtnA) consented to to the blockchain in ledger A, and mobile body device B concatenates blocks Blc (TrsvA, TrntA, TrtnA) consented to to the blockchain in ledger B. Mobile body device C concatenates blocks Blc (TrsvA, TrntA, TrtnA) consented to to the blockchain in ledger C. Through this, as indicated by (c) in FIG. 36, blocks containing reservation transaction data TrsvA, renting transaction data TrntA, and return transaction data TrtnA are stored, and the local reservation, the local renting, and the local return of mobile body A are recorded.

Next, mobile body device A checks the reservation information stored in the blockchain (S620C). More specifically, by concatenating the block containing return transaction data TrtnA to the blockchain in its own ledger, each of mobile body devices A, B, and C causes the reservation smart contract to be executed, and confirms that reservation transaction data TrsvA and reservation transaction data TrsvB are present as the reservation information stored in the blockchain.

Then, each of mobile body devices A, B, and C does not execute the fee calculation algorithm (S621C). More specifically, each of mobile body devices A, B, and C executes the fee calculation algorithm, but the fee for the reservation corresponding to reservation transaction data TrsvA is not collected. Note that the processing of step S621C is the same as the processing of step S511B described above, and will therefore not be described here.

Here, as indicated by (c) in FIG. 36, for example, the reservation corresponding to reservation transaction data TrsvA and the reservation corresponding to reservation transaction data TrsvB conflict. Additionally, the block containing reservation transaction data TrsvA is concatenated after the block containing reservation transaction data TrsvB. Accordingly, even if the fee calculation algorithm is executed, the fee for the reservation corresponding to reservation transaction data TrsvA is not collected, and only the fee for the reservation corresponding to reservation transaction data TrsvB is collected.

In this manner, no fee is collected for the reservation corresponding to reservation transaction data TrsvA, and thus an impropriety arises in that the fee for using mobile body A through the reservation corresponding to reservation transaction data TrsvA is not paid Processing after Impropriety Measures According to Present Embodiment Impropriety measure processing according to the present embodiment, in which measures for the improper processing are taken, will be described next.

In the improper processing illustrated in FIGS. 23 and 33, no fee is collected for the local reservation made through the reservation processing in step S10, due to the conflicting reservation being made in step S11. Accordingly, in the present embodiment, the block containing the reservation transaction data generated in the local reservation in step S10 is not stored in the ledger. If a block containing the reservation transaction data generated in the local reservation is not stored in the ledger, the reservation will not be made, and thus mobile body A cannot be used through the local reservation. In other words, by suppressing processing which leads to improper use of mobile body A, which is the service object, the improper use of the service object by exploiting the blockchain can be suppressed.

The local reservation will be described hereinafter.

Figure 39:
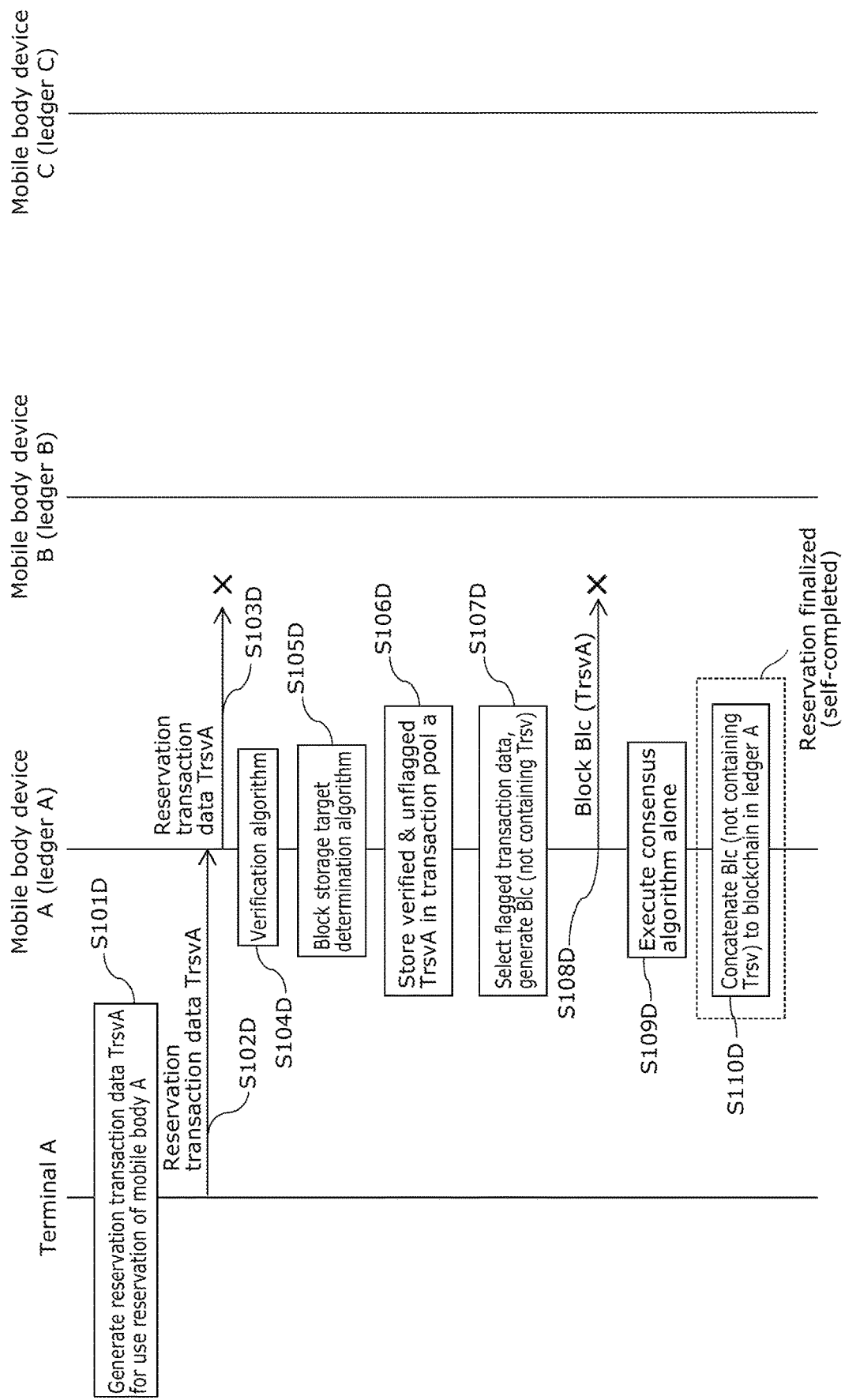
FIG. 39 is a sequence chart illustrating processing when a local reservation is not possible, by the system according to the embodiment.

FIG. 39 is a sequence chart illustrating processing when a local reservation is not possible, by the system according to the embodiment. Elements identical to those in FIG. 28 are given the same reference signs and will not be described in detail. The following will describe a case where mobile body device A performs processing for local reservation measures as a representative example.

First, based on an operation by the user who wishes to use mobile body A, terminal A generates reservation transaction data TrsvA for making a use reservation for mobile body A (S101D), and transmits the generated reservation transaction data TrsvA to mobile body device A (S102D).

Next, upon receiving reservation transaction data TrsvA transmitted in step S102D, mobile body device A attempts to forward reservation transaction data TrsvA to mobile body devices B and C, which are other mobile body devices, but fails (S103D). This is because mobile body device A is offline and therefore cannot forward reservation transaction data TrsvA to mobile body devices B and C.

Next, mobile body device A executes the verification algorithm that verifies the validity of the obtained reservation transaction data TrsvA (S104D).

Next, mobile body device A performs the block storage target determination processing by executing the block storage target determination algorithm for reservation transaction data TrsvA (S105D). At this time, mobile body device A is offline, and thus in the block storage target determination processing (described later), reservation transaction data TrsvA to be processed is determined not to be stored in the block, and the value of a flag added to reservation transaction data TrsvA is set to a second value indicating that the data is not to be stored in the block. Note that if mobile body device A is online, in the block storage target determination processing, reservation transaction data TrsvA to be processed is determined to be stored in the block, and the value of the flag added to reservation transaction data TrsvA is set to a first value indicating that the data is to be stored in the block.

Next, mobile body device A stores reservation transaction data TrsvA which has been verified by the verification algorithm executed in step S104D and for which the flag is not set (i.e., for which the value of the flag is set to the second value) in transaction pool a (S106D).

Next, mobile body device A generates block Blc containing the transaction data which has been verified by the verification algorithm executed in step S104D and for which the flag is set (i.e., for which the value of the flag is set to the first value) (S107D). At this time, the value of the flag of reservation transaction data TrsvA is set to the second value, and thus reservation transaction data TrsvA is not included in the generated block Blc.

Next, mobile body device A attempts to transmit block Blc (TrsvA) generated in step S107B to mobile body devices B and C, which are the other mobile body devices, but fails (S108D). This is because mobile body device A is offline and therefore cannot transmit block Blc (TrsvA) to mobile body devices B and C.

Next, mobile body device A executes a consensus algorithm alone (S109D). Note that the processing of step S107D may be performed when executing the consensus algorithm in step S109D alone Next, mobile body device A concatenates block Blc (not containing TrsvA) consented to in step S109D to the blockchain within ledger A (S110D).

Figure 40:
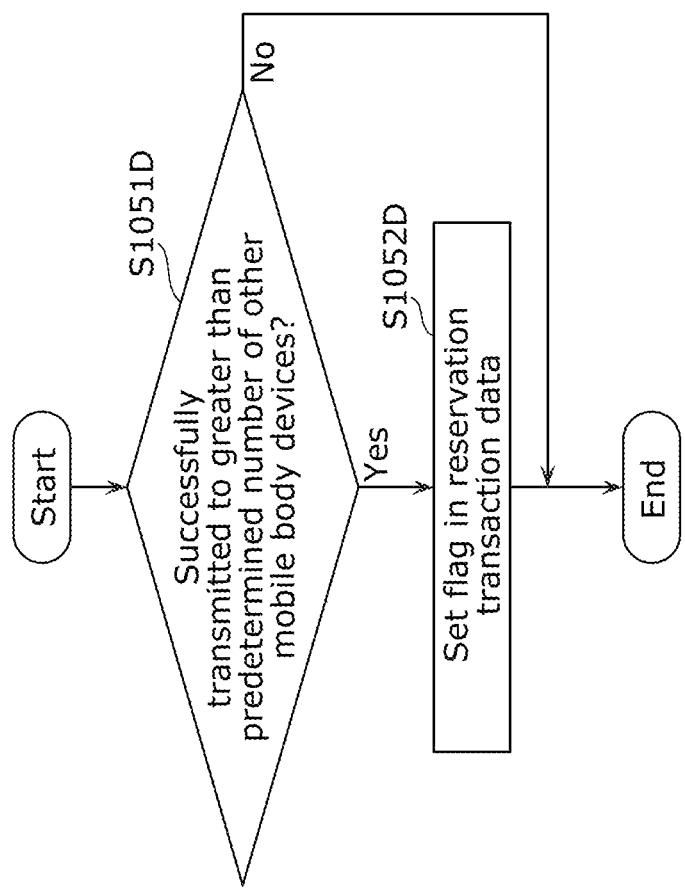
FIG. 40 is a flowchart illustrating an example of block storage target determination processing according to an embodiment.

FIG. 40 is a flowchart illustrating an example of the block storage target determination processing according to the embodiment. The block storage target determination processing according to the present embodiment, illustrated in FIG. 40, is executed in step S105D of FIG. 39. The following will describe a case where mobile body device A performs the block storage target determination processing.

In the present embodiment, in step S105D in FIG. 39, first, mobile body device A determines whether reservation transaction data TrsvA has been successfully transmitted to a greater number of the other mobile body devices than the predetermined number as a result of the transmission processing for reservation transaction data TrsvA performed in step S102D (S1051D).

If mobile body device A determines that reservation transaction data TrsvA has been successfully transmitted to a greater number of the other mobile body devices than the predetermined number (Yes in S1051D), reservation transaction data TrsvA to be processed is determined to be stored in the block, and the value of the flag added to reservation transaction data TrsvA is set to the first value indicating that the data is to be stored in the block (S1052D). Note that the value of the flag is assumed to be set to the second value, indicating that the data is not to be stored in the block, as an initial value.

If mobile body device A determines that reservation transaction data TrsvA was not successfully transmitted to a greater number of the other mobile body devices than the predetermined number (No in S1051D), the processing simply ends.

Although the value of the flag is described as being set to the second value, indicating that the data is not to be stored in the block, as an initial value, the second value need not be set. In this case, if mobile body device A determines that reservation transaction data TrsvA has not been successfully transmitted to a greater number of the other mobile body devices than the predetermined number (No in S1051D), reservation transaction data TrsvA to be processed may be determined not to be stored in the block, and the value of the flag added to reservation transaction data TrsvA may be set to the second value indicating that the data is not to be stored in the block.

Figure 41:
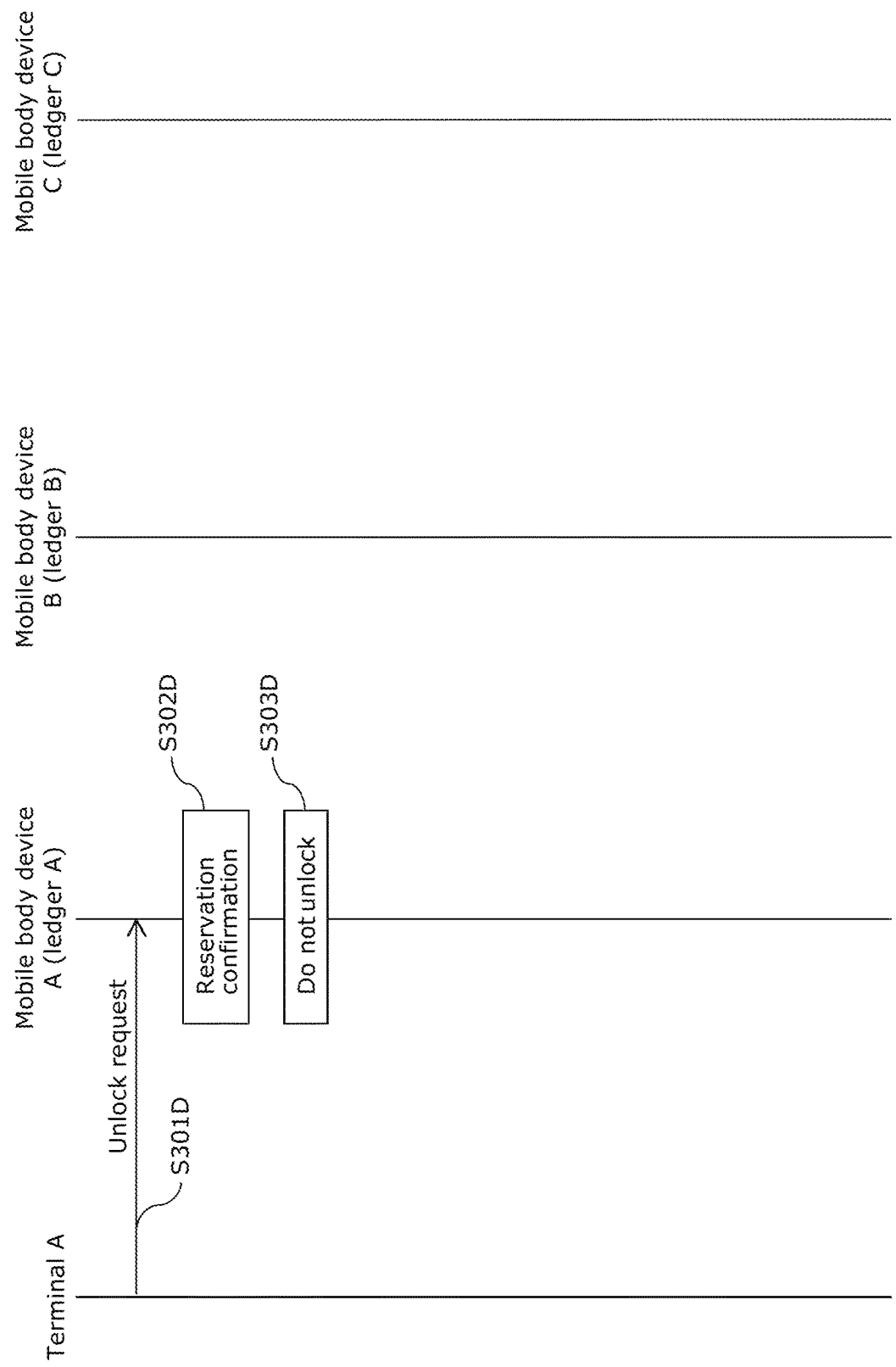
FIG. 41 is a sequence chart illustrating processing for local renting, by the system according to the embodiment.

FIG. 41 is a sequence chart illustrating processing for local renting, by the system according to the embodiment.

First, based on an operation by the user who will use mobile body A, terminal A transmits an unlock request for mobile body A to mobile body device A (S301D).

Next, upon receiving the unlock request transmitted in step S101D, mobile body device A confirms whether there is a reservation corresponding to the unlock request in the blockchain in ledger A (S302D).

However, because a block containing reservation transaction data TrsvA is not concatenated to the blockchain in ledger A of mobile body device A, mobile body A is not permitted to be unlocked (S303D).

In this manner, if it is not possible to communicate with a greater number of the other mobile body devices than the predetermined number, a block containing the obtained reservation transaction data TrsvA cannot be generated. Through this, a situation in which only ledger A stores the block containing reservation transaction data TrsvA for making a use reservation for mobile body A, and the local reservation is finalized, can be suppressed. Additionally, a situation in which mobile body A in which mobile body device A is installed is rented through a reservation made in mobile body device A put into an offline state can be suppressed. Effects, etc.

As described thus far, according to the present embodiment, if a first node, which is mobile body device A, for example, cannot communicate with a greater number of second nodes, which are other mobile body devices, than a predetermined number, a block containing reservation transaction data for using mobile body A cannot be generated. Through this, even if communication between the first node and the second nodes is disabled, a block containing the reservation transaction data is not allowed to be stored only in ledger A, which makes it possible to suppress the renting of mobile body A itself. Accordingly, it is possible to prevent use itself of the mobile body which would lead to the improper use of the mobile body in a sharing service.

As described above, mobile body A is an example of a service object, and the use reservation for mobile body A is an example of a contract for the service object. If it is not possible to communicate with a greater number of the second nodes than the predetermined number, a block containing the obtained first transaction data cannot be generated. Through this, a situation where processing which would lead to the improper use of the service object, such as disabling communication between the first node and the second nodes and causing a block containing the first transaction data to be stored only in the first distributed ledger, can be suppressed. Accordingly, the improper use of the service object by exploiting the blockchain can be suppressed.

Other Embodiments

Although the present disclosure has been described above based on the aforementioned embodiments, the present disclosure is of course not limited to the embodiments discussed above. The present disclosure is also inclusive of the following cases.

(1) Although the foregoing embodiments described a mobile body as an example of the service object, the configuration is not limited thereto. The service object may be any item that is locked so as to be unavailable to other users when the service is not used and unlocked when the service is used, such as, for example, a hotel room or an electronic locker. Additionally, the contract is not limited to a use reservation for mobile body 10, for example, but can also be a use reservation for a hotel room, a use reservation for an electronic locker, or the like, for example.

(2) Each device in the foregoing embodiments is specifically a computer system constituted by a microprocessor, ROM, RAM, a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(3) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC, LSI, super LSI, ultra LSI, and so on may be used, depending on the level of integration. Furthermore, the manner in which the circuit integration is achieved is not limited to LSI, and it is also possible to use a dedicated circuit or a generic processor. An FPGA (Field Programmable Gate Array) capable of post-production programming or a reconfigurable processor in which the connections and settings of the circuit cells within the LSI can be reconfigured may be used as well.

Furthermore, if other technologies that improve upon or are derived from semiconductor technology enable integration technology to replace LSI circuits, then naturally it is also possible to integrate the function blocks using that technology. Biotechnology applications are one such foreseeable example.

(4) Some or all of the constituent elements constituting the foregoing devices may be constituted by IC cards or stand-alone modules that can be removed from and mounted in the apparatus. The IC card or the module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(5) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

The present disclosure may also be a computer system including a microprocessor and memory, where the memory stores the above-described computer program and the microprocessor operates in accordance with the computer program.

The present disclosure may also be implemented by another independent computer system, by recording the program or the digital signal in the recording medium and transferring the recording medium, or by transferring the program or the digital signal over the network or the like.

(6) The above-described embodiments and variations may be combined as well.

INDUSTRIAL APPLICABILITY

The present disclosure can be used in control methods, control devices, and programs, and for example, can be used in control methods, control devices, and programs capable of suppressing improper use, in which a fee is not paid, when a user enters into a contract to use a mobile body in a service for sharing a mobile body such as a bicycle, a two-wheeled automobile, or the like.

The invention claimed is:

1. A control method for controlling a first node of a plurality of mobile body devices that holds a first distributed ledger in a system utilized to use a service object and including the first node and a plurality of second nodes of a plurality of mobile body devices that each hold a second distributed ledger, the first node different from the plurality of second nodes, the control method comprising:
    obtaining, by a processor of the first node, a first transaction data for the first node, wherein the first node is in an offline state;
    storing, by the processor, the first transaction data in the first distributed ledger after failing to transmit the first transaction data to the plurality of second nodes based on the offline state, wherein the first transaction data corresponds to a first sidechain block of the first distributed ledger;
    returning, by the processor, the first node to an online state such that first node is in communication with one or more of the plurality of second nodes;
    deleting, by the processor, the first sidechain block that includes the first transaction data;
    storing, by the processor, the first transaction data in a first transaction pool of the first node;
    generating, by the processor, a new block containing the first transaction data stored in the first transaction pool;
    executing, by the processor, transmission processing for transmitting the first transaction data to each of the plurality of second nodes, wherein each of the plurality of mobile body devices communicate with the first distributed ledger, the second distributed ledger, or both when online;
    counting, by the processor, a total number of the plurality of second nodes that successfully communicate with the first node in the transmission processing, wherein the counting comprises determining a number of the plurality of second nodes for which an error did not occur in the transmission processing;
    verifying, by the processor, the first transaction data by a consensus algorithm, wherein the consensus algorithm is based at least in part on:
        determining, by the processor, that the total number is greater than a first predetermined number;
        receiving, by the processor, one or more reports from each of the plurality of second nodes; and
        determining, by the processor, successful verification of the first transaction data based on a total of the one or more reports that indicate that verification of the first transaction data was successful exceeds a second predetermined number; and
    storing, by the processor, the first transaction data verified using the consensus algorithm in the first distributed ledger.

2. The control method according to claim 1,
    wherein when the total number counted is greater than the predetermined number, a first block containing the first transaction data is generated, and
    when the total number counted is not greater than the predetermined number, the first block is not generated.

3. The control method according to claim 1,
    wherein the first transaction data includes contract information pertaining to a first contract for using the service object.

4. The control method according to claim 3,
wherein the first node manages a first blockchain in the first distributed ledger, and
the consensus algorithm is executed between the first node and the plurality of second nodes that successfully communicate with the first node in the transmission processing, and the first block generated is stored in the first blockchain.

5. The control method according to claim 4, further comprising:
executing the first contract included in the first transaction data stored in the first blockchain.

6. The control method according to claim 4,
wherein the system is used in a service for sharing the plurality of mobile bodies,
the service object is each of the plurality of mobile bodies,
the first contract is a use reservation for a first mobile body, and
the first transaction data is reservation transaction data for a user to make a use reservation for the first mobile body through the first node, and includes an ID of the user, information indicating a time period for which the user is to use the first mobile body, and a reservation number.

7. The control method according to claim 6, further comprising:
receiving, by the first node, an unlock request for the first mobile body, the unlock request serving as a request from the user to start using the first mobile body;
confirming, by the first node, whether the reservation transaction data corresponding to the unlock request is stored in the first blockchain; and
when the reservation transaction data is stored, permitting the user to unlock the first mobile body during the time period.

8. The control method according to claim 7, further comprising:
obtaining renting transaction data indicating that the first mobile body has been rented to the user, the renting transaction data including the ID of the user, the reservation number, and a timestamp indicating a time at which the first mobile body was rented to the user;
storing a second block containing the renting transaction data in the first blockchain;
obtaining return transaction data indicating that the user has returned the first mobile body, the return transaction data including the ID of the user, the reservation number, and a timestamp indicating a time at which the user returned the first mobile body;
storing a third block containing the return transaction data in the first blockchain; and
collecting a use fee for the first mobile body from the user corresponding to the ID of the user included in the reservation transaction data.

9. The control method according to claim 1,
wherein when the total number counted is not greater than the predetermined number, the transmission processing is re-executed at at least one time while continuing the counting until a predetermined condition is met.

10. The control method according to claim 9,
wherein the predetermined condition is that the total number counted is greater than the predetermined number or that a predetermined period of time has passed following a start of the counting, and when re-executing the transmission processing is stopped in response to the predetermined period of time passing following the start of the counting, the first transaction data is deleted.

11. A control device of a plurality of mobile body devices that is included in a system utilized to use a service object, and holds a first distributed ledger, the system including the control device and a plurality of other control devices of the plurality of mobile body devices that each hold a second distributed ledger, the control device different from the plurality of other control devices, the control device comprising:
a memory, storing a computer program; and
a processor configured to execute the computer program to:
obtain a first transaction data for the first node, wherein the control device is in an offline state;
store, by the processor, the first transaction data in the first distributed ledger after failing to transmit the first transaction data to the plurality of other control devices based on the offline state, wherein the first transaction data corresponds to a first sidechain block of the first distributed ledger;
return the control device to an online state such that the control device is in communication with one or more of the plurality of other control devices;
delete the first sidechain block that includes the first transaction data;
store the first transaction data in a first transaction pool of the control device;
generate a new block containing the first transaction data stored in the first transaction pool;
execute transmission processing for transmitting the first transaction data to each of the plurality of other control devices, wherein each of the plurality of mobile body devices communicate with the first distributed ledger, the second distributed ledger or both when online;
count a total number of the plurality of other control devices that successfully communicate with the control device in the transmission processing, wherein an error did not occur in the transmission processing;
verify the first transaction data by a consensus algorithm, wherein the consensus algorithm is based at least in part on;
determining, by the processor, that the total number is greater than a first predetermined number;
receiving one or more reports from each of the plurality of other control devices; and
determining successful verification of the first transaction data based on a total of the one or more reports that indicate that verification of the first transaction data was successful exceeds a second predetermined number; and
store the first transaction data verified using the consensus algorithm in the first distributed ledger.

12. A non-transitory computer-readable recording medium having recorded thereon a program for causing a processor of a first node of a plurality of mobile body devices to execute a control method for controlling the first node that holds a first distributed ledger in a system utilized to use a service object and including the first node and a plurality of second nodes of the plurality of mobile body devices that each hold a second distributed ledger, the first node different from the plurality of second nodes, the control method comprising:

obtaining, by the processor of the first node, a first transaction data for the first node, wherein the first node is in an offline state;

storing, by the processor, the first transaction data in the first distributed ledger after failing to transmit the first transaction data to the plurality of second nodes based on the offline state, wherein the first transaction data corresponds to a first sidechain block of the first distributed ledger;

returning, by the processor, the first node to an online state such that first node is in communication with one or more of the plurality of second nodes;

deleting, by the processor, the first sidechain block that includes the first transaction data;

storing, by the processor, the first transaction data in a first transaction pool of the first node;

generating, by the processor, a new block containing the first transaction data stored in the first transaction pool;

transmitting, by the processor, the first transaction data to each of the plurality of second nodes, wherein each of the plurality of mobile body devices communicate with the first distributed ledger, the second distributed ledger, or both when online;

counting, by the processor, a total number of the plurality of second nodes that successfully communicate with the first node in the transmission processing, wherein the counting comprises determining a number of the plurality of second nodes for which an error did not occur in the transmission processing;

verifying, by the processor, the first transaction data by a consensus algorithm, wherein the consensus algorithm is based at least in part on:
 determining, by the processor, that the total number is greater than a first predetermined number;
 receiving, by the processor, one or more reports from each of the plurality of second nodes; and
 determining, by the processor, successful verification of the first transaction data based on a total of the one or more reports that indicate that verification of the first transaction data was successful exceeds a second predetermined number; and storing, by the processor, the first transaction data verified using the consensus algorithm in the first distributed ledger.

* * * * *